United States Patent
Ozasa et al.

(10) Patent No.: US 8,043,539 B2
(45) Date of Patent: *Oct. 25, 2011

(54) PROCESS FOR PRODUCING BIODEGRADABLE MOLDED ITEM AND MOLDING DIES THEREFOR

(75) Inventors: Akio Ozasa, Shiga (JP); Akihisa Hashimoto, Shiga (JP); Rumi Shinohara, Shiga (JP); Shinji Tanaka, Shiga (JP); Takeshi Shingu, Shiga (JP)

(73) Assignee: Nissei Company, Ltd., Osaka (JP)

( * ) Notice: Subject to any disclaimer, the term of this patent is extended or adjusted under 35 U.S.C. 154(b) by 1321 days.

This patent is subject to a terminal disclaimer.

(21) Appl. No.: 10/507,507

(22) PCT Filed: Mar. 12, 2003

(86) PCT No.: PCT/JP03/02923
§ 371 (c)(1),
(2), (4) Date: Sep. 13, 2004

(87) PCT Pub. No.: WO03/076159
PCT Pub. Date: Sep. 18, 2003

(65) Prior Publication Data
US 2005/0230864 A1   Oct. 20, 2005

(30) Foreign Application Priority Data

Mar. 13, 2002 (JP) .................................. 2002-069281
Mar. 10, 2003 (JP) .................................. 2003-063037

(51) Int. Cl.
*B29C 44/06* (2006.01)
*B32B 9/00* (2006.01)

(52) U.S. Cl. .......... 264/46.4; 264/53; 264/319; 264/554

(58) Field of Classification Search ................. 264/46.4, 264/46.9, 50–53, 112, 127, 102, 319, 472, 264/550, 553, 554, 46.5, 46.8; 428/36.5, 428/36.91, 304.4, 307.3, 308.4, 308.8, 317.1
See application file for complete search history.

(56) References Cited

U.S. PATENT DOCUMENTS 2,081,777 A   5/1937   Talalay
(Continued)

FOREIGN PATENT DOCUMENTS

CA   2 143 432 C   *   8/1993
(Continued)

OTHER PUBLICATIONS

Translation of WO 94/05492 A1, pp. 1-2.*
(Continued)

*Primary Examiner* — Joseph Del Sole
*Assistant Examiner* — Dimple Bodawala
(74) *Attorney, Agent, or Firm* — Harness, Dickey & Pierce, P.L.C.

(57) ABSTRACT

Using a metal mold (20a) consisting of a convex mold part (21a) and a concave mold part (22a), a molding material (14) is placed between a pair of coating films (12), and after clamping, the molding material (14) and the coating film (12) are heated and molded to make a biodegradable expanded molded article, and at the same time, the coating film (12) is softened and pressure-bonded to a surface of the biodegradable expanded molded article. An exhaust hole (31a) and (32a) are provided on the convex mold part (21a) and the concave mold part (22a), respectively. At the time of heating and molding, gaseous matter existing between the coating film (12) and a surface of the metal mold (20a) is discharged out of the metal mold (20a) through the exhaust holes (31a) and (32a). Accordingly, it is possible to provide a method and a mold to manufacture a biodegradable expanded molded article easily and with excellent accuracy of dimension, having enough strength, enough water resistance, very excellent biodegradability and excellent surface smoothness even if the biodegradable molded article has a complicated shape.

33 Claims, 24 Drawing Sheets

U.S. PATENT DOCUMENTS

| Patent Number | | Date | Inventor | Ref |
|---|---|---|---|---|
| 2,513,052 | A | 6/1950 | Roberts | |
| 2,531,540 | A | 11/1950 | Smith | |
| 2,917,783 | A | 12/1959 | Olson et al. | |
| 2,926,385 | A | 3/1960 | Willson, Jr. | |
| 2,979,771 | A | 4/1961 | Taber | |
| 3,514,509 | A | 5/1970 | Hoffer et al. | |
| 3,657,044 | A * | 4/1972 | Singer | 156/212 |
| 3,712,771 | A | 1/1973 | White et al. | |
| 3,728,098 | A | 4/1973 | Giffen | |
| 3,846,526 | A | 11/1974 | Wade | |
| 3,995,763 | A | 12/1976 | Ayres et al. | |
| 4,120,632 | A | 10/1978 | Stoeberl | |
| 4,207,278 | A | 6/1980 | Cowen et al. | |
| 4,337,116 | A * | 6/1982 | Foster et al. | 162/158 |
| 4,350,486 | A | 9/1982 | Croseck et al. | |
| 4,443,401 | A | 4/1984 | Turner | |
| 4,482,515 | A | 11/1984 | Bühler et al. | |
| 4,702,877 | A | 10/1987 | Davis, Jr. | |
| 4,758,394 | A | 7/1988 | Yaita et al. | |
| 5,153,037 | A * | 10/1992 | Altieri | 428/35.6 |
| 5,284,429 | A | 2/1994 | Schneider et al. | |
| 5,295,804 | A | 3/1994 | Dinnan | |
| 5,326,517 | A | 7/1994 | Yaita et al. | |
| 5,462,983 | A * | 10/1995 | Bloembergen et al. | 524/51 |
| 5,534,216 | A | 7/1996 | Kamiyama | |
| 5,545,450 | A | 8/1996 | Andersen et al. | |
| 5,591,491 | A * | 1/1997 | Ando et al. | 427/544 |
| 5,622,756 | A * | 4/1997 | Tokoro et al. | 428/36.5 |
| 5,639,518 | A * | 6/1997 | Ando et al. | 427/544 |
| 5,720,915 | A | 2/1998 | Joppen et al. | |
| 5,776,509 | A | 7/1998 | Ota et al. | |
| 5,783,126 | A * | 7/1998 | Andersen et al. | 264/102 |
| 5,849,339 | A * | 12/1998 | Nakanishi | 425/4 R |
| 5,874,489 | A * | 2/1999 | D'Haenens et al. | 523/205 |
| 5,965,080 | A | 10/1999 | Ando et al. | |
| 5,972,151 | A | 10/1999 | Sbrana | |
| 6,030,673 | A * | 2/2000 | Andersen et al. | 428/36.4 |
| 6,040,063 | A * | 3/2000 | Doane et al. | 428/532 |
| 6,086,800 | A * | 7/2000 | Manlove | 264/37.32 |
| 6,103,163 | A | 8/2000 | Joppen et al. | |
| 6,132,669 | A * | 10/2000 | Valyi et al. | 264/510 |
| 6,136,255 | A * | 10/2000 | Ando et al. | 264/415 |
| 6,294,265 | B1 * | 9/2001 | Ioelovich et al. | 428/507 |
| 6,440,354 | B1 | 8/2002 | Takai et al. | |
| 6,572,806 | B1 * | 6/2003 | Oya et al. | 264/174.1 |
| 6,576,089 | B1 | 6/2003 | Sato et al. | |
| 7,112,299 | B2 | 9/2006 | Merrick | |
| RE39,339 | E * | 10/2006 | Andersen et al. | 106/206.1 |
| 7,332,214 | B2 * | 2/2008 | Ozasa et al. | 428/317.1 |
| 2002/0100860 | A1 | 8/2002 | Wieder | |
| 2003/0077344 | A1 | 4/2003 | Kato et al. | |
| 2003/0107145 | A1 | 6/2003 | Ozasa et al. | |
| 2009/0008819 | A1 * | 1/2009 | Ozasa et al. | 264/241 |

FOREIGN PATENT DOCUMENTS

| | | | |
|---|---|---|---|
| CA | 2143432 | | 11/2000 |
| CN | 1083773 | | 3/1994 |
| DE | 4201096 | | 7/1993 |
| EP | 679509 | A2 * | 7/1989 |
| EP | 692357 | A2 * | 1/1996 |
| EP | 0 880 896 | A1 | 12/1998 |
| JP | 49-026378 | | 3/1974 |
| JP | 51-62130 | | 5/1976 |
| JP | 51-062130 | A | 5/1976 |
| JP | 52-134670 | A | 11/1977 |
| JP | 54-127476 | A | 10/1979 |
| JP | 55-073535 | A | 6/1980 |
| JP | 57-001712 | A | 1/1982 |
| JP | 60-115429 | | 6/1985 |
| JP | 60214926 | | 10/1985 |
| JP | 63-054217 | A | 3/1988 |
| JP | 04-014430 | | 1/1992 |
| JP | 04097828 | A * | 3/1992 |
| JP | 5-117710 | | 5/1993 |
| JP | 05-505211 | | 8/1993 |
| JP | 5-505211 | | 8/1993 |
| JP | 05-278738 | | 10/1993 |
| JP | 05-278738 | A | 10/1993 |
| JP | 05-285965 | | 11/1993 |
| JP | 05-285965 | A | 11/1993 |
| JP | 05-294332 | A | 11/1993 |
| JP | 05-320401 | | 12/1993 |
| JP | 05-320401 | A | 12/1993 |
| JP | 06-031801 | | 2/1994 |
| JP | 06-125718 | A | 5/1994 |
| JP | 07-010148 | A | 1/1995 |
| JP | 07001479 | A * | 1/1995 |
| JP | 07-097545 | A | 4/1995 |
| JP | 07-224173 | | 8/1995 |
| JP | 07-224173 | A | 8/1995 |
| JP | 08-500547 | | 1/1996 |
| JP | 08-081565 | | 3/1996 |
| JP | 10-044159 | | 2/1998 |
| JP | 10-044159 | A | 2/1998 |
| JP | 10119949 | A * | 5/1998 |
| JP | 11-171238 | A | 6/1999 |
| JP | 11-198304 | | 7/1999 |
| JP | 11-512467 | | 10/1999 |
| JP | 2000033976 | A * | 2/2000 |
| JP | 2000-142783 | A | 5/2000 |
| JP | 2000-334825 | | 12/2000 |
| JP | 2000334825 | A * | 12/2000 |
| WO | WO 83/01595 | | 5/1983 |
| WO | WO 9405492 | A1 * | 3/1994 |
| WO | WO 02/22353 | | 3/2002 |

OTHER PUBLICATIONS

Biopolymeric material, pp. 1-56, copyright by 1998-2001.*
Supplemental Search Report issued Nov. 21, 2008 by the European Patent Office in European Patent Application No. 03710318.1-2307.
Office Action issued Mar. 6, 2009 by the Chinese Patent Office in Chinese Patent Application No. 200710163713.X (with English language translation).
Chinese Office Action dated Jan. 22, 2010 in corresponding Chinese Application No. 200710163713, with English translation.
Office Action dated Oct. 14, 2009 in corresponding U.S. Appl. No. 12/010,594.
Office Action dated Nov. 8, 2010 for corresponding U.S. Appl. No. 12/010,594.
Japanese Office Action, mailed on Dec. 19, 2006.
Chinese Office Action, mailed on Jan. 12, 2007.

* cited by examiner

PROCESS FOR PRODUCING BIODEGRADABLE MOLDED ITEM AND MOLDING DIES THEREFOR

TECHNICAL FIELD

The present invention relates to a method for manufacturing an expanded molded article mainly made of starch and having biodegradability (biodegradable molded article), particularly to a method for manufacturing a biodegradable molded article that can be desirably used as a disposable expanded molded article that is disposed after the use such as a food container, a molding buffer material, GES and a wrapping tray, and to a mold used therefor. In addition, the present invention relates to a method for desirably manufacturing a biodegradable molded article with a deep drawing shape including a bowl-shaped or a cup-shaped biodegradable molded article using a substantially flat coating film.

BACKGROUND ART

As a disposal method for a molded article, a biodegradability disposal technique using microbe has been developed and is in the spotlight. Especially, in the biodegradability disposal method above, a method to utilize natural high polymers such as starch and protein has drawn attention in terms of its practicality. This is because the various biodegradable plastics have a problem that despite having fine quality almost comparable to conventional plastics (non-degradable or degradable-retardant), practically they cannot be decomposed quickly enough.

For instance, when a molded article made of the biodegradable plastic is thick, it takes a very long time until the molded article is completely decomposed, so practically it is not possible to produce the molded article having enough volume. Also, when the molded article made of the biodegradable plastic is used particularly as a disposable food container, composting the molded article together with food residues is the least harmful disposal method for the environment. However, actually it is difficult to compost them together since the biodegradable plastic above is decomposed much slower than the food residues. Furthermore, it is also difficult to crush the molded article to hasten the decomposition of the biodegradable plastic, because normally the molded article cannot be crushed easily when it has a certain thickness and strength. Thus it is almost impossible to compost the molded article made of the biodegradable plastic.

Whereas starch and protein, etc. are positively evaluated as the materials because of advantages such as:
- with fine biodegradability, decomposition is quite easy even if the volume is large;
- the resources can be acquired easily on account of availability of vegetable starch that is mass-produced by agriculture; and
- a molded article with adequate thickness and thermal insulation can be acquired, since the molded article is usually used as an expanded molded article.

(1) Japanese Laid-Open Patent Application. No. 5-320401/1993 (Tokukaihei 5-320401; published on Dec. 3, 1993, (2) Japanese Laid-Open Patent Application No. 7-224173/1995 (Tokukaihei 7-224173; published on Aug. 22, 1995), (3) Japanese Laid-Open Patent Application No. 7-10148/1995 (Tokukaihei 7-10148; published on Jan. 13, 1995), (4) Japanese Laid-Open Patent Application No. 2000-142783 (Tokukai 2000-142783; published on May 23, 2000), and (5) Japanese Laid-Open Patent Application No. 7-97545/1995 (Tokukaihei 7-97545; published on Apr. 11, 1995) disclose biodegradable disposal technologies using starch, protein, etc.

First, a molded article derived from the technology (1) or (2) has the advantages that it has better decomposability than a molded article mainly made of the biodegradable plastic and is also superior to those derived from paper/pulps in its diversity of the molded shape, since natural starch is used as the main ingredient. However, at the same time the molded article derived from the technology (1) or (2) has the disadvantages that it can be used only for limited purposes and is required to barrier moisture during storage, due to its poor water and moisture resistance.

Second, a molded article derived from the technology (3) or (4) is mainly made of starch or similar polysaccharide, and to enhance its water resistance, a natural resin (dammar resin, shellac resin, etc.) is coated on the surface of the molded article to form a water-resistant coating film.

However, the surface of the molded article (including an expanded molded article) mainly made of starch cannot be completely smoothed, and generation of small irregularities cannot be avoided. Thus small pinholes are likely to be formed on the surface corresponding to the irregularities on the water-resistant coating film if it is simply coated. It could be possible to render the molded article water repellent but difficult to make the same completely water resistant. Particularly, if the molded article is required to be moisture-resistant, moisture is likely to be absorbed from the pinholes on the water-resistant coating film, and the molded article tends to become disfigured.

Furthermore, the dammar resin or the shellac resin must be dissolved in an organic solvent such as alcohol, etc., when applied to the surface. This causes problems in terms of a manufacturing facility. For instance, when the organic solvent is removed after the coating, large-scale equipment is required to prevent diffusion of the organic solvent in the air that causes air and environment pollution.

Now, on a surface of a molded article derived from the technology (5) that is made of poorly water-resistant biodegradable material such as starch, as in the cases of the molded articles derived from the technologies (3) and (4), a biodegradable coating agent composed of aliphatic polyester being dissolved in halogenated hydrocarbon is coated. In this case, using a dip method (dip coating method) for actual coating of the surface, an adequately water-resistant coating film can be formed even on a complicatedly-shaped molded article.

However, in this method, it is required to remove the halogenated hydrocarbon used to dissolve the coating agent, and as in the cases of the technologies (3) and (4), problems such as a requirement of equipment to prevent diffusion of halogenated hydrocarbon. Many halogenated hydrocarbons are often harmful for a human body and the environment, and the halogenated hydrocarbon that is specifically mentioned in the technology (5) contains CFC so that it should be released to the air as little as possible. On this account, a large-scale hermetic room and a reclaiming device are required as the equipment above.

In addition to the technologies introduced above, there is a technology in which wax or hydrophobic protein, prepared as a coating solution, is coated on the surface of the molded article. Generally speaking, it is difficult to coat a water-resistant coating film on the surface of the molded article evenly and entirely, while coating on a flat molded article such as a flat plate is relatively easy. However, small irregularities are likely to be formed on the surface of the molded article mainly made of starch as described above and obstruct the formation of an even film, and furthermore, the molded article or a coating device has to be rotated when the molded article is substantially circular in cross section, for instance, like a cup or a bowl. Therefore the coating becomes more difficult.

Besides, even if the coating agent can be applied evenly and entirely by using the dip method, the coating agent runs down before it solidifies and becomes a coating film, and unevenness is likely to show up on the coating film.

The wax has a problem of poor heat resistance due to its relatively low melting point. In the meantime, although the hydrophobic protein has better heat resistance and does not need the organic solvent, the molded article absorbs water and is softened/deformed in the coating process due to frequent uses of aqueous solvents.

So, a technology that has been proposed to laminate a water-resistant coating film instead of coating thereof, more specifically, (6) Japanese Laid-Open Patent Application No. 11-171238/1999 (Tokukaihei 11-171238; published on Jun. 29, 1999), (7) Japanese Laid-Open Patent Application No. 5-278738/1993 (Tokukaihei 5-278738; published on Oct. 26, 1993), (8) Japanese Laid-Open Patent Application No. 5-294332/1993 (Tokukaihei 5-294322; published on Nov. 9, 1993).

A container of the technology (6), made by a pulp molding method instead of molding starch, is coated by a water-impermeable or non-absorbing protective layer. This method has the advantage that the conventional plastic coating method can be applied almost without any change. However, at the same time the method has problems such as:

the pulp molding slowly biodegrades since it is mainly made of fiber so that the molded article cannot be disposed together with remaining foods, etc.; and only limited types of molded articles can be produced because it is difficult to make the molded article thicker, and also the molded article is not suitable for a deep drawing.

Meanwhile, to make a biodegradable container, a thin film made of biodegradable plastic is coated on a surface of the biodegradable container of the technologies (7) or (8) made of either one of natural polysaccharide or protein, or either of the two materials that is chemically modified but still biodegradable.

In this technology, while the biodegradable plastic is provided as the thin water-resistant coating film, the container itself is made of natural polysaccharide or protein, etc. with enough thickness. On this account, the container is sufficiently water-resistant as well as biodegradable. Thus this technology is particularly promising among the disposal technologies by biodegradability using starch or protein, etc.

However, the technology (7) is an arrangement that the biodegradable plastic thin film simply coats the main body of the biodegradable container, and a concrete arrangement of the biodegradable container is hardly mentioned.

For instance, when the main body of the biodegradable container is mainly made of polysaccharide or protein, strength of the main body should be cared of, but the technology (7) does not explain about the strength at all, and also does not explain how the biodegradable plastic thin film is actually coated, for instance, by forming it by the coating method or by attaching preformed film, etc.

Moreover, the technology (7) does not stipulate the coating state of the biodegradable plastic thin film on the main body of the biodegradable container at all. The biodegradable plastic thin film coats the main body of the biodegradable container mainly made of polysaccharide or protein, to improve water resistance of the main body. But the technology (7) does not mention how the main body is coated, except that it is simply coated.

Even if the biodegradable container is used as a disposable one, the container should still have a stability and durability as a one-way container. So the biodegradable plastic thin film should not fall off from the main body of the biodegradable container. The coating state on the main body is an important factor, but no description with respect to this can be found in (7).

Furthermore, as already described, it is difficult to use biodegradable plastics for a thick molded article due to its slow biodegradability. The speed of the biodegradability also greatly depends on not only the thickness of the molded article but also a total amount of biodegradable plastics contained in the molded article. The technology (7) only describes that effectiveness of the biodegradability is improved if the main body of the biodegradable container is expanded, and there are no comments on a relationship between a degree of the expansion and the biodegradability, and a balance between the biodegradability of the biodegradable plastic and that of the main body of the biodegradable container. As a result, it is not possible to manage the biodegradability of the whole container favorably.

In the meantime, the technology (8) can be assumed to correspond to one of the manufacturing technologies of the biodegradable container disclosed in the technology (7). In this technology, a thermoplastic is dissolved in a solvent and coated on the surface of the main body of the biodegradable container. Then after the solvent is dried and volatilized, another coating thin film made of thermoplastic is laminated and bonded by thermo compression. That is to say, the technology (8) discloses that thermoplastic is used as an adhesive to bond the coating thin film (equivalent to the biodegradable plastic thin film) securely.

Now, as described in relation to technologies (3) to (5), when the thermoplastic dissolved in the solvent is used, problems than an equipment to prevent diffusion of the solvent is required. Moreover, an embodiment of the technology (8) uses chloroform as the solvent, which should be scattered in the air as little as possible. Thus, as in the case of the technology (5), a large-scale hermetic room and reclaiming device are required as the equipment above.

Also, the manufacturing process of the technology (8) acquires the main body of the biodegradable container by press-molding a sheet made of polysaccharide or protein that is preformed by a metal mold. Thus it is impossible to mold molded articles such as a container with deep drawing shape like a cup, or molded articles having irregular thickness like a food tray with partitions or a wrapping tray, and molded articles having complicated shape like cushioning materials for wrapping.

Other biodegradable containers or biodegradable molded articles are publicly known as follows;

(10) Japanese Translations of PCT International Laid-Open Patent Application No. WO-97/10293 (Tokuhyohei 11-512467; published on Mar. 20, 1997), (11) Japanese Translations of PCT International Laid-Open Patent Application No. WO-94/05492 (Tokuhyohei 8-500547; published on Mar. 17, 1994), and (12) Japanese Laid-Open Patent Application No. 6-125718/1994 (Tokukaihei 6-125718; published on May 10, 1994).

In addition, a method to fill polyurethane foam using a bag, that is, (13) Japanese Laid-Open Patent Application No. 63-54217/1988 (Tokukaisho 63-54217; published on Mar. 8, 1988), has been publicly known.

Also, it has been publicly known that depressure is carried out at vacuum molding of typical foamed plastic;

(14) Japanese Laid-Open Patent Application No. 52-134670/1977 (Tokukaisho 52-134670; published on Nov. 11, 1977), (15) Japanese Laid-Open Patent Application No. 54-127476/1979 (Tokukaisho 54-127476; published on Oct. 3, 1979), (16) Japanese Laid-Open Patent Application No. 55-73535/1980 (Tokukaisho 55-73535; published on Jun. 3, 1980), and (17) Japanese Laid-Open Patent Application No. 57-1712/1982 (Tokukaisho 57-1712; published on Jan. 6, 1982).

The present inventors have applied the invention relating to a method for manufacturing a biodegradable molded article including a simultaneous attaching process that a coating film is finally attached to a surface of the biodegradable molded article by using a slurry or dough molding material mainly made of starch or a derivative thereof and water added thereto and a coating film mainly made of biodegradable plastic and having at least hydrophobicity, heating the molding material and the coating film in the mold and molding the biodegradable expanded molded article into a specified shape through steam expansion, and at the same time heating, softening and press bonding the coating film (Refer to (9) Application No. WO 02/22353 A1 published on Mar. 21, 2002, PCT International Laid-Open Patent Application No. PCT/JP01/07903 dated Sep. 12, 2001, when was not published on the application date that is a basis of the priority claim of the present invention, and thereafter it was published.)

The above prior invention is an excellent one that can manufacture a biodegradable molded article having excellent biodegradability and water resistance and reduce manufacturing processes and time.

In the method of Patent (9), the molding material placed between the coating films is expanded inside a mold through steam expansion and presses the coating film against the mold. Steam occurring from the molding material is exhausted out of the mold through a canal-formed exhausting part formed at a joint part or a fitting part between mold halves of the mold from between the coating films. However, if an enclosed space is formed between the coating film and the mold, air is pooled and cannot be escaped. Therefore, pressing of the coating film against the mold stops when pressure by expansion of the molding material and the pressure of air pooled in the enclosed space is balanced. Moreover, the coating film is not expanded all over the mold and is not fit to the surface of the mold by air pooled in the enclosed space. Thus, the biodegradable molded article may not be shaped into the cavity of the mold by the air pooled in the enclosed space. Especially, this appears at a part where at least a certain area of both concave part and smooth surface continue. In the result, in the biodegradable molded article to be molded, desirable thickness was not obtained at the concave part of the mold or slight asperity appeared on a surface of the part where at least a certain area of smooth surface continues. Thus, the biodegradable molded article has insufficient strength and the biodegradable molded article having fine appearance and printability was not obtained.

In addition, in the invention of the reference (9), in case that the biodegradable molded article having a deep drawing shape such as a bowl-shaped container or a cup-shaped container is manufactured, the coating film is preformed in the substantially same shape as the outer shape of the biodegradable molded article or the coating film was divided into film pieces as the development elevation so that the it may be formed in the substantially same shape as the outer shape of the biodegradable molded article. Therefore, at least two processes were necessary to make the biodegradable molded article with deep drawing shape from the coating film.

DISCLOSURE OF THE INVENTION

The present invention takes the problems above into account, and hence the object is to provide a method and a mold to manufacture a biodegradable molded article having enough strength even with complicated shape, enough water resistance, a very excellent biodegradability, and an excellent surface smoothness, with ease and excellent accuracy of dimension.

To achieve the purpose above, is a method to manufacture a biodegradable molded article of the present invention comprises the steps of: preparing: a slurry or dough molding material mainly made of starch or a derivative thereof and obtained by adding water therewith; and a coating film mainly made of a biodegradable plastic and having hydrophobicity; and heating and molding the molding material and the coating film in a mold having a given-shaped cavity to mold the molding material through steam expansion, and at the same time soften and pressure-bond the coating film to a surface of a biodegradable expanded molded article obtained through steam expansion molding, wherein said mold has an exhaust hole; and in the heating and molding step, a gas existing between the coating film and a surface of the mold is discharged out of the cavity through the exhaust hole.

According to the method above, producing the slurry or dough molding material mainly made of starch and water mixed therewith, and steam-expansion molding of this molding material easily allow manufacture of a highly complicatedly shaped molded article, and make the molded article have more excellent strength compared with a conventional molded article made of starch, since the resultant biodegradable expanded molded article includes a certain amount of water.

According to the method above, since the coating film is mainly made of a biodegradable plastic having similar quality to common plastics and has at least hydrophobicity, it is possible to manufacture the biodegradable molded article having water resistance. Moreover, according to the method above, the coating film is pressure-bonded to a surface of the biodegradable expanded molded article by heating and molding in the mold, so it is possible to obtain the biodegradable molded article of which the coating film is substantially adhered to the surface and cannot be easily peeled off from the surface. It is thus possible to more steadily ensure water resistance of the biodegradable molded article.

In addition, according to the method above, the biodegradable expanded molded article has a very excellent biodegradability since it is foam with a large surface area and faster biodegrading reaction.

According to the method above, it is possible to make the biodegradable molded article in fewer processes and by an easy method, since steam expansion molding of the molding material and pressure bonding of the coating film are performed simultaneously.

Moreover, according to the method above, by providing an exhaust hole in the mold and discharging gaseous matter between the coating film and the surface of the mold out of the cavity through the exhaust hole at the time of heating and molding, adhesiveness of the coating film to the surface of the mold is improve. It is thus possible to obtain the biodegradable molded article with an excellent surface smoothness, thereby obtaining fine glossy surface and beautiful appearance. Also, such smooth surface makes beautiful printing with no color dulling or shear when printing is performed on the surface of the biodegradable molded article. In addition, improved adhesiveness of the coating film to the surface of the mold can make the biodegradable molded article having almost the same size as the design (almost the same size as the cavity of the mold) and realize an excellent accuracy of dimension.

In the method above, a space leading to the cavity through the exhaust hole may be formed inside the mold, in the heating and molding step, the space may be hermetically separated (isolated) from the outside of the mold. This can avoid deformation or tear of the coating film due to a rapid increase of inner pressure in the cavity in case of rapid molding or in case of using the coating film with low strength.

In the method above, the gas existing between the coating film and the surface of the mold may be discharged out of the mold through the exhaust hole in the heating and molding step. This can sufficiently discharge the gaseous matter existing between the coating film and the surface of the mold out of the cavity. In result, excellent accuracy of dimension is realized.

In the method above, the method to supply the molding material in the mold may be any one of the following methods;
(1) a method to place the molding material with the coating film in the mold
(2) a method to pour the molding material on the coating film before heating and molding after placing the coating film in the molded article
(3) a method to pour the molding material on the coating film after the coating film starts to be heated and molded in the mold.

Method (1) is the most convenient of these methods since the raw materials can be poured at one time.

To achieve the above purpose, the mold of the present invention is a mold to heat and mold a slurry or dough molding material mainly made of starch or a derivative thereof and obtained by adding water thereto through steam expansion, said mold being characterized in that said mold is made up of a plurality of mold parts that can fit together and form an internal given-shaped cavity, and each of said mold parts has an exhaust hole there through to discharge a gas in the cavity outside piercing through.

According to the arrangement above, since the exhaust hole is provided in each mold part, it is possible to discharge gaseous matter in the cavity to the outside through the above exhaust hole at the time of heating the molding, when the biodegradable expanded molded article is molded through steam expansion by heating the molding material inside the mold. This improves adhesiveness of the molded article to the surface of the mold, and the biodegradable molded article with excellent surface smoothness can be obtained. Therefore, it is possible to obtain the biodegradable molded article with fine glossy surface and good appearance. Also, such smooth surface makes fine printing with no color dulling and shear when printing is performed on the surface of the biodegradable molded article. In addition, improved adhesiveness of the coating film and the surface to the mold can make the biodegradable molded article having almost same size as the design (almost the same size as the cavity of the mold) and can realize an excellent accuracy of dimension.

According to the arrangement above, since the exhaust hole pierces in each of the mold parts, surface smoothness and accuracy of dimension of a flat area in the biodegradable molded article is improved, compared with the case that the exhaust hole is formed only at the joint part of the mold parts.

In addition, if an exhaust groove (groove-shaped exhaust) is provided on a side forming the cavity of the mold parts, the exhaust groove appears in relief on the surface of the biodegradable molded article. However, in the arrangement above, the exhaust hole pierces in each of the mold parts is used, the exhaust hole does not have any influence on the shape of the surface of the biodegradable molded article at all or if any slight but no practical influence.

It is preferable that for the mold of the present invention, the mold parts are made of a metal and an insulator is placed between the mold parts to insulate the mold parts from each other.

According the arrangement above, it is possible to heat the molding material through high-frequency dielectric heating or electroconductive heating using each of the mold parts as an electrode. Therefore, it is possible to uniformly heat the molding material in a short time and to obtain an excellent molded article in a short time. Also, according to the arrangement above, in case that the biodegradable molded article is manufactured by the above method, the coating film having the comparably low melting point can be used, since the coating film is not directly heated in the mold.

Another purpose of the present invention is to provide a method to manufacture a biodegradable molded article having a deep drawing shape such as a bowl-shaped container or a cup-shaped container with fewer processes.

The method to manufacture the biodegradable molded article in accordance with the present invention has a basic constituent that "comprising the steps of: preparing: a slurry or dough molding material mainly made of starch or a derivative thereof and obtained by adding water thereto; and a coating film mainly made of a biodegradable plastic and having hydrophobicity; and heating and molding the molding material and the coating film in a mold having a specific cavity to mold the molding material through steam expansion, and at the same time soften and pressure-bond the coating film to a surface of a biodegradable expanded molded article obtained through steam expansion molding", and is characterized in that "inside said mold of a deep drawing shape the molding material and the coating film is placed substantially flat for heating and molding to manufacture a biodegradable molded article of a deep drawing shape" to achieve the above purpose.

The above method has the above basic constituent and the same merit as that of the method using the mold equipped with the exhaust hole.

Namely, according to the method above, it is possible to easily mold a very complicatedly-shapes biodegradable molded article by preparing the slurry or dough molding material mainly made of starch and water mixed therewith and molding the molding material through steam expansion, and the resultant biodegradable molded article has a certain moisture content and more excellent strength compared with a conventional molded article made of starch.

Also, according to the above method, since the coating film is mainly made of a biodegradable plastic having a nature similar to a common plastic and has at least hydrophobicity, it is possible to manufacture a water-resistant biodegradable molded article.

Also, according to the method above, it becomes possible to manufacture the biodegradable molded article with fewer processes and easy method, since molding of the molding material through steam expanding and pressure-bonding of the coating film are simultaneously performed.

Additionally, according to the method above, since the coating film is pressure-bonded on the surface of the biodegradable molded article by heating and molding in the mold, the biodegradable molded article of which the coating film is substantially adhered to the surface can be obtained and the coating film hardly peels off from the surface of the biodegradable molded article. It is thus possible to more certainly secure water resistance of the biodegradable molded article.

Therefore, the above basic constituents make it possible to easily manufacture the biodegradable molded article having enough strength, enough water resistance and very excellent biodegradability even with a very complicated shape.

Moreover, according to the method above, since the coating film is placed substantially flat when pressure-bonding the coating film, a substantially flat or rolled film on the market can be used as is. Accordingly, a process to preliminarily mold the coating film can be omitted and the manufacturing process can be significantly simplified.

According to the method above, the coating film is placed substantially flat, so it becomes possible to supply the coating film easily and continuously by transporting with a roller or a clamp. Therefore, the biodegradable molded article of a deep drawing shape can be continuously produced.

In the specifications of the present invention, "a molded article of a deep drawing shape" has a concave shape having not less than 30 mm in depth and indicates a container that satisfies at least either one of; (1) that a gradient of a side against the center line (a line connecting the center of a bottom and the center of an opening) is not more that 30° at one point, or (2) that a horizontal to vertical ratio (vertical size/horizontal size) is not less than 0.3. A vertical size means a maximum outer dimension heightwise (along the center line) and a horizontal size means a maximum outer dimension in a direction perpendicular to the heightwise direction (along the diameter). Means a maximum outside dimension in a direction perpendicular to the vertical direction.

For a food container, a deep drawing shape usually corresponds to a shape named "glass", "cup", "bowl", "DONBURI", "WAN", while a concave container except for a deep drawing shape (hereinafter referred to as a shallow shape) corresponds to a shape called "tray", "flat plate", "round plate", and "square plate".

In the method above, the coating film is molded directly into a deep drawing shape by heating and pressure-bonding a substantially flat coating film in the mold without preliminary molding. Accordingly, the coating film should be largely drawn at the time of pressure bonding, compared with the case of molding the substantially flat coating film into a shallow shape such as a plate without preliminary molding or the case of molding the coating film into a deep drawing shape after preliminary molding. However, some varieties of biodegradable plastics cannot be largely drawn at the time of molding, in case that a biaxially stretched film with excellent heat resistance and gas impermeability is used as the coating film. Therefore, unless the heating conditions of the mold are optimized so that the coating film is fully drawn, there may be some defects such as a tear, a crack or a pinhole on the coating film.

Still another purpose of the present invention is to provide a method to manufacture a biodegradable molded article that can more steadily prevent some defects on the coating film and ensure water resistance more securely, especially in case that the biodegradable molded article especially of a deep drawing shape is manufactured using the substantially flat coating film.

Another method to manufacture a biodegradable molded article in accordance with the present invention has the above basic constituents, and to achieve the above purpose, is characterized in that a mold is made up of a pair of a convex mold and a concave mold being used, the molding material and the coating film is placed between the convex mold and the concave mold before the heating and molding, in the heating and molding step, a central part of the coating film is deformed by moving at least either one of the convex mold and the concave mold in a direction wherein these two molds fit together, and at least while the coating film is being deformed, a relative moving speed of the convex mold to a plane formed by connecting a surface of non-deforming parts on an outer periphery of the coating film is maintained from 8 mm/s to 12 mm/s.

According to the method above, speed of drawing the coating film by the convex mold is kept almost consistent and at the optimum speed. So, especially in case that the biodegradable molded article of a deep drawing shape is manufactured using the substantially flat coating film, it is possible to avoid a tear, crack and a pinhole on the coating film. Since the biodegradable molded article is coated by the coating film more securely, it is possible to more steadily ensure water resistance of the biodegradable molded article.

In the method above, it is preferable that the convex mold and the concave mold are straightly moved closer to each other at least while the coating film is deformed.

According to the method above, for example, compared with the case that one side of the convex mold and one side of the concave mold are connected by a hinge to turn the convex mold, pressure applied to the coating film by the convex mold becomes more uniform. Therefore, especially if a biodegradable molded article of a very deep drawing is manufactured or if more complicatedly-shaped biodegradable molded article is manufactured, the coating film can be drawn evenly and thickness of the coating film becomes uniform. Accordingly, effect by the coating film, that is, improvement of water resistance of biodegradable molded article is further enhanced.

Also, in the method above, it is preferable to move both convex mold and concave mold to approximate each other at least until the coating film starts to deform.

According to the method above, since both convex mold and concave mold are moved to approximate each other at least until the coating film starts to deform, it is possible to reduce time necessary to fit the convex mold in the concave mold (fitting time), thereby shortening manufacturing time.

Also, another method to manufacture a biodegradable molded article in accordance with the present invention has the above basic constituents and to achieve still another purpose of the present invention, it is characterized in that said heating is done so that the mold has a temperature not less than a softening point of the coating film and at least 10° C. lower than a melting point thereof.

According to the method above, by making temperature of the mold at least 10° C. lower than the melting point of the coating film, the coating film is softened without melting and molded into the shape corresponding to the mold. It is thus possible to avoid a pinhole on the coating film especially in case that the biodegradable molded article of a deep drawing shape is manufactured using the substantially flat coating film. Accordingly, the biodegradable expanded molded article is coated by the coating film more securely, which can further ensure water resistance of the biodegradable molded article.

In the method above, it is preferable that the heating is done so that the mold has a temperature not less than 130° C.

According to the method above, since the molding material can be fully heated and molded through steam expansion, it is possible to reduce steam expansion molding time, to improve the conditions of steam expansion, and to obtain the biodegradable expanded molded article having even and dense structure. Consequently, it is possible to reduce the manufacturing time and to improve characteristics of the resultant biodegradable molded article, including strength.

In the method above, it is more preferable that the heating is done so that the mold has a temperature not less than 150° C.

According to the method above, since the molding material can be more fully heated and molded through steam expansion, it is possible to further reduce the steam expansion molding time, to further improve the conditions of steam expansion and to obtain the biodegradable expanded molded article having more even and dense structure. Consequently, it is possible to further reduce the manufacturing time and to further improve characteristics of the resultant biodegradable molded article, including strength.

In addition, in each of the methods above, it is preferable that before the above heating and molding, a slip agent (lubricant) is applied on the surface of the mold contacting the coating film.

According to the method above, contact friction can be reduced between the surface of the coating film and the surface of the mold, thereby avoiding damages including a tear or a crack on the coating film due to friction with the mold when the coating film is drawn by the mold.

In the specifications of the present invention, the "slip agent" means an agent used to reduce contact friction between the surface of the coating film and the surface of the mold after molding and prevent adhesion to the mold so that the resultant biodegradable molded article may be easily removed from the mold, and it is not limited to what it calls "a lubricant".

It is preferable that the above slip agent is a fluoroplastic layer formed on the surface of the mold.

The above method has advantages described below, compared with the case that liquid slip agent is applied on the surface of the mold contacting the coating film or the case that a levigated slip agent (inorganic particles etc.) is adhered to the surface of the mold contacting the coating film.

Namely, if the liquid slip agent is applied or if the levigated slip agent is adhered, the slip agent comes off the surface of the mold at the time of molding and should be applied every molding. On the other hand, in the above method, since the fluoroplastic layer is formed on the surface of the mold as the slip agent, the slip agent does not come off the surface of the mold and can be used for a long time. Accordingly, it is possible to reduce labor to apply the slip agent on the surface of the mold.

In case that a liquid agent is applied or a levigated slip agent is adhered, the slip agent is adhered on the surface of the biodegradable molded article at the time of molding, so the slip agent should be removed from the surface of the biodegradable molded article after molding. On the other hand, in the above method, since the slip agent is not adhered on the surface of the biodegradable molded article during molding and does not stain it, labor to remove the slip agent from the surface of the biodegradable molded article after molding can be saved.

Other and further objects, features and advantages of the present invention will appear more fully from the following description. Also, the merits of the present invention will be apparent from the following description taken in connection with the accompanying drawings.

BRIEF DESCRIPTION OF THE DRAWINGS

FIG. 14 (b) is a schematic plan view showing an example of a coating film cut into three as a film part.

FIG. 23 (*a*) shows when the coating film starts to deform and FIG. 23 (*b*) shows the course of deforming the coating film.

BEST MODES FOR CARRYING OUT THE INVENTION

Embodiment 1

An embodiment of the present invention is described below in accordance with FIGS. 1 to 18. By the way, the present invention is not limited to this embodiment.

First, a biodegradable molded article manufactured by a method of the present invention is described.

The biodegradable molded article manufacture by a method of the present invention contains a biodegradable expanded molded article of a specific shape obtained by molding a molding material through steam expansion, and a coating film attached to a surface thereof, said coating film being mainly made of a biodegradable plastic and having at least hydrophobicity.

In the above biodegradable molded article, it is preferable that a ratio of volume of air phase included in the biodegradable expanded molded article is more than 30 volume % of total volume of the biodegradable molded article. This increases a surface area of the biodegradable expanded molded article and helps to bring in microorganisms biodegrading the biodegradable expanded molded article. Thus, the biodegradable expanded molded article is easily biodegraded, thereby further improving biodegradability of the biodegradable molded article.

In the description below, the biodegradable expanded molded article is sometimes abbreviated to "expanded molded article". "Slurry" means a condition having sufficient fluidity at least with water added to starch. Accordingly, starch is not necessarily dissolved in water and may be close to a suspended condition. In the meantime, "Dough" means less fluidity than the slurry and may be close to a semi-solid condition.

Figure 2:
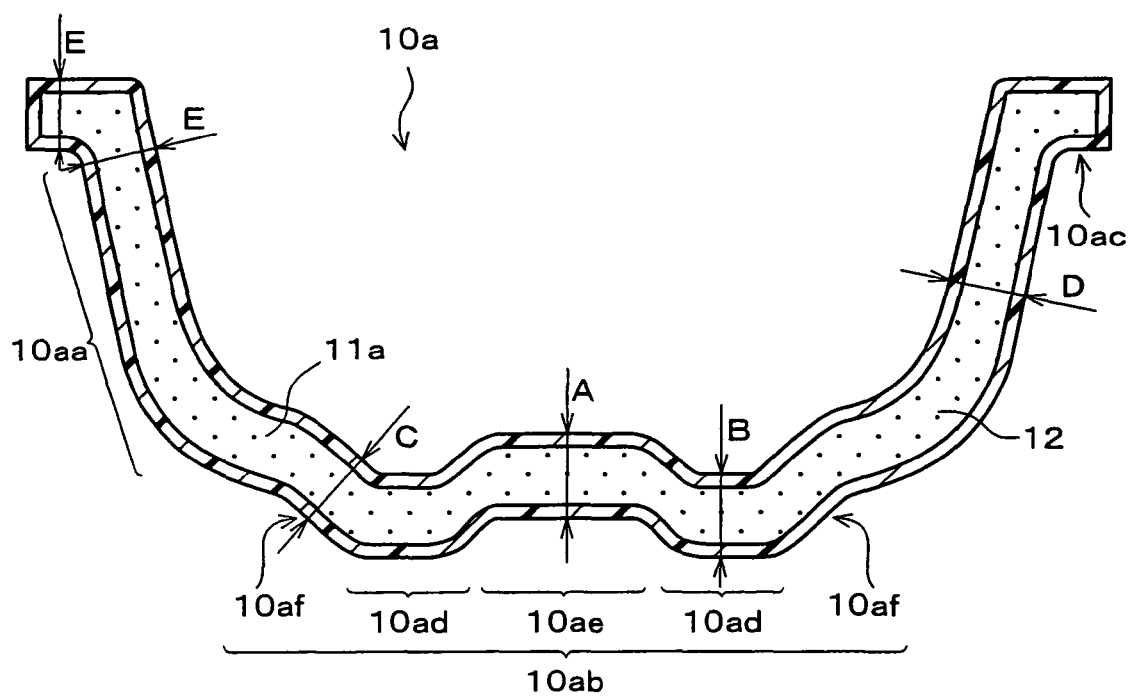
FIG. 2 is a schematic cross-sectional view showing a shape of a bowl-shaped container as an example of a biodegradable molded article manufactured by a method of the present invention.

An example of the biodegradable molded article is a container shaped into a bowl (hereinafter, referred to as a bowl-shaped container) that is a biodegradable molded article of a deep drawing shape. As shown in FIG. 2, the bowl-shaped container 10*a* has a main body 11*a* of the biodegradable expanded molded article, and the coating film 12 directly and substantially attached to the main body 11*a* to coat the surface thereof.

The bowl-shaped 10*a* has a side wall 10*aa* of upwardly enlarging truncated cone shape, a bottom 10*ab* formed at a lower end of the side wall 10*aa*, and an outwardly extending ring-shaped flange 10*ac* provided at an upper end of the side wall 10*aa*. On the bottom 10*ab*, a foot 10*ad*, that is, a convex part of the ring shape is formed, so a concave part 10*ae* and a concave part 10*af* are formed at the inside and outside of the foot 10*aa* on the bottom 10*ab*, respectively.

Figure 3:
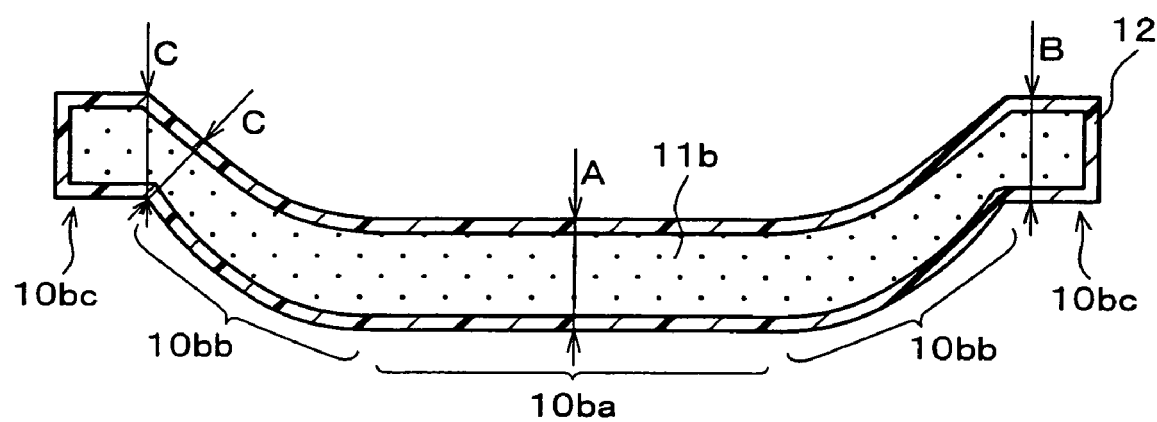
FIG. 3 is a schematic cross-sectional view showing a round plate-shaped container as another example of a biodegradable molded article manufactured by a method of the present invention.

Another example of the biodegradable molded article is a container of a round plate shape (hereinafter referred to as the round plate-shaped container). As shown in FIG. 3, the round plate-shaped container 10*b* also consists of the main body 11*b* and the coating film 12.

The round plate-shaped container 10*b* has a plate-shaped bottom 10*ba*, a curved part 10*bb* extended from the bottom 10*ba* and smoothly curved upwardly, and an outwardly extending ring-shaped flange 10*bc* provided at an upper end of the curved part 10*bb*.

Figure 4:
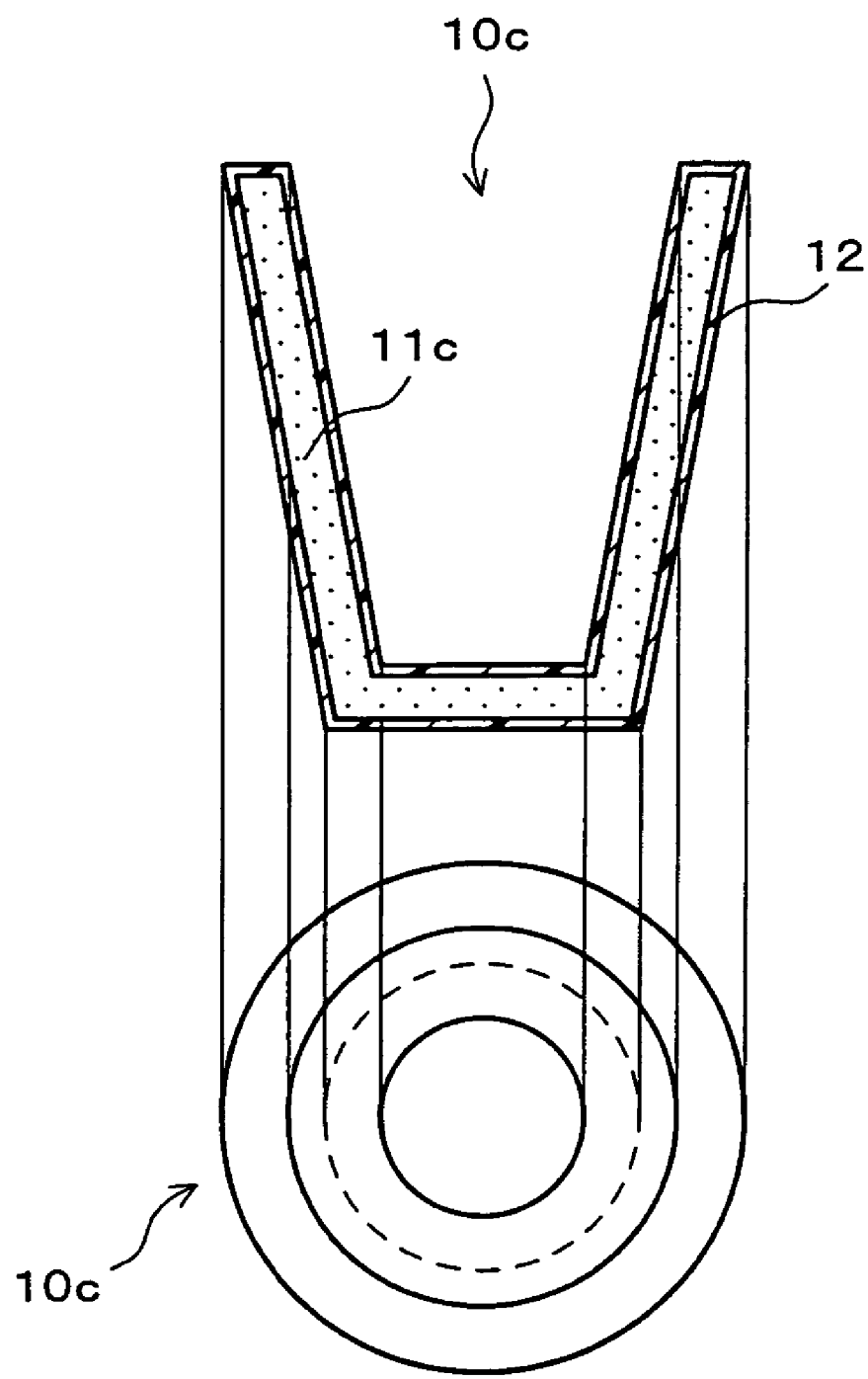
FIG. 4 is a schematic cross-sectional view and a schematic plan view showing a shape of a cup-shaped container as still another example of a biodegradable molded article manufactured by a method of the present invention.

Still another example of the biodegradable molded article is a container of a cup shape (cup-shaped container) which is a biodegradable molded article of a deep drawing shape. As shown in FIG. 4, the cup-shaped container 10*c* also consists of the main body 11*c* of the biodegradable expanded molded article and the coating film 12. In FIG. 4, the upper drawing is a longitudinal sectional view of the cup-shaped container 10*c*. The lower drawing is a plan view (a drawing looking down the cup-shaped container 10*c*) corresponding to the upper drawing.

As described below, the entire surface of the main body 11*a* is not necessarily coated with the coating film 12. It may be coated partly.

A method to manufacture a biodegradable molded article in accordance with the present invention is a method to use a slurry or dough molding material mainly made of starch and a derivative thereof and obtained by mixing water therewith, and a coating film 12 mainly made of a biodegradable plastic and having hydrophobicity, to mold through steam expansion by heating and molding the molding material and the coating film in the mold, and at the same time, to soften and pressure-bond the coating film on a surface of the expanded molded article obtained through steam expansion molding.

A method to manufacture the biodegradable molded article in accordance with the present invention is a method to attach the coating film 12 directly to the expanded molded article simultaneously with the steam expansion molding of the molding material. This method has the following merits compared with a method to attach the coating film using an adhesive after pre-molding the molding material into the expanded molded article of a specific shape through steam expansion (hereinafter referred to as after attaching method).

The first merit is to reduce the number of manufacturing processes. Namely, this method can attach the coating film 12 in one process at a minimum and can reduce the number of processes compared with the above after attaching method requiring at least two processes. Also, since it is possible to attach by one process, it can shorten time necessary for production, thereby enhancing production efficiency of the biodegradable molded article in accordance with the present invention.

The second merit is that it not necessary to use an attaching mold. Namely, the coating film 12 is attached at the same time when the expanded molded article (main body 11*a*) is molded by a mold (metal mold 20*a*). Therefore, it is possible to reduce the cost and space of manufacturing equipment since there is no need of attaching equipment including the above attaching mold.

The third merit is that it is not necessary to use an adhesive. Accordingly, it is possible to hold down raw material cost of the adhesive and at the same time to enhance the content ratio of starch included in the biodegradable molded article obtained without using the adhesive.

The fourth merit is that in this method, the coating film 12 is formed directly on a surface of the expanded molded article (main bodies 11a and 11b) and is substantially and cohesively attached to the expanded biodegradable molded article substantially cohesively, which leads to steady attaching condition of the coating film 12.

In the method of the present invention, the coating film is attached at a temperature between the softening point (temperature when softening starts) of a biodegradable plastic that is a main ingredient of the coating film and less than the melting point thereof simultaneously with steam expansion molding of the molding material. Accordingly, the coating film 12 faces the expanded molded article during expansion molding process in heated and pressurized condition. In softening condition, the coating film 12 is pressurized from the outside by the mold, and from the inside by the expanded molded article during expanding and molding process. In result, the coating film 12 is fused and adhered to a surface of the expanded molded article.

In a section of the resultant biodegradable molded article, a boundary surface between a layer of the coating film 12 and a surface of the expanded molded article 11 is not smooth as the case of the simple attaching method (after attaching method). For example, the boundary surface becomes uneven and irregular surface, and the coating film becomes sufficiently adhered to the expanded molded article 11. In result, attaching condition of the coating film 12 becomes very strong, and the steadiness is the same as the case with an adhesive layer. Accordingly, it is possible to further improve water resistance and gas impermeability of the resultant biodegradable molded article.

In addition, the boundary surface between the layer of the coating film 12 and the surface of the expanded molded article 11 may have various shapes depending on components of the coating film 12 and the expanded molded article 11, or manufacturing conditions.

Generalizing the four merits, the manufacturing method of the present invention can manufacture the biodegradable molded article more efficiently and at lower cost than the after attaching method, thereby offering the biodegradable molded article at lower price. Consequently, it is possible to more easily use the biodegradable molded article in accordance with the present invention for disposal purpose.

Next, the molding material used in the present invention is described. The molding material used for the present invention is mainly made of starch or a derivative thereof and obtained by mixing water therewith.

Starch used as the main material of the molding material is not limited to any particular type. For instance, starch easily acquired from agricultural products worldwide as major cereals, such as potato, corn, tapioca, rice, wheat, sweet potato, etc. can be preferably used. The starch above may be either produced from a particular agricultural product or a mixture of starch produced from more than one agricultural product.

Also, a derivative of the starch is a derivative that chemically modified but still biodegradable, more specifically, such as α-starch, cross linked starch, and denatured starch. Moreover, a mixture of unmodified starch and a derivative of the starch can be used. Thus in a broad sense, the starch in the present invention includes unmodified starch (starch in a narrow sense), a derivative thereof, and a mixture of these two. So, in the description below, "starch" indicates the starch in a broad sense, unless particularly noticed.

It is preferable that a percentage of starch content is between 50 weight % and 100 weight % if a total amount of the main solid matter of the molding material is taken as 100 weight %. In addition, it is preferable that a percentage of starch content is between 20 weight % and 70 weight % if the total molding material containing added water is taken as 100% When the starch content falls in the ranges above, the main material of the biodegradable molded article in accordance with the present invention can be regarded as starch, so good biodegradability can be expected. By the way, in the specification of the present invention, starch as the main ingredient and an extending agent as an extending additive among various additives are collectively referred to as "main solid matter".

Apart from the above starch the molding material may include various additives. More specifically, the additives are such as extending agent, strength adjusting agent, plasticizer, emulsifier, stabilizer, homogeneity adjusting agent, moisture retaining agent, handling adjusting agent, conductivity adjusting agent, dielectric loss adjusting agent, swelling agent, coloring agent, etc.

Some additives are beneficial in the manufacturing process, such as improving production efficiency of the biodegradable molded article or avoiding problems in the manufacturing process, and others are advantageous for the biodegradable molded article as a finished product, such as improving quality of the resultant biodegradable molded article and cutting costs thereof. The type of these additives is not limited, unless significantly lowering quality of the expanded molded article or the biodegradable molded article.

The extending agent is an additive added to the molding material to increase the bulk of the molding material and decrease the amount of starch as the main ingredient as much as possible, to cut costs. Therefore, a substance used as the extending agent is not limited to any particular one as long as cheaper than starch, but by-products of processing and manufacturing of foods, etc. are preferably used, to dispose the wastes simultaneously.

More specifically, what can be used are:
(1) a remained juice, residue of squeezing, that are produced in food (food and drink) processing and manufacturing using vegetables and fruits such as celery, carrot, tomato, citrus fruits (mandarin orange, lemon, grapefruit, etc.), apple, grape, berries, pineapple, sugarcane, sugar beet, etc., and any mixture thereof;
(2) by-products of a manufacturing processed foods using cereals, such as bean curd lees and tofu;
(3) sake lees, shouchu lees, beer yeast lees, wine yeast lees, etc. that are produced in processes of producing liquors such as sake, shochu, beer, wine, etc., and any mixture thereof;
(4) residues of used luxury drinks such as coffee, black tea, barley tea, green tea, oolong tea, etc., tea dregs and any mixture thereof;
(5) oil cakes remained after squeezing oil from soybean, corn, rapeseed, sesame, etc., and any mixture thereof;
(6) residues produced in a process to polish cereals such as wheat bran, rice bran, rice husks, etc., and any mixture thereof;
(7) by-products produced in a process to produce starch such as gluten meal, etc.;

(8) baking residues produced in a process of manufacturing sweets and bread such as a cone cup, biscuit, wafer, waffle, and any mixture thereof;

(9) the aforementioned by-products etc. being dried or crushed.

Either one of the substances or any mixture thereof may be used.

The strength adjusting agent is an additive to adjust (especially enhance) strength of the expanded molded article and the biodegradable molded article. Although the type of the agent is not limited to any particular substance, what are taken as the concrete examples are, for instance:

the aforementioned by-products (1) to (9) taken as the extending agents;

(10) saccharide such as glucose, dextrin, isomerized saccharide, etc., and any mixture thereof;

(11) sugar-alcohols such as sorbitol, mannitol, lactitol, etc., and any mixture thereof;

(12) fats and oils such as vegetable fat and oil, animal fat and oil, processed fat and oil made thereof, etc., and any mixture thereof;

(13) waxes such as carnauba wax, candelilla wax, bees wax, paraffin, microcrystalline wax, and any mixture thereof;

(14) thickener polysaccharide (microbe producing polysaccharide or vegetable polysaccharide, etc.) such as xanthan gum, gellan gum, guar gum, locust bean gum, pectin, gum Arabic, karaya gum, tara gum, carrageenan, furcellaran, agar, alginate, and salts thereof, and any mixture thereof;

(15) chlorides of metals, such as calcium, sodium, potassium, aluminum, magnesium, and iron; sulfates, organic acid salts, carbonates, hydroxides, phosphates, and other salts of these metals; and any mixture thereof;

(16) insoluble minerals such as quartz powder, diatomaceous earth, talc, silicone, etc., and any mixture thereof;

(17) vegetable fibers and their derivatives such as cellulose, microcrystalline cellulose, paper, pulp (used pulp, virgin pulp), carboxymethyl cellulose, methyl cellulose, acetyl cellulose, etc., and any mixture thereof.

(18) structures of inorganic substances such as glass, metal, carbon, ceramic, fibers thereof, etc.

(19) natural materials such as a shell, bone powder, eggshell, leaf, wood powder, etc., and any mixture thereof;

(20) calcium carbonate, carbon, talc, titanium dioxide, silica gel, aluminum oxide, non-fiber filler, etc., and any mixture thereof;

(21) fatty acid (stearic acid, lactic acid, lauric acid, etc.), or salts such as metal salts thereof, etc., fatty acid derivatives such as acid amide, ether, etc., and any mixture thereof;

(22) other food additives such as glycerin, polyglycerin, propylene glycol, ethylene glycol, glycerin fatty acid ester, polyglycerin fatty acid ester, propylene glycol fatty acid ester, sugar ester, lecithin, sorbitan fatty acid ester, polysorbate, etc., and any mixture thereof;

(23) natural resins such as shellac, rosin, sandarac resin, gutta-percha, dammar resin, etc., and any mixture thereof;

(24) biodegradable resins such as polyvinyl alcohol and polylactic acid, etc., and any mixture thereof;

(25) acetyltributyl citrate, solution of zirconium salt, alkali solution of ammonium zirconium carbonate, and any mixture thereof. Either one of the substances above or any mixture thereof may be used.

The plasticizer is an additive to improve fluidity of the molding material and gives flexibility to the resultant expanded molded article and the biodegradable molded article. Although the type of the plasticizer is not limited to any particular substance, what are taken as the concrete examples are, for instance:

the aforementioned by-products (1) to (9) taken as the extending agents;

the aforementioned compounds (10) to (21), (23) and (24) that are taken as the strength adjusting agents;

(26) acetylpolybutyl citrate, or sugar-alcohols such as glycerin, polyglycerin, propylene glycol, ethylene glycol, etc., and any mixture thereof.

Either one of the substances above or any mixture thereof may be used.

The emulsifier is an additive to mix an oily additive adequately and emulsify the additive to be an oil-drop-in-water shape, provided that the oily additive is added to the molding material. Although the type of the emulsifier is not limited to any particular substance, what are taken as the concrete examples are, for instance:

(27) surface active agents such as glycerin acid ester, polyglycerin acid ester, propylene glycol fatty acid ester, sugar ester, sorbitan acid ester, lecithin, polysorbate, etc., and any mixture thereof.

The stabilizer is an additive to stabilize the state of the prepared molding material. Although the type of the stabilizer is not limited to any particular substance, what are taken as the concrete examples are, for instance: starch (in a narrow sense, not modified) as the main material and a derivative thereof; and the substances taken as the strength adjusting agents such as (10) saccharide, (11) sugar alcohol, (14) thickener polysaccharide, (17) vegetable fibers and a derivative thereof (except paper), and (21) fatty acid, fatty acid salts, and a derivative of fatty acid etc. Either one of the substances above and any mixture thereof may be used.

The homogeneity adjusting agent is an additive to make homogeneity in the slurry or dough molding material, that is, "grain" of the slurry or dough molding material (in this case, grain, etc. of a solid matter in the slurry or dough material) as fine, smooth and homogeneous as possible. Although the homogeneity adjusting agent is not limited to any particular type, what are taken as the concrete examples are, for instance:

Starch (in a narrow sense, not modified) as the main material, or a derivative thereof; the aforementioned by-products (1) to (9) taken as the extending agents;

the aforementioned components (10) to (25) taken as the strength adjusting agents.

either one of the substances above and any mixture thereof may be used.

The moisture retaining agent makes the expanded molded article contain a certain amount of water, and has the same effect as the plasticizer. That is to say, if the expanded molded article mainly made of starch includes a certain amount of water (if moisture is retained), while brittleness of α-starch is decreased, strength and flexibility thereof are improved. Thus the moisture retaining agent can be used as a plasticizer and a strength adjusting agent as well.

The type of the moisture retaining agent is not limited to any particular substance either. What are taken as the concrete examples are, for instance:

the starch (in a narrow sense, not modified) as the main material and the derivative thereof;

the aforementioned by-products (1) to (9) taken as the extending agents; and the substances taken as the strength adjusting agents such as (10) saccharide, (11) sugar alcohol, (12) fats and oils,

(13) waxes, (14) thickener polysaccharide, (15) metallic salts, (17) vegetable fibers and their derivatives, (19) natural materials such as a shell, bone powder, eggshell, leaf, wood powder, etc., and (22) food additives.

Either one of the substances above or any mixture thereof may be used.

The handling adjusting agent works as a slurry adjusting agent and an additive to improve handling of the slurry or dough molding material. Although the handling adjusting agent is not limited to any particular substance, all materials and compounds taken as the plasticizer, emulsifier, and stabilizer can be used. Either one of the substances above or any mixture thereof may be used.

The conductivity adjusting agent is an additive to adjust dielectric constant of the molding material, which is one of the factors to control the heating state in case of internal heating as described later, especially in case of heat molding using internal heat generated by electric heating, when the expanded molded article is molded. Although the conductivity adjusting agent is not limited to any particular type, what are taken as the concrete examples are, for instance:

the substances taken as the strength adjusting agents such as (12) fats and oils; (13) waxes; (14) thickener polysaccharide; and (15) metallic salts; and (28) water soluble electrolytes such as salts, acid, alkali, alcohol, etc.

Either one of the substances above or any mixture thereof may be used.

The dielectric loss adjusting agent is an additive to adjust a dielectric loss of the molding material, which is one of the factors to control the heating state especially in case of heating and molding through internal heat generated by high frequency dielectric heating, when the expanded molded article is molded. Although the dielectric loss adjusting agent is not limited to any particular, what are taken as the concrete examples are, for instance:

the substances that are taken as the strength adjusting agents such as (12) fats and oils; (13) waxes; (15) metallic salts; (16) insoluble minerals; and (17) vegetable fibers and their derivatives;

the substances taken as the dielectric constant adjusting agent such as (28) water soluble electrolytes; and (29) compounds including zirconium salt such as zirconium salt, solution of ammonium zirconium carbonate, etc., and any mixture thereof.

Either one of the substances above or any mixture thereof may be used.

The swelling agent is an additive to adjust the degree of expansion of the molding material and to further help swelling to form the expanded molded article having an appropriate shape for the use. Although the swelling agent is not limited to any particular substance, what are taken as the concrete examples are, for instance:

(30) organic swelling agents such as benzenesulfonyl hydrazine compounds, azonitryl compounds, nitroso compounds, diazo acetamide compounds, azocarboxylic acid compounds, etc. and formulations including these agents;

(31) ammoniacal swelling agents such as espata, etc. and formulations including these agents;

(32) inorganic swelling agents such as sodium bicarbonate, ammonium alum hydrogen tartaric acid, magnesium carbonate, etc. and formulations including these agents;

Either one of the substances above and any mixture thereof may be used.

The coloring agent is an additive to color the whole expanded molded article. Although the coloring agent is not limited to any particular substance, what are taken as the concrete examples are, for instance:

(33) inorganic pigments such as carbon black, etc.;

(34) natural or synthetic organic dyes such as colorants specified by a color index;

(35) colorants made of natural materials such as caramel, cacao powder, etc.

Either one of the substances above or any mixture thereof may be used.

Among the additives in the molding material, it is preferable that the content of the extending agent (that may be termed as an extending additive) is not more than starch contained in the main solid matter of the molding material.

In the molding material of the present invention, water mixed with starch of the main ingredient or a derivative thereof, is not limited to any particular type if it is water for industrial use.

The amount of added water in the above molding material is between 20 weight % and 70 weight %, preferably between 25 weight % and 55 weight %, assuming that the molding material is taken as 100 weight %. Also, provided that various additives (functional additives) excluding the main solid matter (starch as the main material and extending agent) and the extending agent (extensional additive) are collectively termed material ingredients and total amount of the material ingredients in the molding material is taken as 100 weight %, the amount of added water in the molding material is between 25 weight % and 230 weight %, preferably between 33 weight % and 120 weight %.

When the content of added water in the molding material is within the above range, the molding material is in slurry or dough state. If the content of water in the molding material is less than 20 weight %, the molding material is scarcely fluid because of too small water content, which is not preferable in terms of molding. On the other hand, if the content of water is more than 70 weight %, the content of the solid matter in the molding material becomes too low because of too large water content, which is not preferable in terms of molding.

When the molding material is in slurry or dough state, moldability is improved since it becomes easy to make the molding material fill a cavity of the mold, as described later. It also becomes possible to make the expanded molded article after molding contain a certain amount of water, and flexibility of the expanded molded article can be improved.

Next, the coating film 12 used in the present invention is described.

The coating film 12 is mainly made of biodegradable plastic and has hydrophobicity, that is, can impart water resistance to the expanded molded article and can be softened and fused by heating. In addition, it is more preferable that the coating film 12 imparts gas impermeability, heat insulation, abrasion resistance, improved strength, and flexibility. Especially, when the biodegradable molded article in accordance with the present invention is used for a highly hermetic storage container, a gas impermeable coating film is highly preferable, since oxidation of, and moisture absorption by, the contents inside the container must be avoided.

The material of the coating film 12 is not specifically limited as long as it is biodegradable and can impart water resistance and preferably gas impermeability to the expanded molded article after the film 12 is attached to the surface thereof.

More specifically, what are used as the materials are those conventionally known as biodegradable plastics such as 3-hydroxybutyric acid-3-hydroxyvaleric acid copolymer, poly-p-hydroxybenzaldehyde (PHB), polybutylene succinate (PBS), polycaprolactone (PLC), acetylcellulose (PH) polymer, polyethylene succinate (PESu), polyester amide, modified polyester, polylactic acid (PLA), Mater-Bi (trademark of Novamont in Italy: having starch as the major component and biodegradable polyvinyl alcohol resin and aliphatic polyester resin as the minor components), cellulose, and chitosan composite, etc. Either one of the materials above or any mixture thereof may be used. Also, accessory materials such as a biodegradable plasticizer, filler, etc. may be added to the biodegradable plastics.

It is preferable that the material of the coating film 12 is modified polyester (where a structural unit easier to biodegrade than polyester itself is inserted in a principal chain of polyester). Especially, sulfonic acid metallic salt is preferably inserted in a principal chain of aromatic saturated polyester. Also, biaxially stretched biodegradable film is preferably used as the coating film 12 due to its excellent strength, heat resistance, and gas impermeability. Accordingly, double-axially denatured polyester is the most preferable as the coating film 12.

In addition, the coating film 12 may be made by mixing starch to each of the above materials (biodegradable plastics). In this case, a mixing ratio of the biodegradable plastic to starch is not specifically limited unless various functions such as hydrophobicity of the coating film 12 are degraded. For example an approximate mixing ratio of 1 to 1 by weight is preferably used.

Moreover, various additives are added to the coating film 12, for example, colorants, additives for improving water resistance or gas impermeability, additives for improving various characteristics of softening at the time of attachment. However, additives are not limited to any particular type.

Thickness of the coating film 12 (film thickness) is not specifically limited if it is a film or a sheet within the range between 0.01 mm and a few millimeters before attaching to the expanded molded article.

In addition, since the coating film 12, as described below, is heated, softened and attached to the surface of the expanded molded article, it becomes thinner than the above range after attachment. Thickness of the coating film 12 after attachment is set so that the coating film 12 may exert water resistance and gas impermeability, depending on the type of biodegradable plastics as the raw materials. The thickness is not specifically limited, but preferably the maximum limit is not more than 80 •m, more preferably not more than 50 •m. The minimum limit may be set so that the coating film 12 may exert water resistance and gas impermeability as described above, In general, the minimum limit is preferably not less than 5 •m.

Weight of the coating film 12 is preferably less than 40 weight % of total weight of the biodegradable molded article. Accordingly, it is preferable to set the thickness of the coating film 12 to satisfy this weight ratio. By minimizing amount of biodegradable plastics of relatively slow biodegrading speed, it is possible to exert a very excellent biodegradability as the whole biodegradable molded article.

The method to manufacture a biodegradable molded article in accordance with the present invention is a method to mold a biodegradable expanded molded article and the coating film 12 by pouring, heating and pressurizing the molding material and the coating film 12 inside the mold, wherein an exhaust hole having a specific-shaped cavity (substantially same shape as the biodegradable molded article) is provided, and after placing the coating film 12 in the mold, gaseous matter between the coating film 12 and the surface of the mold is exhausted through the exhaust hole out of the cavity.

It is preferable that the mold consists of two or more dividable mold parts so that they can form a cavity matching with a shape of a desirable molded article inside by fitting the mold parts together and also the expanded molded article can be removed after molding, and that an exhaust hole to discharge gaseous matter inside the cavity outward is pierced in each of the mold parts. And in case that the biodegradable container is manufactured as a biodegradable expanded molded article, the mold consisting of a concave mold part and a convex mold part to be fit together is preferably used.

Figure 5A:
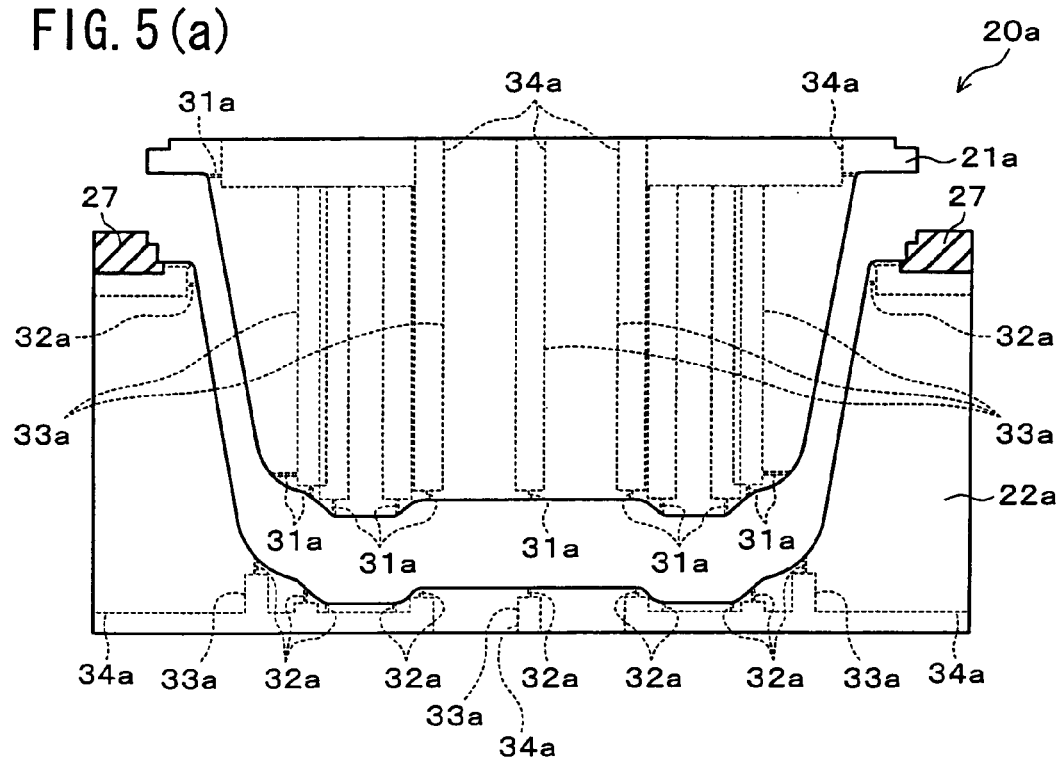
FIG. 5 (a) and FIG. 5 (b) are schematic cross-sectional views showing an example of a structure of a mold to mold the bowl-shaped container shown in FIG. 2.

An example of the mold consisting of the concave mold part and the convex mold part is a mold 20a consisting of a pair of a metal convex mold part 21a a metal concave mold part 22a shown in FIG. 5(a) for a bowl-shaped container.

The metal mold 20a, as shown in FIG. 5 (b), forms a cavity 25a corresponding to a shape of a desirable expanded molded article (refer to FIG. 2) inside with the convex mold part 21a and the concave mold part 22a fit together. By using the metal mold 20a and placing the molding material inside the cavity 25a between two coating films 12 using the metal mold 20a, the bowl-shaped container 10a shown in FIG. 2 is obtained.

Exhaust holes 31a and 32a to discharge gaseous matter inside the cavity 25a outward pierce in each of the concave mold part 21a and the convex mold part 22a. As shown in FIGS. 5 (a) and 5 (b), the exhaust holes 31a and 32a are provided on each of the positions corresponding to an upper end of a side wall 10aa, a lower end of a side wall 10aa, a concave part 10af, an outer end of a foot 10ad, an inner end of the foot 10ad, an outer end of a concave part 10ae, a center of a concave part 10ae. The exhaust holes 31a and 32a are connected to the outside of the metal mold 20a through an outlet 34a provided at a place other than a cavity forming part (a surface surrounding a cavity 25a) on the surface of the convex mold part 21a and the concave mold part 22a.

An insulator 27 to insulate the convex mold part 21a and the concave mold part 22a is provided at the fitting part (contacting part b) of the convex mold part 21a and the concave mold part 22a constituting the metal mold 20a, which forms an electric field inside the metal mold 20a using the convex mold part 21a and the concave mold part 22a as an electrode and makes internal heating by electric conduction and internal heating by dielectric heating (for example high-frequency dielectric heating) possible. Accordingly, as mentioned below, it is possible to apply high-frequency dielectric heating by connecting a high-frequency power supply to the convex mold part 21a and the concave mold part 22a.

Another example of the mold consisting of the convex mold part and the concave mold part is a metal mold 20b for molding a round plate-shaped container consisting of a pair of metal convex mold part 21b and a metal concave mold part 22b shown in FIG. 6 (a).

The metal mold 20b, as shown in FIG. 6 (b), forms a cavity 25b inside corresponding to a shape of a desirable expanded molded article (refer to FIG. 3) with the concave mold part 22b and the convex mold part 22b fit together (combined). By using the metal mold 20b, placing the molding material inside the cavity 25b between two coating films 12, and heating and pressurizing, a round plate-shaped container 10b shown in FIG. 3 is obtained.

Figure 6A:
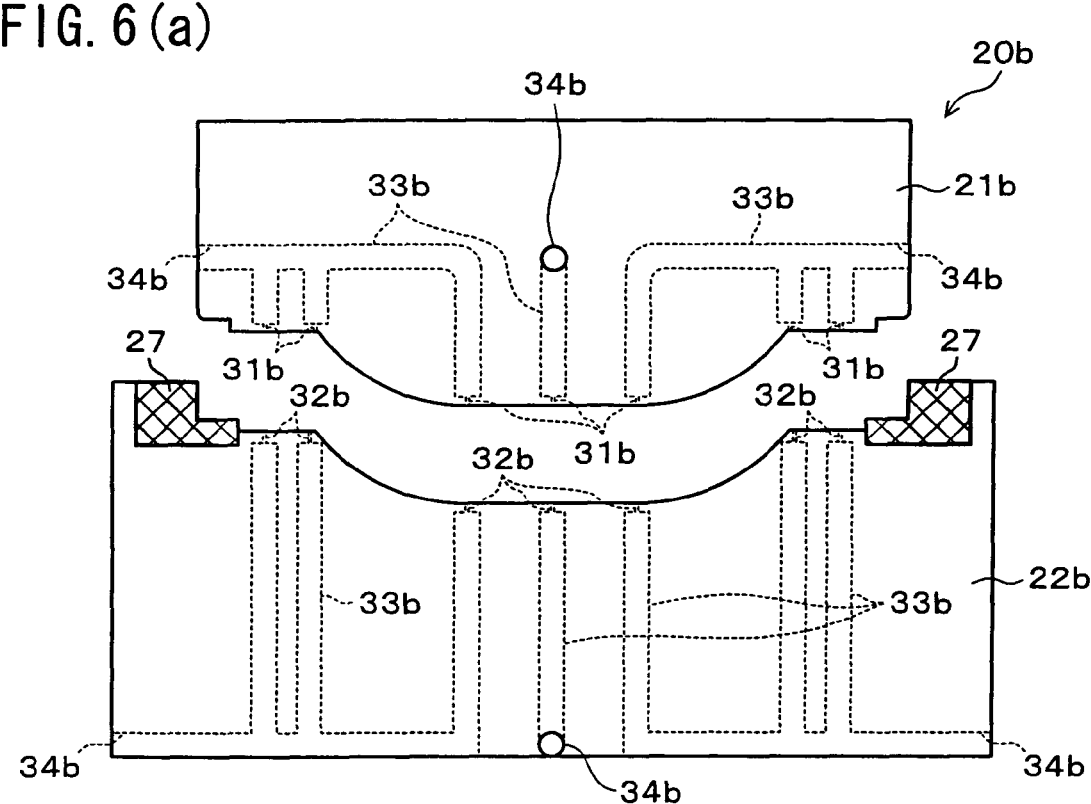
FIG. 6 (a) and FIG. 6 (b) are schematic cross-sectional views showing a structure of a mold to mold the round plate-shaped container shown in FIG. 3.
Figure 6B:
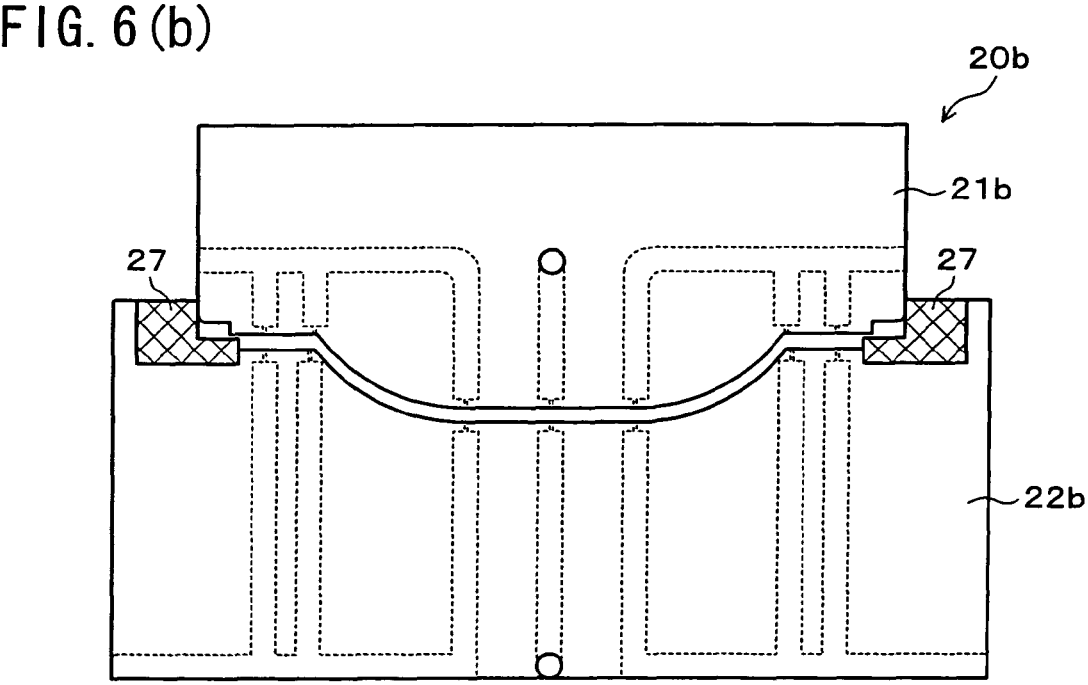

Exhaust holes 31b and 32b to discharge gaseous matter inside the cavity 25b outward pierces each of the concave mold part 21b and the convex mold part 22b. As shown in FIGS. 6(a) and 6 (b), the exhaust holes 31b and 32b are provided on each of the positions corresponding to an outer end of a flange 10bc, an inner end of the flange 10bc (an upper end of a curved part 10ba), an outer end of a bottom 10ba, a center of the bottom 10ba. The exhaust holes 31b and 32b lead to the outside of the metal mold 20b through an outlet 34b provided at the place other than a cavity-forming part (a surface surrounding a cavity 25b) on the surface of the convex mold part 21b and the concave mold part 22b.

An insulator 27 to insulate the convex mold part 21b and the concave mold part 22b is provided at the fitting part (contacting part) of the convex mold part 21a and the concave mold part 22a constituting the metal mold 20b, which forms an electric field inside the metal mold 20a using the convex mold part 21a and the concave mold part 22a as an electrode and makes internal heating by electric conduction and internal heating by dielectric heating (for example high-frequency dielectric heating) possible.

Diameter of the exhaust holes 31a, 32a and the exhaust holes 31b and 32b can be small enough to give no effect on a surface of the coating film 12 at all or at a practical level. In case that the shape of the exhaust holes (31a and 32a or 31b and 32b) the diameter is preferably between 0.4 mm and 1.2 mm. In addition, the sectional area of the exhaust holes (31a and 32a or 31b and 32b) is preferably between 0.12 mm$^2$ and 1.13 mm$^2$ without relation to the shape of the exhaust holes.

Figure 5B:
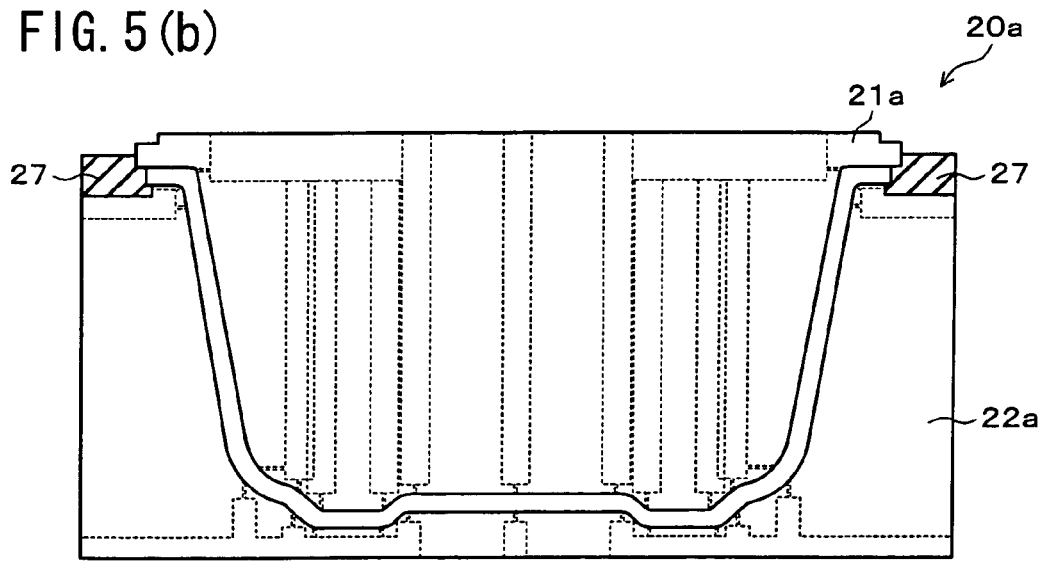

Diameter of parts 33a and 33b connecting the exhaust holes 31a and 32a and exhaust holes 31b and 32b to the outlets 34a and 34b is not specifically limited, but it is preferable that for smooth discharge, it has a larger diameter than the exhaust holes 31a, 32a and exhaust holes 31b and 32b as shown in FIGS. 5 (a), 5(b), 6(a) and 6(b). That is to say, as shown in FIGS. 5(a), 5(b), 6(a) and 6(b), it is preferable that the exhaust holes 31a, 32a and exhaust holes 31b and 32b are connected to the outlets 34a and 34b by the exhaust holes 33a and 33b having a larger diameter than that of the exhaust holes 31a, 32a and exhaust holes 31b and 32b.

A knockout pin to take out the expanded molded article, a hinge, guide or a bar to movably link the convex mold parts 21a and 21b to the concave mold parts 22a and 22b may be provided with the metal molds 20a and 20b (not shown in drawings). The structure (position) of the exhaust tubes 33a and 33b and the outlets 34a and 34b are not specifically limited. For example, the metal mold 20a shown in FIGS. 5 (a) and 5 (b) may be changed to the metal mold 20a shown in FIG. 18.

Next, a heating method at the time of molding is described.

For the heating method at the time of molding, it is possible to use either or both external heating to directly heat the mold by direct heating means including direct heating, far-infrared radiation, electric heater, IH heating device, and/or internal heating to heat the molding material itself at the inside by internal heating means including electric heating, high-frequency dielectric heating and microwave heating.

As the internal heating, high-frequency dielectric heating is the most preferable. Using high-frequency dielectric heating the molding material heats up in a short time and is wholly expanded at once at the beginning of expanding and molding. Thus, pressure of the coating film pressed on the mold occurs strongly and evenly. In result, it is possible to obtain a biodegradable molded article having higher adhesion of the biodegradable expanded molded article to the coating film.

In case of internal heating, the molding material itself is heated. Therefore, the coating film 12 is heated by the high-temperature molding material during expanding and molding process and adhered to the surface of the expanded molded article. If internal heating is used, the coating film 12 is not directly heated by the mold, which makes it possible to use the coating film 12 mainly made of a biodegradable plastic having relatively low melting point, for example, not more than 150° C. and to select the coating film 12 more freely.

On the other hand, in the external heating, the coating film 12 is directly heated by the mold and the molding material placed inside is also heated. Therefore, very high temperature is applied to the coating film 12 to fully expand and mold the molding material. It is thus preferable to use the coating film having higher melting point, and the heating temperature of the mold should be set more carefully considering the melting point or the softening point of the coating film.

From a point of view of easiness in attachment or selection of the coating film 12, internal heating is more versatile as the heating method.

However, external heating has an advantage that it is easier to control softening of the coating film 12 or adhesion to the surface of the expanded molded article, since the coating film 12 is directly heated by the mold. In addition, in case that the coating film 12 has high softening point, when the molding material is heated by internal heating to the extent that the coating film is fully softened, some varieties of molding material are excessively expanded and molded, resulting in poorer quality of expanded molded article. In the cases, external heating may be more preferable.

Thus, both external heating and internal heating have an advantage as a heating method, and both or either of external heating and/or internal heating may be selected depending what biodegradable molded article is manufactured. Using both external heating and internal heating is the most preferable to take advantages of both heating methods.

In case of external heating, the mold (metal mold 20a) is directly heated by the direct heating means, whereby external heating is applied to the molding material in the cavity (cavity 25a) through the mold, and the molding material is molded into an expanded molded article through steam expansion. In case of external heating only, it is possible to eliminate the insulator 27 provided on the metal molds 20a or 20b.

Figure 8:
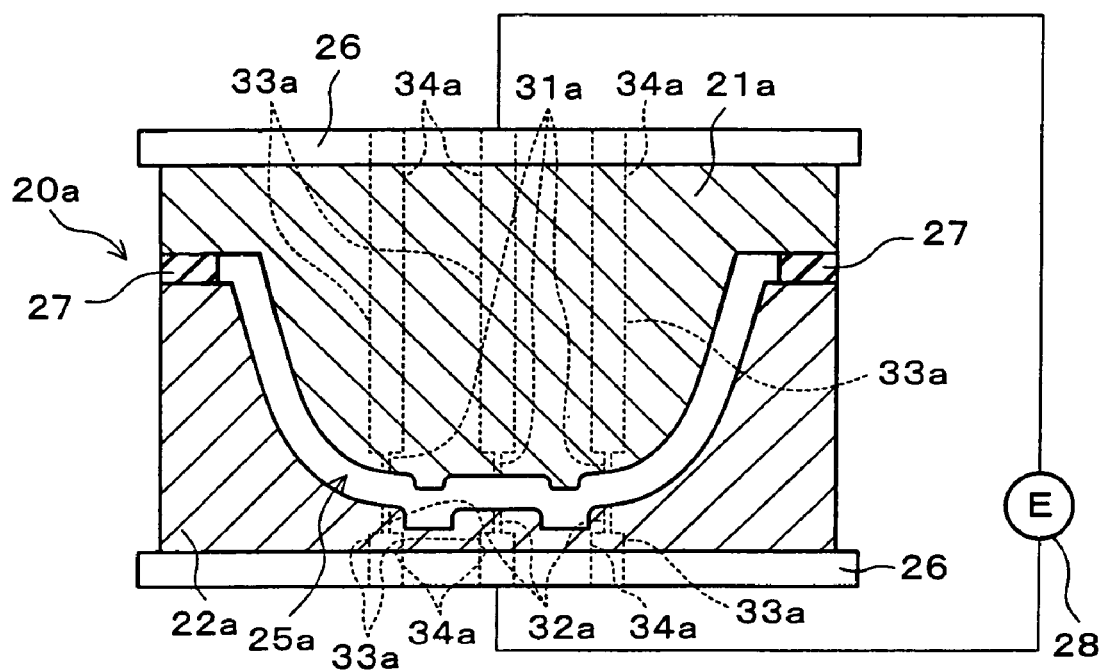
FIG. 8 is a schematic cross-sectional view showing a structure having an electrode for internal heating in the mold shown in FIGS. 5 (a) and 5 (b).

On the other hand, in case of internal heating, for example, dielectric heating or electric heating, heating is performed by forming an electric field using the convex mold part 21a and the concave mold part 22a as an electrode. For instance, as schematically shown in FIG. 8, it is possible to use a heating device wherein the metal mold 20a consisting of the convex mold part 21a and the concave mold part 22a is used, to which the electrodes 26 and 26 are connected, respectively, and the power supply 28 is connected to the electrodes 26 and 26. This can heat the molding material to be filled in the cavity 25a by internal heating. In case of high-frequency dielectric heating, high frequency is generated in the cavity 25a as the power supply 28 using a high-frequency power supply, whereby the molding material filled in the cavity 25a may be heated. Also, the electrode 26 is connected to the power supply 28 as well as a switch or a control circuit (not shown).

It is possible to apply the structure that the electrode 26 is placed in the convex mold part 21a or the concave mold part 22a, to the external heating. That is, also in case of external heating, it is possible to use the structure that the direct heating means and the electrode 26 are provided to directly heat the mold. Therefore, the structure shown in FIG. 8 that the electrode 26 is provided, can be used for both external heating and internal heating.

As the internal heating, dielectric heating is especially preferable. By dielectric heating, the molding material heats up in a short time at the beginning of expanding and molding, and the entire molding material expands at once. This generates strong and even pressure that presses the coating film 12 on the metal mold. By controlling temperature of the mold and heat generation of the molding material, it is possible to raise the temperature on an adhesive surface (surface adhered to the coating film) on the expanded molded article until toward the melting point, maintaining the temperature of a mold-contacting surface (surface contacting on the mold) on the coating film 12 below the melting point. In result, a biodegradable molded article which has high adhesiveness of the coating film 12 to the expanded molded article can be obtained.

The dielectric heating is a method to heat an object to be heated by dielectric loss of the object, including high-frequency dielectric heating which dielectrically heats the object (dielectric) by high frequency (HF; 3 to 30 MHz) and microwave heating which dielectrically heats the object (dielectric) by microwave (MW; 1 to 100 GHz). High-frequency dielectric heating is more preferable since dielectric heating can be performed using a metal mold made of metals as an electrode and can accurately control an output device (high-frequency generator) to control heat generation of the molding material.

Figure 1:
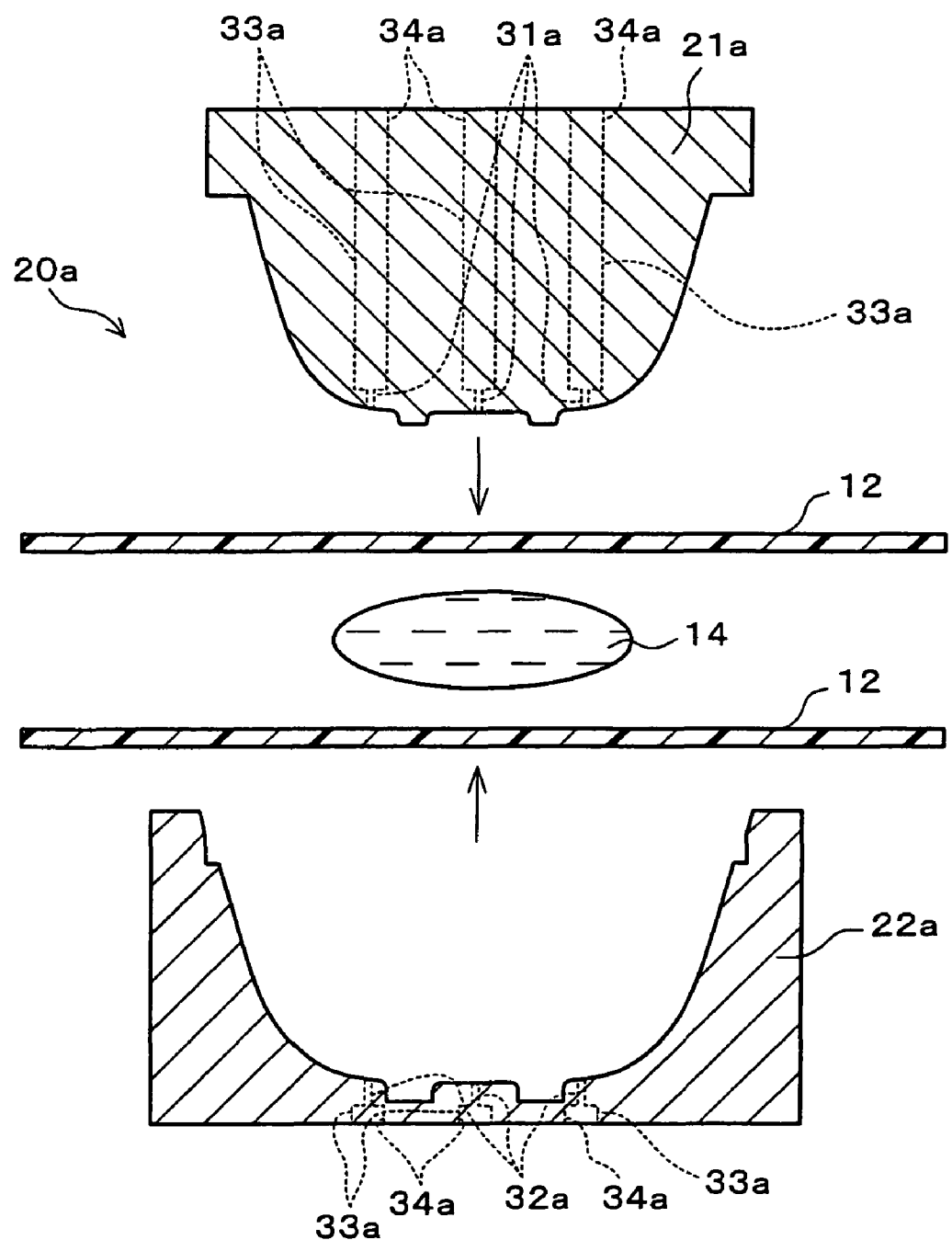
FIG. 1 is an explanatory view describing a method to manufacture a biodegradable molded article in accordance with an embodiment of the present invention.

Next, an embodiment of a method to manufacture the biodegradable molded article in accordance with the present invention is described in details based on FIG. 1. Using the metal mold 20a for molding a bowl-shaped container shown in FIGS. 5 (a) and 5 (b), a case of manufacturing the bowl-shaped container 10a is described in more detail as an example. In FIG. 1, to simplify the figure, only a part of the exhaust holes 31a and 32a in the metal mold 20a are shown, but the other exhaust holes 31a and 32a are not shown.

In a method to manufacture the biodegradable molded article in accordance with the present invention, as shown in FIG. 1, a slurry or dough molding material 14 mainly made of starch or a derivative thereof and obtained by adding water thereto, and two coating films 12 mainly made of biodegradable plastic and having hydrophobicity are used, the molding material 14 is placed between the coating films and pressurized by the metal mold 20a, to make the bowl-shaped container 10a (refer to FIG. 2).

First, as shown in FIG. 1, the convex mold part 21a and the concave mold part 22a divided into two from the metal mold 20a are placed so that the center of the convex mold part 21a and the concave mold part 22a is lined on a plumb line and the convex mold part 21a and the concave mold part 22a is positioned upper and lower, respectively. In addition, a convex surface (lower surface) on the convex mold part 21a and a concave surface (upper surface) on the concave mold part 22a are opposed at substantially equal distance from any position along the plumb line.

Next, two coating films 12 that are not preformed, are placed substantially flat between the convex mold part 21a and the concave mold part 22a with the molding material 14. These two coating films 12 are spaced and paralleled each other, and the slurry or dough molding material 14 is supplied between the two coating films 12. The coating film 12 is placed vertically to a straight line connecting the center of the convex mold part 21a with the center of the concave mold part 22a. In this case, the coating film 12 is placed horizontally.

A method to position the coating film 12 substantially flat may be a method to just pour the substantially flat coating film 12 into the metal mold 20a or a method to fix the curled coating film 12 on both sides of the metal mold 20a. When the coating film 12 is put between the convex mold part 21a and the concave mold part 22a, using a plurality of rollers placed on both sides of the metal mold 20a, the coating film can be continuously provided.

Then, by heating (pressurizing) and molding the molding material 14 and the coating film 12 in the metal mold 20a through the external heating and/or internal heating, the molding material 14 is molded into the main body 11a of the container through steam expansion, and at the same time, the coating film 12 is softened and press-bonded (adhered) to the surface of the main body 11a.

At the time of heating and molding, the convex mold part 21a is fit in the concave mold part 22a by moving at least either one of them, heating the molding material 14 and the coating film 12. Thus, the coating film 12 starts to deform into a shape of the surface of the convex mold part 21a.

On the other hand, the molding material 14 is directly exposed to air until the convex mold part 21a is fit in the concave mold part 22a. So, the molding material 14 is maintained at relatively low temperature, which does not reach the lowest temperature at which steam expansion happens (that is 100° C.). Even if steam expansion happens, the molding material 14 is maintained at relatively low temperature. Therefore, steam expansion of the molding material 14 does not happen at all, or slightly happens until the convex mold part 21a is fit in the concave mold part 22a.

Afterwards, when the convex mold part 21a is fit in the concave mold part 22a and the metal mold 20a is closed, the molding material 14 is blocked out from air and fully heated. Therefore, expansion by water contained in the molding material 14 sufficiently goes off and the molding material 14 expands between the coating films 12. In result, the molding material 14 is molded as the main body 11a, and at the same time, the coating film 12 is pressed on the metal mold 20a by the molding material 14 and molded into the substantially same shape as the surface of the metal mold 20a. Hence, it is possible to mold the bowl-shaped container 10a into the shape corresponding to the cavity 25a, as the biodegradable molded article in accordance with the present invention.

In this case, soon after molding starts, air exists between the coating film 12 and the surface of the metal mold 20a. In the metal mold 20a in this embodiment, the exhaust holes 31a and 32a for depressurization are provided in the convex mold part 21a and the concave mold part 22a. Therefore, air existing between the coating film 12 and the surface of metal mold 20a is discharged outward through the exhaust holes 31a and 32a.

In result, air in the metal mold 20a is substantially completely discharged out of the cavity 25a and the bowl-shaped container 10a can be molded into the substantially same shape as the cavity 25a.

Figure 18:
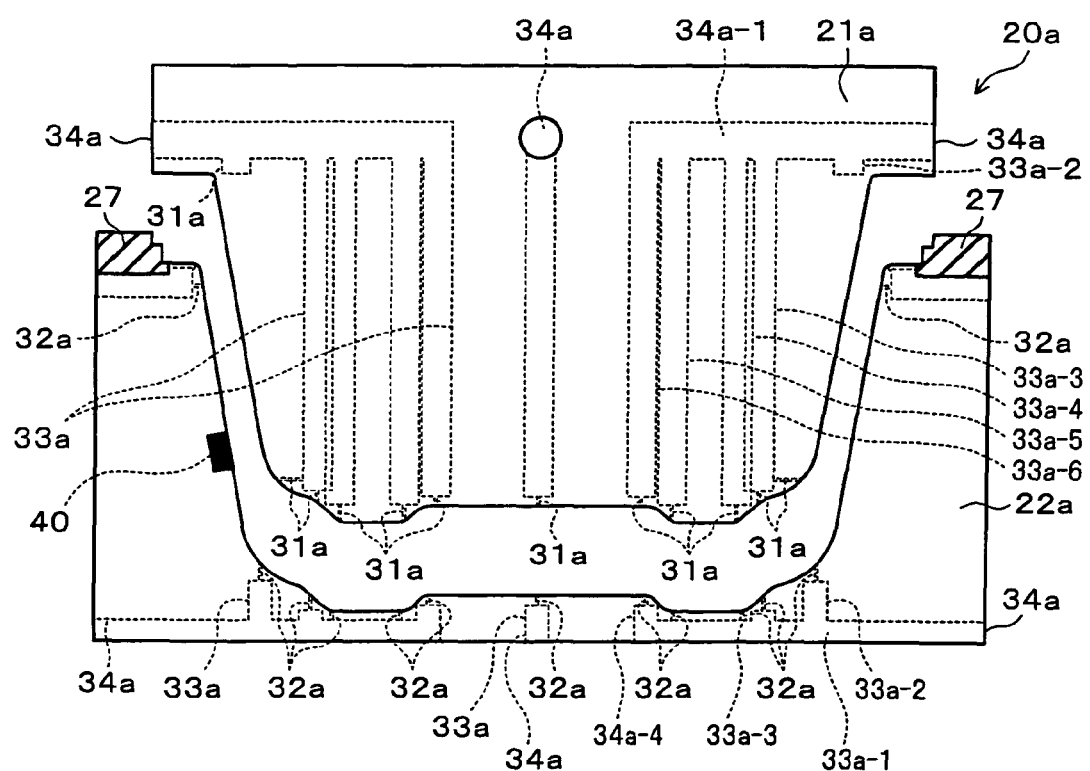
FIG. 18 is a schematic cross-sectional view showing another structure of the mold to mold the bowl-shaped container shown in FIG. 2.

In the metal mold 20a shown in FIGS. 5 (a) and 5 (b) or FIG. 18, though the exhaust holes 31a and 32a lead to the outside of the metal mold 20a to discharge air in the cavity 25a out of the metal mold 20a, the exhaust holes 31a and 32a may lead to an enclosed space inside the metal mold 20a. That is, an enclosed space leading to the cavity 25a through the exhaust holes 31a and 32a and shuts off the outside of the metal mold 20a may be formed inside the metal mold 20a. More particularly, in the metal mold 20a shown in FIG. 5 (a) and FIG. 5 (b), or FIG. 18, the outlet 34a may be closed at the time of heating and molding and an exhaust tube 33a (a space inside the metal mold 20a leading to the cavity 25a through the exhaust holes 31a and 32a) may be an enclosed space from the outside of the metal mold 20a. In this case, air existing between the coating film 12 and the surface of the metal mold 20a is discharged to an enclosed space through the exhaust holes 31a and 32a by the coating film 12 pressed by expansion of the molding material 14.

In result, as the case that the exhaust holes 31a and 32a lead to the outside of the metal mold 20a, air in the metal mold 20a is substantially completely discharged out of the cavity 25a and the bowl-shaped container 10a can be molded into the substantially same shape as the cavity 25a.

In addition, the method to use the metal mold 20a forming such an enclosed space has an advantage that it is possible to easily avoid deformation or tear of the coating film 12 due to a rapid increase in inner pressure of the cavity, in case that rapid molding is done or the coating film 12 is not strong enough.

In the method to use the metal mold 20a forming such an enclosed space, it is preferable that the volume of the enclosed space should be set at between a third and twice of the void volume in the cavity 25a (capacity deducting the volume of the molding material 14 from the capacity of the cavity 25a) before heating and molding. It is possible to avoid uneven thickness due to insufficient air exhaust by making the volume of the enclosed space not less than a third of the void volume inside the cavity 25a before heating and molding. Also, it is possible to avoid deformation or tear of the coating film 12 due to excessive air exhaust by making the volume inside the cavity 25a not more than twice of the void volume inside the cavity 25a before heating and molding. To satisfy the volume ratio above, volume or form of the molding material 14 may be adjusted, though adjusting size of the enclosed space in the metal mold 20a is more convenient because the adjustment can be made maintaining expansion rate consistently.

As mentioned above, in the method above, the exhaust holes 31a and 32a for depressurization are provided and air existing between the coating film 12 and the surface of the convex mold part 21a and the concave mold part 22a are discharged out of the cavity 25a through the exhaust holes 31a and 32a. This improves adhesiveness of the coating film 12 to the surface of the convex mold part 21a and the concave mold part 22a.

Therefore, in the above method, it is possible to avoid generation of air bubbles on the surface of the coating film 12 and obtain the bowl-shaped container 10a having excellent surface smoothness. Especially, since the surface of the flat area such as the side wall 10aa and the flange 10ac becomes smooth, well-lustered and beautiful bowl-shaped container 10a can be obtained.

In the method above, the bowl-shaped container 10a can be molded into the substantially same shape as the cavity 25a with excellent accuracy of dimension. Especially, the coating film 12 is difficult to be adhered to the concave part of the surface on the metal mold 20a, for example, a square of the bowl-shaped container 10a (a square at the foot 10ad or the flange 10ac), the concave part of the convex mold part 21a corresponding to the convex part inside the bowl-shaped container 10a (back side of the concave part 10af), or a concave part of the concave mold part 22a corresponding to the convex part (foot 10ad) on the outer surface of the bowl-shaped container 10a. However, in the method above, by discharging air existing between the coating film 12 and the surface of the metal mold 20a out of the cavity 25a, it is possible to closely adhere the coating film 12 also to the concave part on the surface of the metal mold 20a. In result, a corner, for example, at the foot 10ad and the flange 10ac does not become rounded and forms a pointed shape reflecting the shape of the cavity 25a correctly. Also, it is possible to make thickness at the foot 10ad and the concave part 10af of the bowl-shaped container 10a substantially same as thickness of the cavity 25a.

In the method above, since air is discharged from the metal mold 20a using inner pressure in the metal mold 20a generated by expansion of the molding material 14, air can be sufficiently discharged without vacuum suction. In this case, the diameter of the exhaust holes 31a and 32a, as mentioned above, is small enough to make no influence on a surface of the coating film 12. Therefore, the convex parts corresponding to the exhaust holes 31a and 32a are not formed on the surface of the coating film 12, but if any, there is no practical influence.

In the manufacturing method in this embodiment, it is preferable to straightly approximate the convex mold part 21a and the concave mold part 22, at least while the coating film 12 is deformed. In other words, it is preferable that a relative movement of the convex mold part 21a to the concave mold part 22 is rectilinear motion. So more consistent pressure is applied to the coating film 12 by the convex mold part 21a, compared with the case that a side of the convex mold part 21a and a side of the concave mold part 22 is connected by a hinge and rotates the convex mold part 21a. Therefore, it is possible to extend the coating film evenly and to make thickness of the coating film 12 uniform, thereby further improving effect by the coating film 12, that is, water resistance of the biodegradable molded article.

Also, in the manufacturing method in this embodiment, it is preferable to move both convex mold part 21a and concave mold part 22a to approximate each other at least until the coating film 12 starts to deform.

According to the method above, since both convex mold part 21a and the concave mold part 22a are moved to approximate each other at least until the coating film 12 starts to deform, the time necessary for fitting the convex mold part 21a in the concave mold part 22a (fitting time) can be reduced, resulting in a reduction of the manufacturing time.

Also, incase that the convex mold part 21a and the concave mold part 22a are moved to approximate each other, both of the mold parts may be moved to approximate each other until the convex mold part 21a is fit in the concave mold part 22a. However, it is preferable that both convex mold part 21a and concave mold part 22a are moved to approximate each other until the coating film 12 starts to deform, while only the convex mold part 21a is moved after the coating film starts to deform. This does not eliminate a necessity to move the coating film 12 and makes operation easier when the coating film 12 is held substantially flat, as the case that the coating film 12 is continuously transported.

Heating temperature of the metal mold 20a at the time of heating and molding may be within a range that can soften the coating film 12 without fusion and pressure-bond it on the surface of the expanded molded article, that is, not less than the softening point of the coating film 12 and less than the melting point of the coating film 12, which is set preferably depending on thermal characteristics of the coating film 12 used. Preferably, at the time of heating and molding, heating is performed so that the temperature of the metal mold 20a may be not less than the softening point of the coating film 12 and at least 10° C. lower than the melting point thereof.

Accordingly the coating film 12 can be softened without fusion and are molded into a shape corresponding to the metal mold 20a, which can avoid pinholes on the coating film 12. Hence it is possible to more securely coat the main body 11a of the container with the coating film 12, thereby further ensuring water resistance of the bowl-shaped container 10a.

It is more preferable that at the time of heating and molding, heating satisfies a temperature condition that "the temperature of the metal mold 20a is not less the softening point of the coating film 12, and at least 10° C. lower than the melting point thereof and not less than 130° C. (hereinafter referred to as Temperature Condition A). This can fully heat the slurry or dough molding material 14 in the cavity (cavity 25a etc.) and mold it through steam expansion, which reduce molding time through steam expansion, make the conditions of steam expansion better and obtain the main body 11a with uniform and fine texture. Therefore, the manufacturing time can be reduced and the characteristic including strength of the bowl-shaped container 10a can be improved.

It is more preferable that at the time of heating and molding, heating satisfies a temperature condition that "the temperature of the metal mold 20a is not less than the softening point of the coating film 12 and at least 10° C. lower than the melting point thereof and not less than 150° C. (hereinafter referred to as Temperature Condition B). This can more fully heat the slurry or dough molding material 14 in the cavity (cavity 25a etc.) and mold through steam expansion, which can further reduce the molding time through steam expansion, make the conditions of steam expansion much better, and obtain the main body 11a with more uniform and fine texture. Therefore, the manufacturing time can be further reduced and the characteristic including strength of the bowl-shaped container 10a can be improved.

To satisfy the Temperature Condition A, it is necessary to use the coating film 12 having the softening point of not less than 130° C. and the melting point of not less than 140° C. To satisfy the Temperature Condition B, it is necessary to use the coating film 12 having the softening point of not less than 150° C. and the melting point of not less than 160° C.

Using the coating film 12 having such softening point and melting point can not only satisfy the above temperature conditions but also obtain the bowl-shaped container 10a with high heat resistance that does not easily cause softening or fusion. Especially, in case that the bowl-shaped container 10a is used for a container of ready-to-serve noodles, it is possible to more certainly avoid deformation and fusion of the bowl-shaped container 10a by heat such as hot water poured into the bowl-shaped container 10a.

Accordingly, as thermal characteristics of the coating film 12, it is preferable to set a high heating temperature for the time of heating and molding and to improve heat resistance of the bowl-shaped container 10a. More particularly, the softening point of the coating film 12 is preferably not less than 120° C., and more preferably not less than 130° C., and still more preferably not less than 150° C. Also, the melting point of the coating film 12 is preferably not less than 150° C., more preferably not less than 170° C., and still more preferably not less than 200° C. Preferably the coating film 12 has the softening point of not less than 120° C. and the melting point of not less than 150° C., more preferably the softening point of not less than 130° C. and the melting point of not less than 170° C. and the most preferably the softening point of not less than 150° C. and the melting point of not less than 200° C.

The maximum limit of temperature to heat the metal mold 20a is not particularly limited if it is less than the melting point of the coating film 12. However, the temperature is preferably not more than 240° C. to avoid thermal changes of the bowl-shaped container 10a.

Also, steam expansion molding is a molding method to bring air bubbles by evaporating water included in the molding material 14 and generating steam. In the manufacturing method in accordance with the present invention, it is necessary to heat the molding material 14 to the temperature of boiling water of not less than 100° C. to mold the molding material 14 through steam expansion.

When external heating only is used as a heating method, heating temperature of the metal mold 20a should be not less than 100° C. that is the temperature of boiling water, more preferably sufficiently higher than the temperature of boiling water, for example, not less than 140° C. This always evaporates water contained in the molding material 14 into vapor and generates air bubbles. Accordingly, the resultant molded article is always steam-expanded and the expanded molded article can be easily obtained.

Therefore, if external heating is used as a heating method, it is necessary to select the coating film 12 mainly made of a biodegradable plastic having the melting point of not less than 100° C. If the coating film 12 is mainly made of a biodegradable plastic having the melting point of less than 100° C., the coating film 12 is completely fused at the temperature to fully mold the molding material 14 through steam expansion and the coating film 12 can not maintain the film shape.

On the other hand, when internal heating only is used as a heating method, or when both external heating and internal heating are used, the molding material 14 itself in the cavity (cavity 25a etc.) is internally heated by applying low-frequency alternating current or high-frequency electric field to the electrode 26. Accordingly, the heating temperature depends on various conditions relating to internal heating and is not particularly limited if it is not less than the temperature that the molding material 14 is steam-expanded. Therefore, if internal heating is used, it is possible to use the coating film 12 having the relatively lower melting point compared with external heating.

Various conditions relate to internal heating. More particularly, the characteristics of the electrode 26 and scale of the low-frequency alternating current and high-frequency electric field largely relate to internal heating. In addition, as mentioned above, internal heating largely depends on conductivity or dielectric loss of the molding material 14. In other words, in case of heating and molding through electric conduction heating, the condition of heat generation is controlled by conductivity of the molding material 14. In case of heating and molding through high-frequency dielectric heating, the condition of heat generation is controlled by dielectric loss of the molding material 14. In practically, the various conditions are not particularly limited if the temperature in the cavity is within the same range as the external heating.

The heating time is set depending on heating temperature, shape or thickness of the main body 11a, but it is preferable to set the time so that water content of the main body 11a after molding is at least within a given range. In other words, it is preferable to set the time so that moisture in the molding material 14 may not evaporate almost completely.

If the heating time is too long to the extent that moisture in the main body 11a becomes smaller than the above range, the main body 11a is excessively expanded and does not have given water content. Therefore, the main body 11a becomes rigid and brittle and undesirably degrades the quality.

The heating time is not specifically limited. For example, in case of high-frequency dielectric heating, molding can be completed in a much shorter time compared with general external heating. Or if the main body 11a is thick, the heating time tends to be longer. Basically, the heating time is set depending on the heating method and the shape of the main body 11a. In general, the heating time is preferably between 10 seconds and 5 minutes.

Molding pressure at the time of heating and molding is not particularly limited, but in general, preferably between 5 kg/cm$^2$ and 50 kg/cm$^2$. Of course, it is possible to change the molding pressure depending on various conditions.

Also, in the manufacturing method of this embodiment, applying a slip agent on the surface of the metal mold 20a contacting the coating film 12. This can reduce contact fiction between the surface of the coating film and the surface of the metal mold 20a, and avoid damages such as tears or cracks on the coating film 12 due to friction with the metal mold 20a when the coating film 12 is drawn by the metal mold 20a.

As the slip agent, it is possible to use an agent that can reduce friction between the surface of the metal mold 20a and the surface of the coating film 12, such as generally called "lubricant" including higher aliphatic alcohols, fatty amides, metal soaps such as magnesium stearate, fatty esters and compounds thereof, as well as fats and oils such as vegetable fat and oil, inorganic particles and fluoroplastics. The methods to apply the slip agent on the surface of the metal mold 20a include a method to apply liquid such as lubricants and fats and oils on the surface of the metal mold 20a, a method to attach particles such as inorganic particles on the surface of the metal mold 20a, and a method to form a solid layer of fluoroplastic on the surface of the metal mold 20a. Among these methods, the method to form a solid layer on the surface of the metal mold 20a is preferable. As the solid layer formed on the surface of the metal mold 20a, a fluoroplastic layer is preferable. So a fluoroplastic layer (fluoroplastic coating film, namely fluoroplastic coating) formed on the surface of the metal mold 20a is the most preferable as the slip agent.

In case that a liquid slip agent is applied on the surface of the metal mold 20a or in case that a particle-type slip agent is attached on the surface of the metal mold 20a, since these slip agents come off the surface of the metal mold 20a during molding, it is necessary to apply the slip agents every molding. On the other hand, if a fluoroplastic layer is formed on the surface of the metal mold 20a as a slip agent, the slip agent does not come off the surface of the metal mold 20a during molding and can be used for a long time. Accordingly, it is possible to reduce labor to apply the slip agent on the surface of the metal mold 20a.

In case that a liquid slip agent is applied or in case that a particle-type slip agent is attached, since these slip agents attach to the surface of the surface of the bowl-shaped container 10a during molding, it is necessary to remove the slip agents after molding. On the other hand, in the method above, the slip agent does not attach to or stain the surface of the bowl-shaped container 10a, so it is possible to eliminate labor to remove the slip agent from the surface of the bowl-shaped container 10a after molding.

The above fluoroplastic includes polytetrafluoro-ethylene (namely TEFLON, registered trademark), tetra-fluoroethylene-hexafluoropropylene copolymer, tetra-fluoroethylene-perfluoroalkyl vinyl ether copolymer, tetraethylene-ethylene copolymer, polytrifluoroethylene chloride, polyvinylidene fluoride. Polytetrafluoroethylene is especially preferable due to excellent heat resistance and lower cost.

Figure 7:
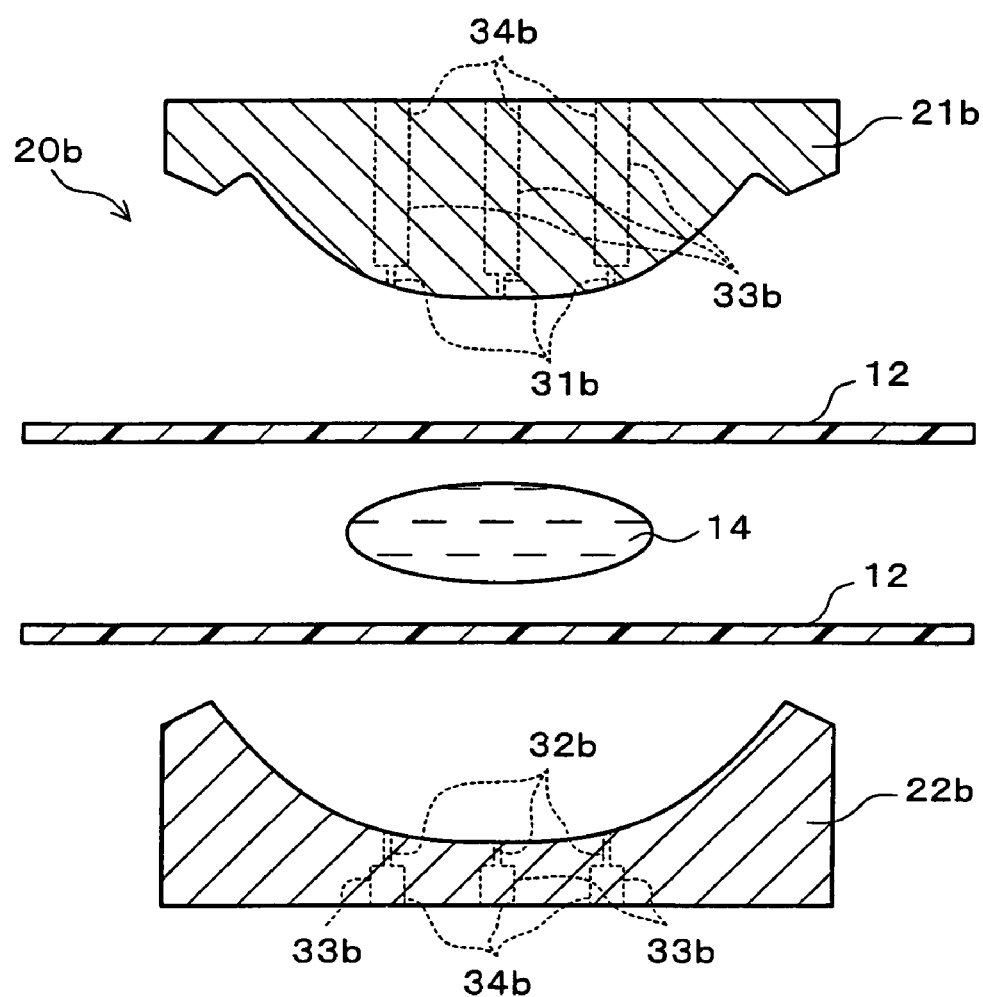
FIG. 7 is an explanatory view describing a method to manufacture a biodegradable molded article in accordance with another embodiment of the present invention, in order to manufacture the round plate-shaped container shown in FIG. 3.

Next, as another embodiment of the present invention, a method to manufacture a round plate-shaped container 10b is described based on FIG. 7. Also in FIG. 7, to simplify the drawing, only a part of the exhaust holes 31b and 32b in the metal mold 20b is shown without the other exhaust holes 31b and 32b.

A method to manufacture the round plate-shaped container 10b in this embodiment is the same as the method to manufacture the bowl-shaped container 10a, except that the metal mold 20b for molding the round plate-shaped container consisting of the convex mold part 21b and the concave mold part 22b shown in FIGS. 6 (a) and 6 (b) is used, instead of the metal mold 20a for the bowl-shaped container shown in FIGS. 5 (a) and 5 (b).

That is to say, using the metal mold 20b consisting of the convex mold part 21b and concave mold part 22b, as shown in FIG. 7, the convex mold part 21b and the concave mold part 22b are placed in an upper position and a lower position, respectively, and the molding material 14 is placed between the convex mold part 21b and the concave mold part 22b with a pair of coating films 12 placed in between. Then, the convex mold part 21b and the concave mold part 22b approach to each other and are fit and clamped together. Next, by heating and molding the molding material 14 and the coating film 12, the molding material 14 is molded through steam expansion to obtain the main body 10b, and at the same time, the coating film 12 is softened and pressure-bonded on the surface of the main body 10b. At the time of heating and molding, air existing between the coating film 12 and the surface of the metal mold 20b is discharged out of the metal mold 20b through the exhaust holes 31b and 32b provided in the convex mold part 21b and the concave mold part 22b.

In the method above, the exhaust holes 31b and 32b for depressurization are provided for the convex mold part 21b and the concave mold part 22b. At the time of heating and molding, air existing between the coating film 12 and the surface of the convex mold part 21b and the surface of the concave mold part 22b is discharged out of the metal mold 20b through the exhaust holes 31b and 32b. This improves adhesiveness of the coating film 12 to the surface of the convex mold part 21b and the concave mold part 22b.

Therefore, in the method above, it is possible to avoid air bubbles on the surface of the coating film 12 and to obtain the round plate-shaped container 10b having an excellent surface smoothness. Especially, a surface of flat areas such as the bottom 10ba and the flange 10bc becomes smooth, which can make the well-lustered and beautiful round plate-shaped container 10b.

Also, in the method above, it is possible to mold the round plate-shaped container 10b into the substantially same shape as the cavity 25b and to attain excellent accuracy in size. Especially, it is difficult to adhere the coating film 12 to the concave part on the surface of the metal mold 20b, for example, a corner of the round plate-shaped container 10b (corner of the flange 10bc). However, in the method above, it is possible to closely adhere the coating film 12 also on the concave part on the surface of the metal mold 20b by discharging air existing between the coating film 12 and the surface of the metal mold 20b. In result, for example, the corner of the flange 10bc is not rounded, but pointed accurately reflecting the shape of the cavity 25b. Also, it is possible to make thickness of the round plate-shaped container 10b substantially same as thickness of the cavity 25b.

Also in the method to manufacture the round plate-shaped container 10b, as the method to manufacture the bowl-shaped container 10a, an enclosed space leading to the cavity 25b through the exhaust holes 31b and 32b and closed to the outside of the metal mold 20b may be formed inside the metal mold 20b. More particularly, for example, in the metal mold 20b shown in FIGS. 6 (a) and 6 (b), at the time of heating and molding, the outlet 34b may be closed and make the exhaust tube 33b an enclosed space from the outside of the metal mold 20b. It is thus possible to mold the round plate-shaped container 10b into substantially same shape as the cavity 25b and to have the same advantages as the method to use the metal mold 20a forming an enclosed space. It is preferable to adjust volume of the enclosed space to a range between a third and twice of the capacity of gap inside the cavity 25b before heating and molding, from the same reason as the method to manufacture the bowl-shaped container 10a.

In the description above, the metal mold 20a for molding the bowl-shaped container and the metal mold 20b for molding the round plate-shaped container are explained as the mold in accordance with the present invention. Also, in the description above, the method to manufacture the bowl-shaped container 10a using the metal mold 20a and the method to manufacture the round plate-shaped container 10b using the metal mold 20b are explained as the manufacturing method in accordance with the present invention. However, the mold in accordance with the present invention may have another shape. The manufacturing method in accordance with the present invention may be a method to manufacture a biodegradable molded article having another shape.

Figure 9A:
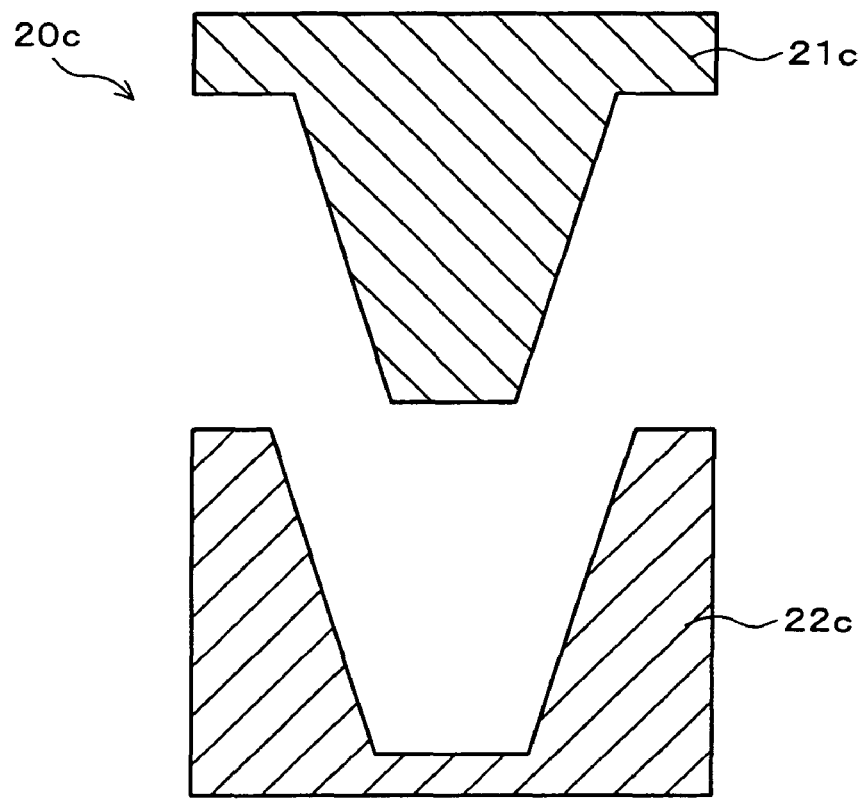
FIG. 9 (a) and FIG. 9 (b) are schematic cross-sectional views showing an example of the mold to mold the cup-shaped container shown in FIG. 4.
Figure 9B:
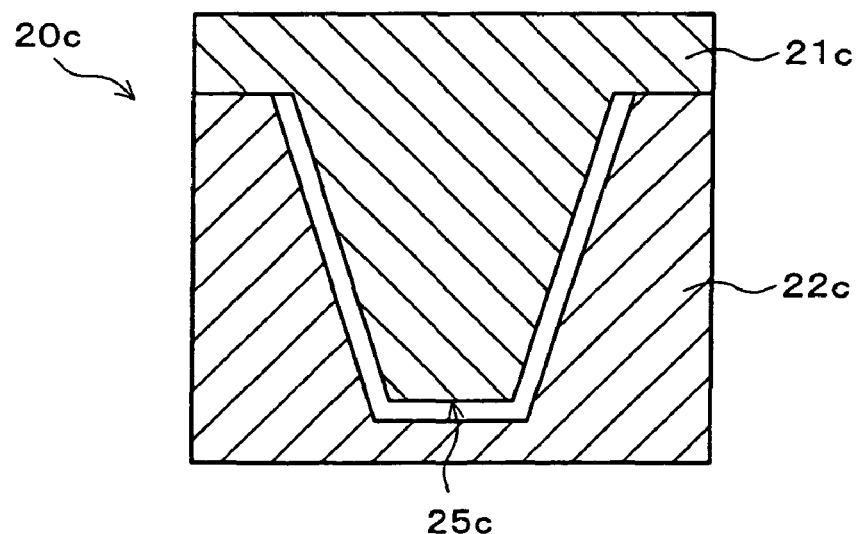

A mold having another shape in accordance with the present invention is, for example, a metal mold 20c for molding a cup-shaped container shown in FIG. 9 (a) and FIG. 9 (b).

FIGS. 5 (a), 5 (b), 6 (a), 6 (b), 9 (a) and 9 (b) illustrate a mold dividable into two in upper and lower position as a dividable mold. However, the method to divide a mold (that is, the number of mold parts) is not limited to the method to divide a mold into two in upper and lower position. For example, instead of the metal mold 20b divided into two shown in FIGS. 9 (a) and 9 (b), it is possible to use the metal mold 20d for molding the cup-shaped container divided in three consisting of a convex mold part 21d having the same shape as the convex mold part 21c, and two concave mold parts 23d and 24d having a shape made by dividing the concave mold part 22c in two, as shown in FIG. 10 (a).

Figure 10A:
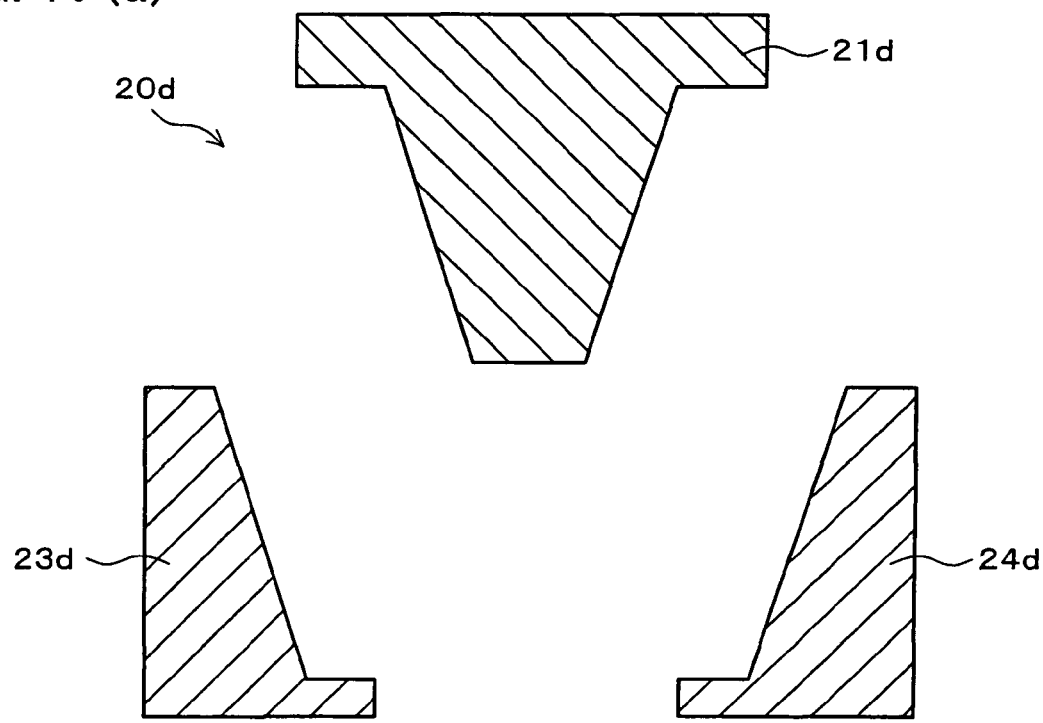
FIG. 10 (a) and FIG. 10 (b) are schematic cross-sectional views showing another example of a structure of the mold to mold the cup-shaped container shown in FIG. 4.
Figure 10A:
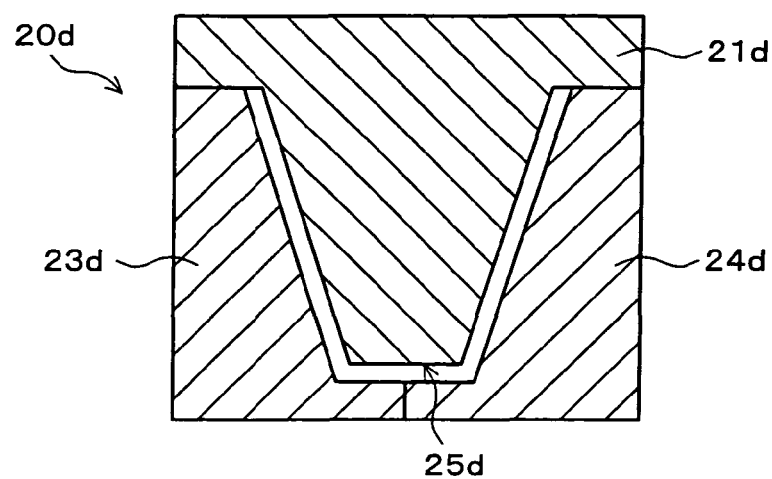

When in the metal mold 20c and the metal mold 20d, the convex mold part 21c and the convex mold part 21d are combined with the concave mold part 22c and the concave mold parts 23d and 24d, respectively, as shown in FIG. 9 (b) and FIG. 10 (b), the cavities 25a and 25b shaped to a desirable expanded molded article (refer to FIG. 3) are formed the inside. Using the above metal mold 20c or 20d, as the case of using the metal molds 20a and 20b, by placing the molding material inside the cavity 25c or 25d between the coating films 12 and pressurizing and heating them, a main body 10b of the cup-shaped container shown in FIG. 4 can be obtained. Exhaust holes (not shown in the figure) are in these metal molds 20c and 20d, as the metal molds 20a and 20b.

Also, in this embodiment, the metal molds 20a and 20b are given as an example of the mold in accordance with the present invention. This embodiment is not limited to this mold, and a mold made of conventional various materials can be used. However, as described below, for the mold used in the present invention, heat resistance for steam expansion molding, and at the same time, strength and abrasion resistance are also required. In case of internal heating using a microwave, microwave permeability is necessary. Accordingly, in case of internal heating using a microwave, a mold consisting of plastic and ceramic with microwave permeability, heat resistance, strength and abrasion resistance is preferable as the above mold. For the other cases, especially in case of internal heating using electric conduction and high-frequency dielectric, a mold consisting of metals, that is, "metal mold" is more preferable since the mold itself works as a part of an electrode.

Moreover, in this embodiment, as an example of using a mold in accordance with the present invention, a mold used in a method to manufacture a biodegradable molded article wherein the molding material and the coating film are heated and molded in the mold to mold the biodegradable expanded molded article through steam expansion, and at the same time, the coating film are softened and pressure-bonded on the surface of the biodegradable expanded molded article, is described. However, the mold in accordance with the present invention can be used with no particular limitation if the biodegradable expanded molded article is molded through steam expansion by internally heating a slurry or dough molding material mainly made of starch or a derivative thereof and obtained by mixing water therewith. Therefore, the mold in accordance with the present invention can be used for a method to mold the molding material only without the coating film.

In each of the methods above, the molding material is placed between two coating films 12 for molding through steam expansion in the mold, and the entire surface of the expanded molded article is coated with the coating film 12. However, the coating film 12 is not necessarily attached to the entire expanded molded article and can be attached only to the part that protects the expanded molded article. For example, a plate for purpose of temporarily placing a food on the surface, more particularly, a one-way plate whereon snack foods such as Takoyaki (octopus dumpling), Yakisoba (Japanese baked noodle), Okonomiyaki (Japanese pancake), hot dogs, and French fries are temporarily placed, eaten and disposed of, or a plate used as a setting for wrapping a cake etc. may need some protection only on the surface (top surface of the plate). Accordingly, in case that the biodegradable molded article is manufactured for such usage, the coating film 12 may coat only the top surface of the expanded molded article.

In case that the biodegradable molded article in accordance with the present invention is used as cushioning materials used for packaging electrical appliances, the coating film may be attached only to the part directly contacting on the electrical appliances. Especially, if the electrical appliance is large, the cushioning materials become larger and an attaching mold to attach a coating film becomes larger. If the biodegradable molded article is large, the coating film can be attached to minimum requisite area.

On the other hand, in case that gas impermeability is required for the entire container so that not only boiling water may be poured in but also dried noodles contained may not get oxidized or absorb moisture as a container for ready-to-serve noodles (bowl-shaped container shown in FIG. 2), it is preferable to attach the coating film on the entire container.

In the method each of these embodiments above, heating and molding are performed using the coating film 12 held substantially flat, while heating and molding may be performed using the coating film 12 curved circularly.

Also, in the method each of these embodiments above, the flatly-formed coating film 12 is used for heating and molding, while the coating film substantially pre-shaped to the outline of the biodegradable molded article may be used for heating and molding as Methods 1 to 6 below.

<Method 1>

Method 1 is a method to substantially pre-shape the coating film 12 used to the outline of the biodegradable molded article in the method explained based on FIG. 1.

Some coating films 12 cannot be largely drawn at the time of molding, depending on the variety of biodegradable plastic of the main ingredient. In this method, by preparing a molding film that is the coating film 12 preformed to a similar shape to the outline after molding, even if the coating film 12 which cannot largely drawn is used, the coating film can certainly and effectively coat more complicated and more deep drawing-shaped expanded molded article. It is thus preferable to use for molding a biodegradable molded article of a rather deep drawing shape, that is, enlarging in size vertically, as the bowl-shaped container 10a shown in FIG. 2.

As a method to mold the coating film 12, typical molding method of a sheet film is used and is not particularly limited. For example, various molding methods including vacuum molding, injection molding and blow molding are preferably used. The molding shape is not necessarily the same to detail if it is almost the same as the shape of the biodegradable molded article after molding. Since the coating film has some flexibility, it may be shaped almost equally to the shape of the biodegradable molded article after molding, namely, the shape of the mold.

Figure 11:
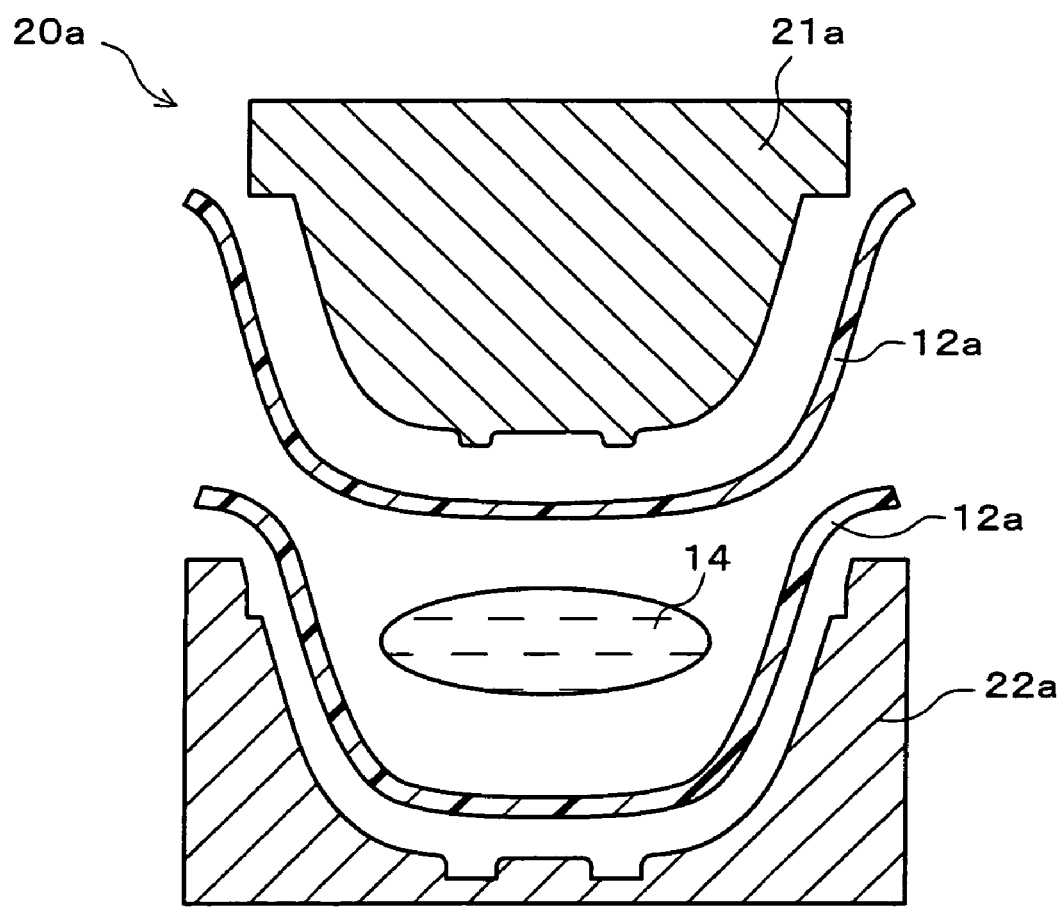
FIG. 11 is an explanatory view describing a method to manufacture a biodegradable molded article in accordance with still another embodiment of the present invention, in order to manufacture the bowl-shaped container shown in FIG. 2.

Particularly explaining Method 1, as shown in FIG. 11, two molding films 12a substantially pre-molded to the shape of the bowl-shaped container 10a are placed between the upper and lower mold parts 21a and 22a of the metal mold 20a shown in FIGS. 5 (a) and 5 (b), and then the slurry or dough molding material 14 is supplied between these molding films 12a and 12a. In this condition, the metal mold 20a is heated to the temperature less than the melting point of a biodegradable plastic that is the main ingredient of the molding film 12a (coating film 12). Afterwards, the upper mold part 21a and the lower mold part 22a are combined, heated, pressurized and molded using the above external heating and internal heating. By this one process, it is possible to obtain the bowl-shaped container 10a (refer to FIG. 2) as the biodegradable molded article in accordance with present invention.

<Method 2>

Method 2 is a method to perform the coating film 12 used into a bag shape, and to contain the molding material in the bag-shaped coating film 12, in the method explained based on FIG. 7. This method can be especially preferably used for molding the biodegradable molded article enlarging in size horizontally in correspondence with the sheet-shaped coating film 12, as the round plate-shaped container 10b shown in FIG. 2.

In this method, the coating film 12 is preformed into a bag shape to make a package film to contain the molding material. When the molding material is put in the packaged film, it means the molding material is substantially packaged in the package film and it is possible to prepare a large amount of molding materials pre-portioned in the package film and store them for a certain period of time. In addition, when the biodegradable molded article is manufactured, molding is ready only by pouring the packaged materials into the mold at one time. Accordingly, this method has an advantage that the manufacturing process is further simplified.

The method to form the coating film 12 to a bag-shaped film is not particularly limited. A conventional method to form a sheet- or a film-shaped plastic into a bag shape is preferably used, for example, pillow packaging. The method to store the packaged materials that the molding material is portioned into the packaging film is not particularly limited, too if a conventional storage method not to decompose starch is used.

In the present invention, the packaging film 12b holding the molding material is "composition for expansion molding". As described above, this composition for expansion molding (hereinafter referred to as a molding composition) not only can be prepared in multiple and stored for a certain period of time, but also can easily produce the biodegradable molded article to which the coating film is attached, only by pouring the composition into the mold and molding at one time. Accordingly, the composition is preferable to manufacture the biodegradable molded article in an easy and convenient process.

Figure 12:
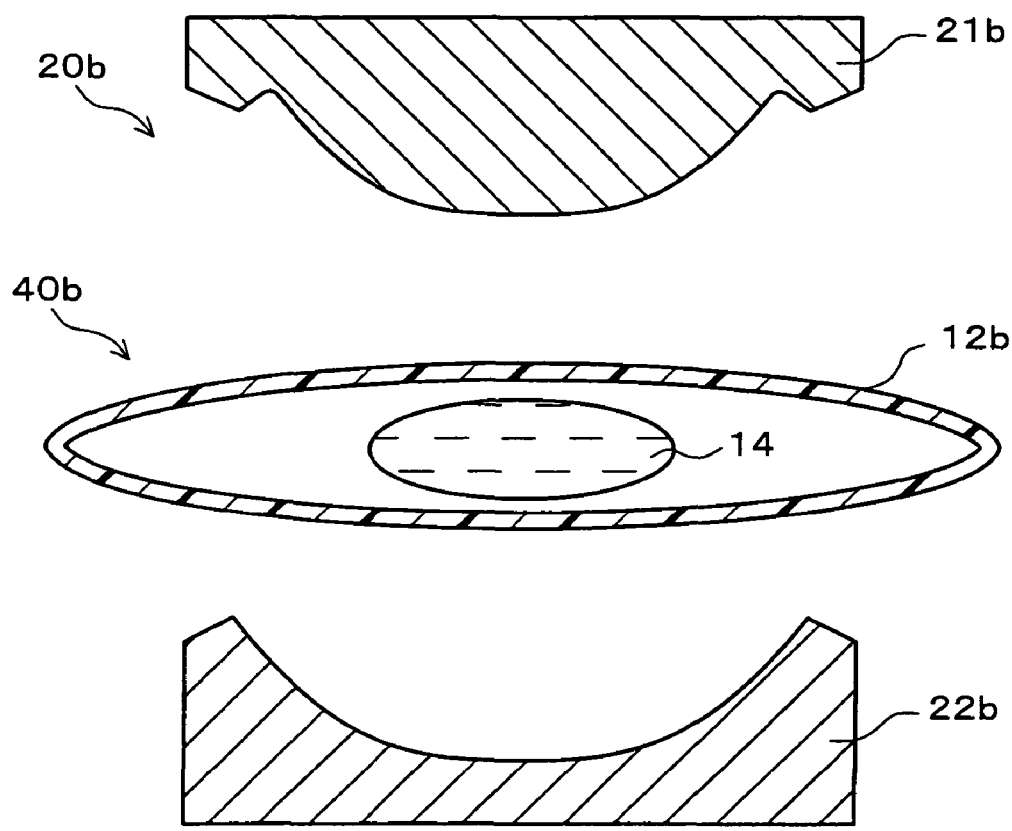
FIG. 12 is an explanatory view describing a method to manufacture a biodegradable molded article in accordance with still another embodiment of the present invention, in order to manufacture the round plate-shaped container shown in FIG. 3.

Particularly explaining Method 2, as shown in FIG. 12, the coating film 12 is preformed into a bag shape to make the packaging film 12b. The appropriate amount of molding material 14 is portioned into the packaging film 12b to prepare the molding composition 40b. The molding composition 40b may be stored in a proper storage case. Then, the molding composition 40b taken out of the storage case is placed on the lower mold part 22b in the metal mold part 20b shown in FIGS. 6 (a) and 6 (b). This is just ready for molding.

In this condition, the metal mold 20b is heated to the temperature to less than the melting point of the biodegradable plastic that is the main ingredient of the coating film 12 (packaging film 12b). Afterwards, the upper and lower mold parts 21a and 22b are combined, heated, pressurized and molded using the above external heating and internal heating. By this one process, it is possible to obtain the round plate-shaped container 10b (refer to FIG. 3) as the biodegradable molded article in accordance with present invention.

<Method 3>

In Method 3, the coating film 12 used is preformed into a bag shape and substantially shaped to the outlines of the biodegradable molded article. In other words, the packaging film 12d in Method 2 is formed into a molding packaging film further substantially shaped to the outlines of the biodegradable molded article. This method can be preferably used also for the biodegradable molded article having a relatively deep drawing shape, that is, vertically enlarging in size such as the bowl-shaped container 10a shown in FIG. 2.

The molding package film may be molded by pre-converting the coating film 12 into a bag-shaped packaging film and then substantially shaping it to the outlines of the biodegradable molded article, or may be converted into the package film after molding the coating film 12 substantially shaped to the outlines. The molding method or the method to convert to the package film is not particularly limited, and as mentioned above, conventional methods can be preferably used.

Figure 13:
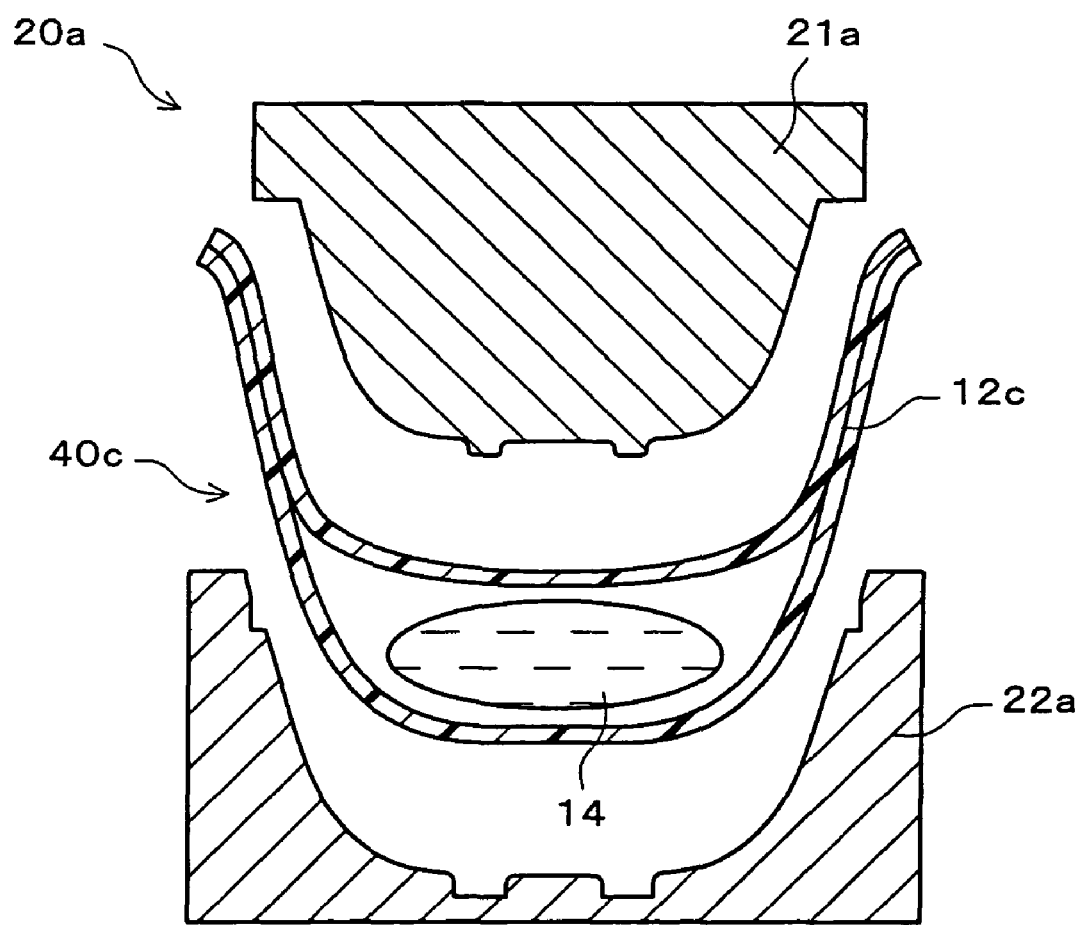
FIG. 13 is an explanatory view describing a method to manufacture a biodegradable molded article in accordance with still another embodiment of the present invention, in order to manufacture the bowl-shaped container shown in FIG. 2.

Particularly explaining Method 3, as shown in FIG. 13, the coating film 12 is preformed into the molding package film 12c. The appropriate amount of molding material is portioned into the molding package film 12c to prepare molding composition 40c. The molding composition 40c may be stored in a storage case. Then, the molding composition 40c taken out of the storage case is placed on the lower mold part 22a of the metal mold 20a shown in FIGS. 5(a) and 5 (b). This is ready for molding.

In this condition, the metal mold 20a is heated to the temperature to less than the melting point of the biodegradable plastic that is the main ingredient of the coating film 12 (molding package film 12c). Afterwards, the upper and lower mold parts 21a and 22a are combined, heated, pressurized and molded using the above external heating and internal heating. By this one process, it is possible to obtain the bowl-shaped container 10a (refer to FIG. 2) as the biodegradable molded article in accordance with the present invention.

<Method 4>

Method 4 is a method to use the coating film 12 as a film piece cut into a shape substantially shaped to the outlines of the biodegradable molded article in Method 1. This method can be preferably used for the biodegradable molded article having a deep drawing shape or a more complicated shape such as the cup-shaped container 10c shown in FIG. 4.

Figure 14:
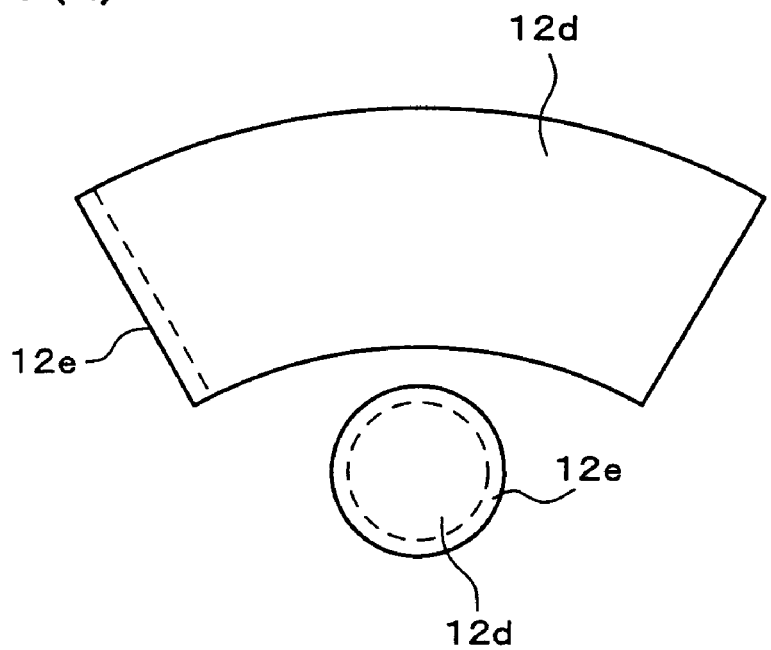
FIG. 14 (a) and FIG. 14 (b) are schematic plan view showing an example of a coating film cut into two as a film piece when manufacturing the biodegradable molded article shown in FIG. 4 using a method described in FIG. 15.
Figure 14:
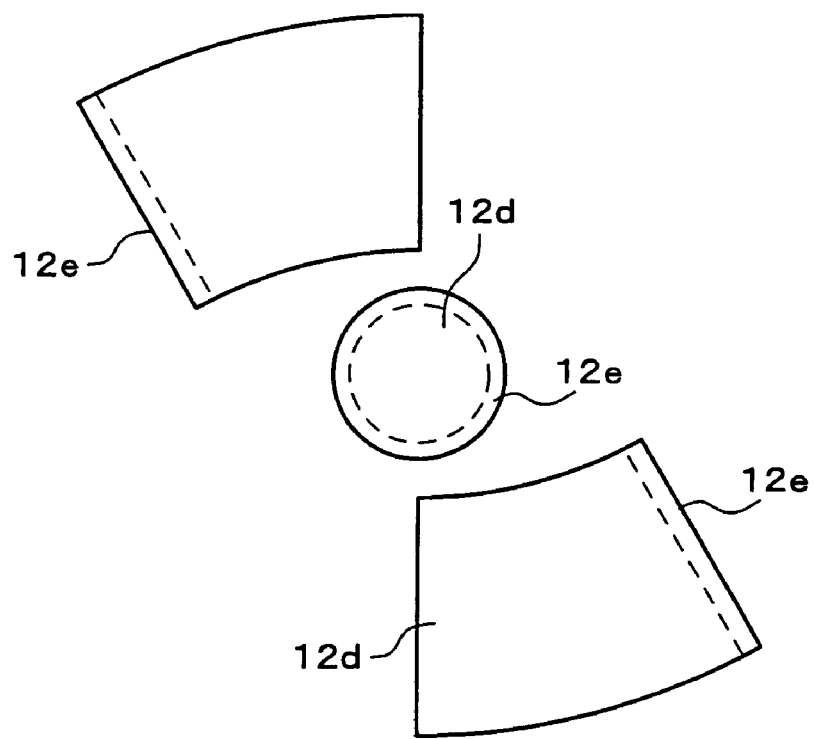

The shape of the film piece is not particularly limited, but in general, as shown in FIGS. 14 (a) and 14 (b), a method to make a plurality of film pieces made by cutting each face in a rough development elevation of the biodegradable molded article after molding (for example, the cup-shaped container 10c) is preferably used.

The film pieces 12d have an overlap section 12e equivalent to an overlapped width as shown in FIGS. 14 (a) and 14 (b). The overlap section 12e is provided around the film pieces 12d as the bottom, or at the end bonded when the film pieces 12d as the side are cylindrically rolled.

At the overlap section 12e, the film pieces 12d are overlapped at a given position of each of the film pieces 12d when they are placed in the cavity of the mold. This softens and bonds (fuses) the overlap section 12e and a part of the film pieces 12d overlapped thereon at the time of molding. In result, the substantially cup-shaped coating film 12 is formed by putting together a plurality of film pieces 12d. The coating film 12 is further attached to the surface of the expanded molded article, resulting in the cup-shaped container 10c in accordance with the present invention.

The shape of the film pieces 12d as the rough development elevation is not particularly limited. As an example, in case of making the cup-shaped container 10c, as shown in FIG. 14 (a), two film pieces 12d may correspond to the side face and the bottom face by dividing the development elevation into two, or three film pieces 12d may correspond to one bottom face and two side faces by dividing the development elevation into three, as shown in FIG. 14 (b). As mentioned above, the film pieces 12d are shaped in correspondence with the cup-shaped biodegradable molded article etc. with all the film pieces 12d overlapped at the overlap section 12e.

In this method, the coating film 12 before attachment is further formed into a shape after molding compared with Method 1 or Method 3. Therefore, in case of using the coating film 12 mainly made of a biodegradable plastic having poor drawability, especially, in case of molding the biodegradable molded article of deep drawing shape such as the cup-shaped container 10c with the coating film 12 of poor drawability, or in case of optionally adjusting thickness of the coating film 12 after attachment, this method can be effectively used.

Figure 15:
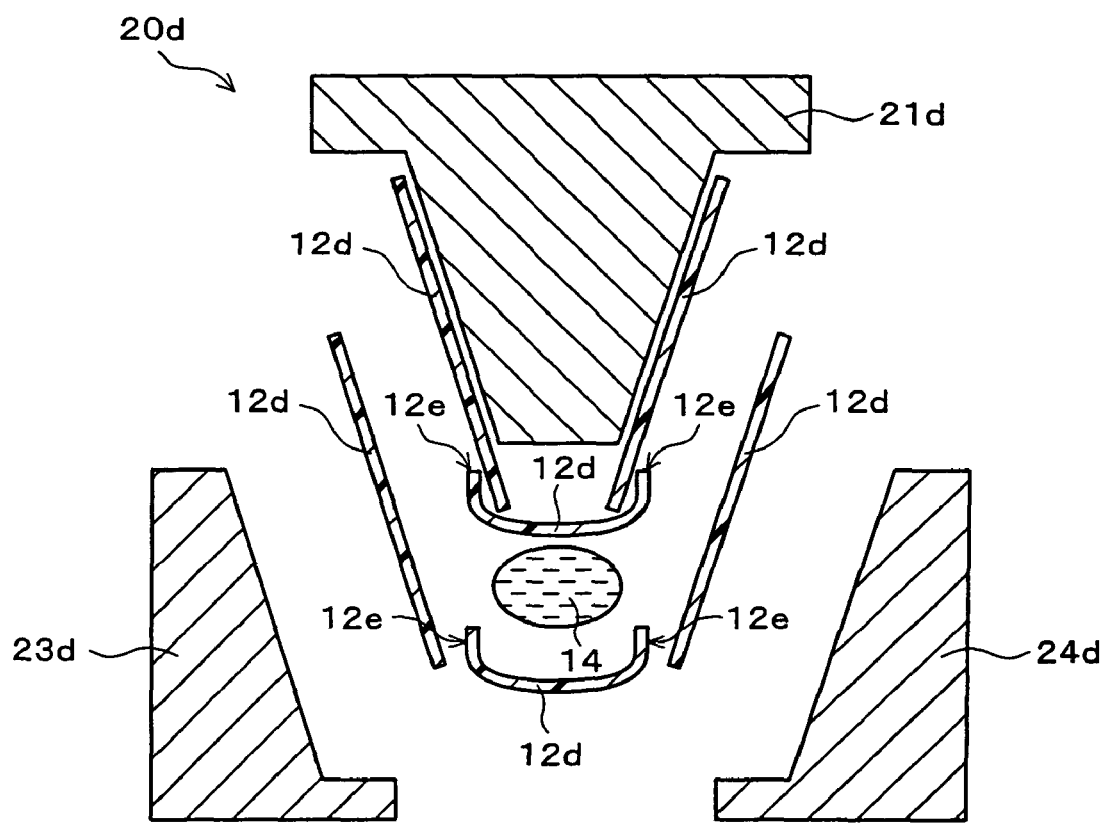
FIG. 15 is an explanatory view describing a method to manufacture a biodegradable molded article in accordance with still another embodiment of the present invention in order to manufacture the cup-shaped container shown in FIG. 4.

Explaining the Method 4 more particularly, as shown in FIG. 15, in the metal mold 20d shown in FIGS. 10 (a) and 10 (b), the film pieces 12d corresponding to the bottom face of the cup-shaped container 10c and the film pieces 12d corresponding to the side face are placed along the shape of the cavity of the lower mold parts 23d and 24d. The overlapped part 12e is completely overlapped.

Then, the molding material 14 is further supplied on the film piece 12d shaped to the substantial cup shape. On the other hand, the film piece 12d corresponding to the bottom face of the cup-shaped container 10c and the film piece 12d corresponding to the side face are placed in accordance with the shape of the upper mold part 21d. The upper mold part 21d is fit in the lower mold parts 23d and 24d together with the film pieces 12d. Of course, these mold parts 21d, 23d and 24d are heated up to the temperature less than the melting point of the biodegradable plastic that is the main ingredient of the coating film 12.

Afterwards, heating, pressurizing and molding are done using the above external heating and internal heating. At the time of this heating, pressurizing and molding, a layer of the coating film 12 is formed on the surface of the expanded molded article (main body 11c) with no gap by fusing the overlap section 12e of the film pieces 12d. In result, by this one process, the cup-shaped container 10c as the biodegradable molded article in accordance with the present invention can be obtained. (Refer to FIG. 4.)

<Method 5>

In Method 5, based on Method 4, the film pieces 12c are adhered on the overlap section 12e and pre-formed to almost conform to the outlines of the biodegradable molded article before molding. This method can be preferable used for molding the biodegradable molded article of a deep drawing shape or more complicated shape such as the cup-shaped container shown in FIG. 4.

This method is basically the same as Method 4. The overlap sections 12d and 12d are securely adhered through fusion to pre-form an outline film. This is an effective method in case of using the coating film 12 that is difficult to fuse the overlap sections 12d and 12d in the above method 4 at one-time molding.

Figure 16:
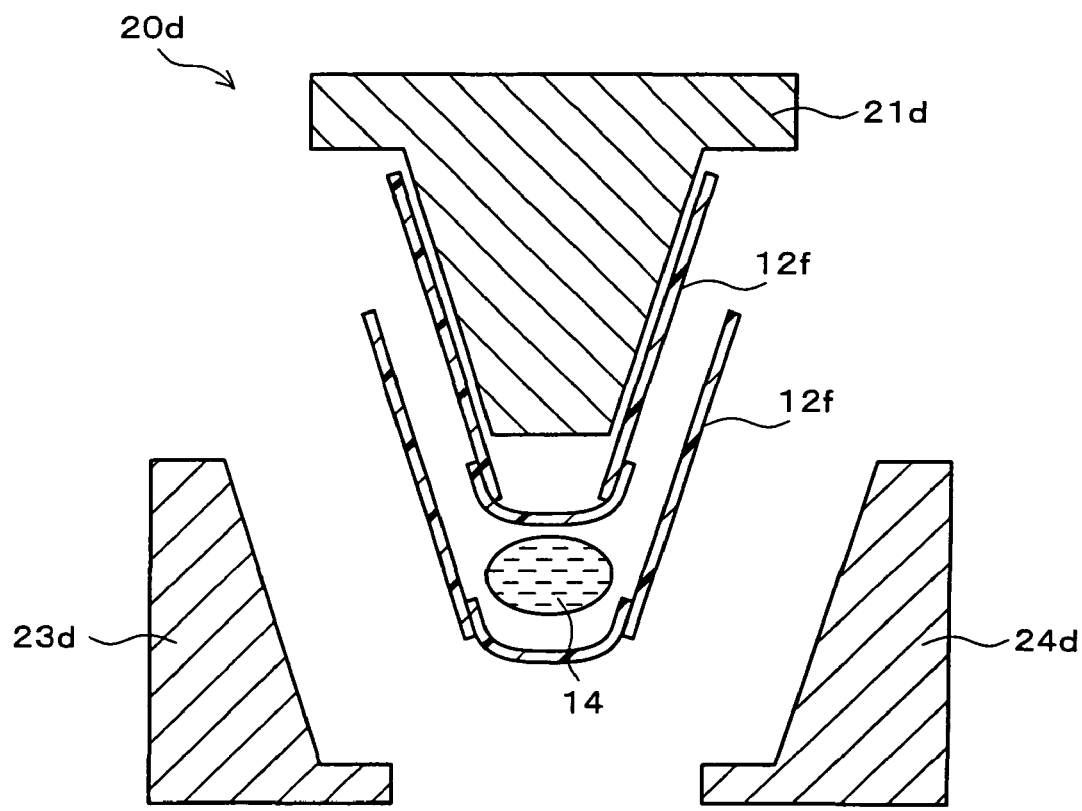
FIG. 16 is an explanatory view describing a method to manufacture a biodegradable molded article in accordance with still another embodiment of the present invention, in order to manufacture the cup-shaped container shown in FIG. 4.

Explaining Method 5 more particularly, as shown in FIG. 16, in the metal mold 20d shown in FIGS. 10 (a) and 10 (b), the outline films 12f that are adhered in advance in the substantial cup shape are placed in two piles between the upper and lower mold parts 21d, 23d and 24d, and the molding material is supplied between the outline films 12f and 12f. In this condition, the metal mold 20b is heated up to the temperature less than the melting point of the biodegradable plastic that is the main ingredient of the outline film 12f (coating film 12). Afterwards, the upper and lower mold parts 21c, 23d and 24d are fit together, heated, pressurized and molded using the external heating or internal heating. By this one process, it is possible to obtain the cup-shaped container 10c as the biodegradable molded article in accordance with the present invention (refer to FIG. 4).

<Method 6>

Method 6 is a method to combine Method 2 with Method 5. That is to say, the film pieces 12c are adhered at the overlap section 12d to almost conform to the outlines of the biodegradable molded article before molding. Then, the overlapped film pieces are converted to a substantial bag shape wherein the molding material is portioned. This method can be preferably used for molding the biodegradable molded article of a deep drawing shape and more complicated shape such as the cup-shaped container 10c shown in FIG. 4, as Method 4 or Method 5.

Also in this method, as Method 2 and Method 3, the coating film 12 is preformed into a package film and the molding composition is prepared wherein the molding material is contained. So, the molding composition can be stored for a certain period of time and molding is ready only by pouring the molding composition in the mold at one time, thereby further simplifying the manufacturing process.

Figure 17:
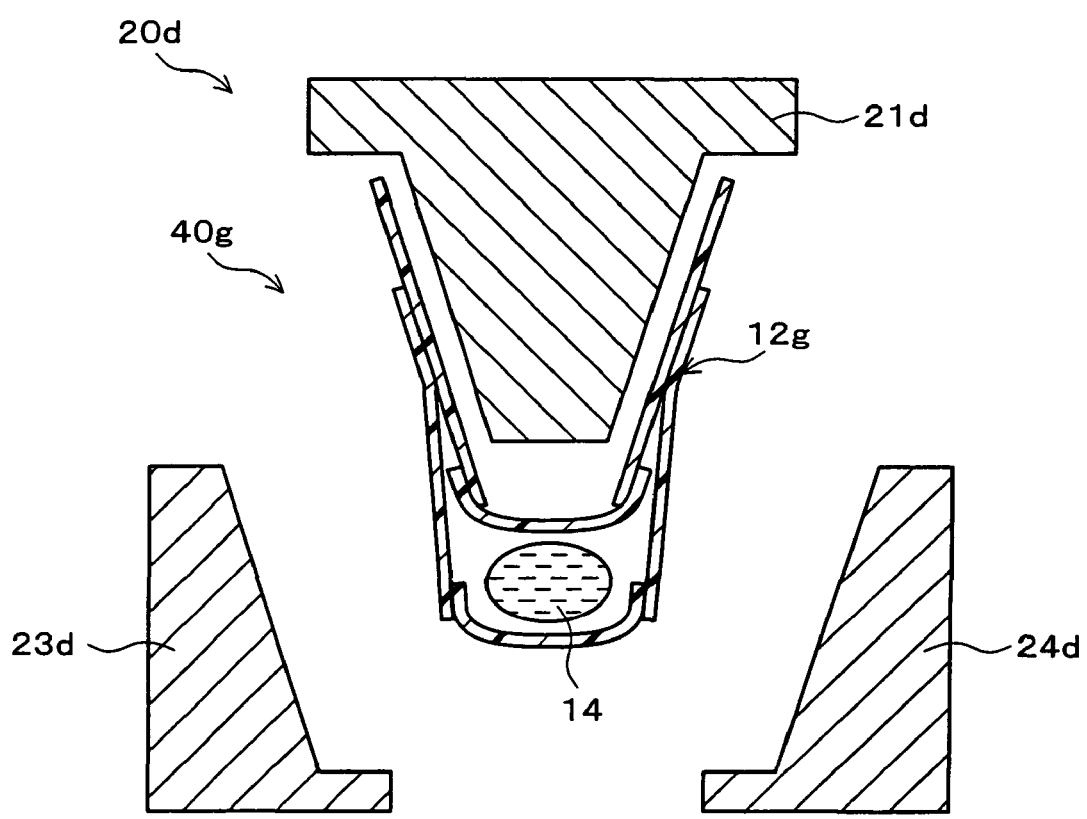
FIG. 17 is an explanatory view describing a method to manufacture a biodegradable molded article in accordance with still another embodiment of the present invention, in order to manufacture the cup-shaped container shown in FIG. 4.

Explaining Method 6 more particularly, as shown in FIG. 17, the coating film 12 is formed into a film piece in correspondence with the outlines of the cup-shaped container 10c, and the film pieces are bonded together and formed into the outline film. In addition, two of the outline films are bonded together and converted into the bag-shaped outline packaging film 12g. An approximate amount of molding material 14 is portioned in the outline packaging film 12g to prepare the molding composition 40g. The molding composition 40g may be stored in a given storage case. Then, in the metal mold 20d shown in FIGS. 8 (a) and (b), the substantial cup-shaped molding composition 40g taken out of the storage case are placed on the lower mold parts 23d and 24d. This is just ready for molding.

In this condition, the metal mold 20d is heated up to the temperature of less than the melting point of the biodegradable plastic that is the main ingredient of the coating film 12 (outline packaging film 12g). Afterwards, the upper and lower mold parts 21d, 23d and 24d are fit, heated, pressurized and molded using the external heating and internal heating. By this one process, it is possible to obtain the cup-shaped container 10c as the biodegradable molded article in accordance with the present invention (refer to FIG. 4).

Embodiment 2

An embodiment of the present invention is described below based on FIG. 20 to FIG. 24. The present invention is not limited to this embodiment. For convenience of explanation, the members having the same function as each member shown in the above embodiment 1 have the same code with no explanation.

First, a biodegradable molded article manufactured by a method of this embodiment has a structure that a coating film is formed directly on a surface of an expanded molded article, as the biodegradable molded article manufactured by the method of Embodiment 1.

The method of this embodiment is a method to manufacture a biodegradable molded article of a deep drawing shape, or a method suitable to manufacture a biodegradable molded article of a deep drawing shape.

Figure 21:
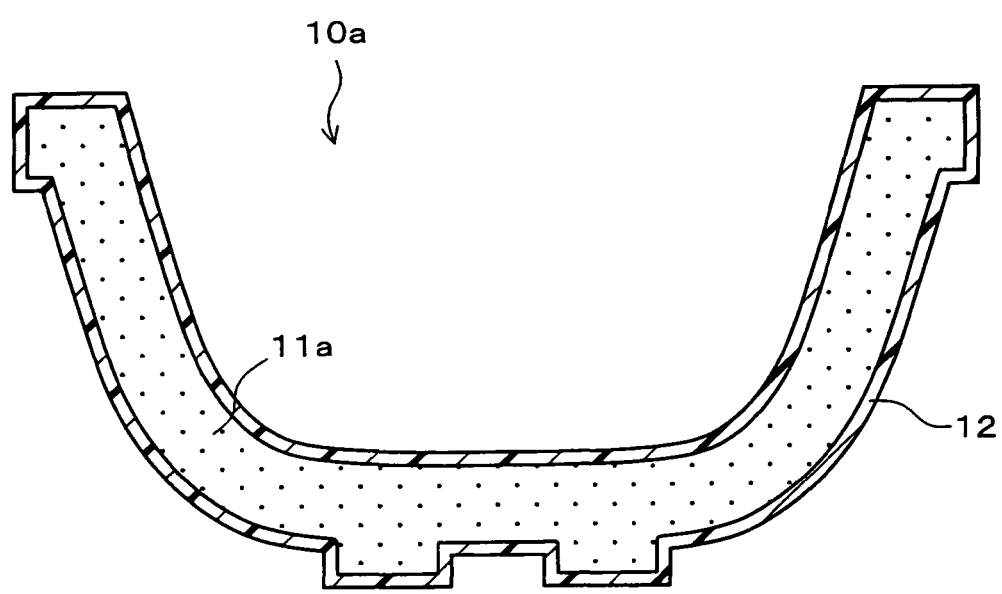
FIG. 21 is a schematic cross-sectional view showing a bowl-shaped container as an example of a biodegradable molded article manufactured by a method of the present invention.

The biodegradable molded article of a deep drawing shape is, for example, the bowl-shaped container 10a shown in FIG. 2 explained in Embodiment 1, an almost similar bowl-shaped container such as the bowl-shaped container 10a shown in FIG. 21, or a cup-shaped container such as the cup-shaped container 10c show in FIG. 4 explained in the embodiment 1.

The method to manufacture a biodegradable molded article in accordance with this embodiment, is a method to manufacture the biodegradable molded article of a deep drawing shape that a slurry or dough molding material mainly made of starch or a derivative thereof and obtained by mixing water therewith, and a coating film mainly made of a biodegradable plastic and having hydrophobicity are used, the coating film is placed substantially flat with the molding material in the mold of a deep drawing shape, and at the same time, the coating film is softened and pressure-bonded on the surface of the expanded molded article.

The method to manufacture the biodegradable molded article in accordance with this embodiment is a method to mold the molding material through steam expansion and at the same time to directly attach the coating film to the expanded molded article. Accordingly, as Embodiment 1, this embodiment has above-mentioned four advantages compared with the after attaching method. It is thus possible to manufacture the biodegradable molded article efficiently, at low cost, and easy to use for disposable purpose.

The molding material and the coating film used in this embodiment is the same as those used in Embodiment 1.

The desirable molding method in this embodiment is a method to use a mold of a deep drawing shape having a cavity conformed to a shape of a desirable molded article and consisting of at least two parts and mold the expanded molded article and the coating film by pouring, heating and pressurizing the molding material and the coating film in the cavity of the mold.

Therefore, the mold of a deep drawing shape may have a cavity conformed to a shape of a desirable molded article and be equipped with at least two metal mold parts dividable to remove the expanded molded article after molding. Incase that the biodegradable container is manufactured as the biodegradable expanded molded article, a mold consisting of a metal convex mold part (convex mold) and a metal concave mold part (concave mold) fit in each other is preferably used.

Figure 22A:
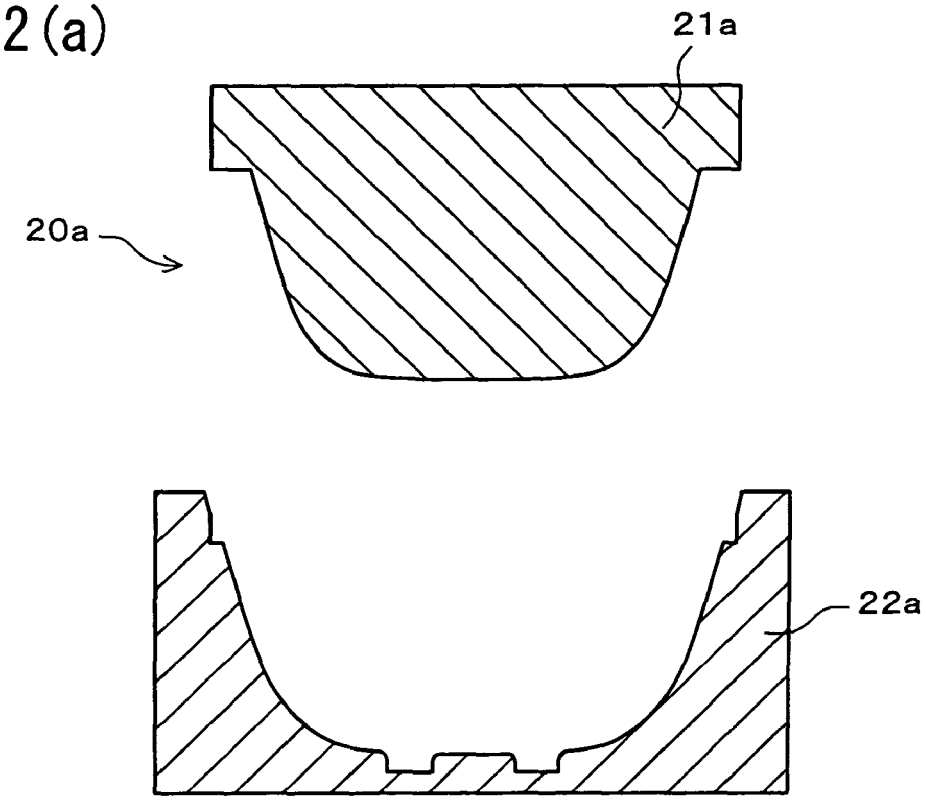
FIG. 22 (*a*) and FIG. 22 (*b*) are schematic cross-sectional views showing a structure of the mold to mold the bowl-shaped container shown in FIG. 21.
Figure 22B:
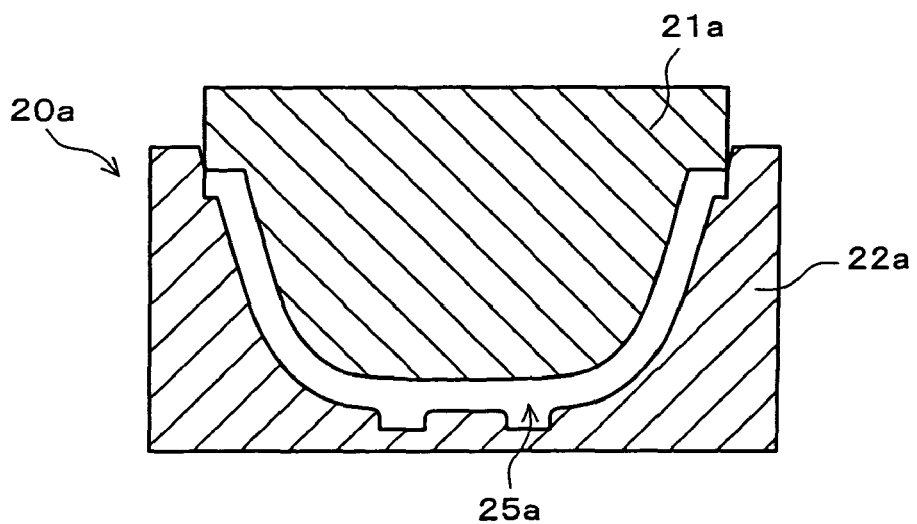

The mold of a deep drawing shape consisting of the convex mold part and a concave mold part includes, for example, the metal mold 20a consisting of a pair of the metal convex mold part (convex mold) 21a and the metal concave mold part (concave mold) 22a shown in FIG. 22 (a), the metal mold similar to the metal mold 20c shown in FIG. 9 (a) except that an exhaust hole which is not shown in FIG. 9 (a) is not provided, and the metal mold similar to the metal mold 20c shown in FIG. 10 (a) except that an exhaust hole that is not shown in FIG. 10 (a) is not provided.

The metal mold 20a shown in FIG. 22 (a) is in a combined condition of the convex mold part 21a and the concave mold part 22a, wherein the cavity 25a conformed to the shape of the desirable expanded molded article (refer to FIG. 21) is formed as shown in FIG. 22 (b).

The metal mold 20a shown in FIG. 22 (a) is equipped with the same structure as that of the metal mold 20a shown in FIG. 5 (a), except that the exhaust holes 31a ad 32a, exhaust tube 33a, outlet 34a and insulator 27 are not provided, and that the shape of the cavity 25a is a little different.

Figure 24:
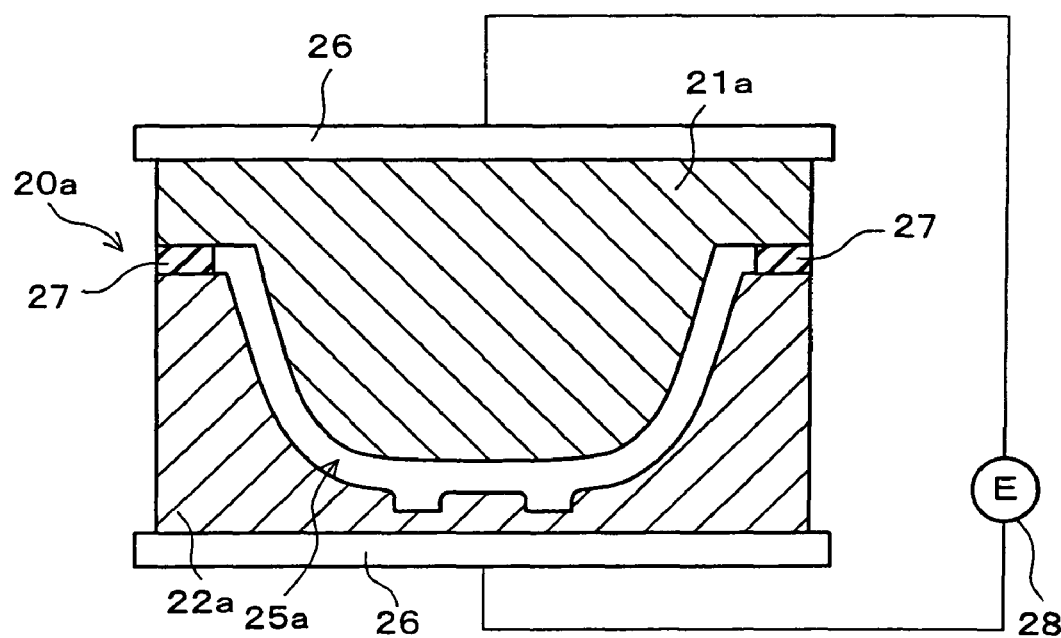
FIG. 24 is a schematic explanatory view showing an example having an electrode for internal heating in the mold shown in FIG. 22 (*a*) and FIG. 22 (*b*).

In addition, the heating method at the time of molding in this embodiment is the same as Embodiment 1. As a method to internally heat the molding material supplied in the cavity 25a, as schematically shown in FIG. 24, it is possible to use a heating device using the metal mold 20a consisting of the convex mold part 21a and the concave mold part 22a, connecting the electrodes 26 and 26 to the convex mold part 21a and the concave mold part 22a, respectively, placing an insulator 27 at a contacting part with the convex mold part 21a and the concave mold part 22a, and connecting the electrodes 26 and 26 to the power supply 28.

Figure 20:
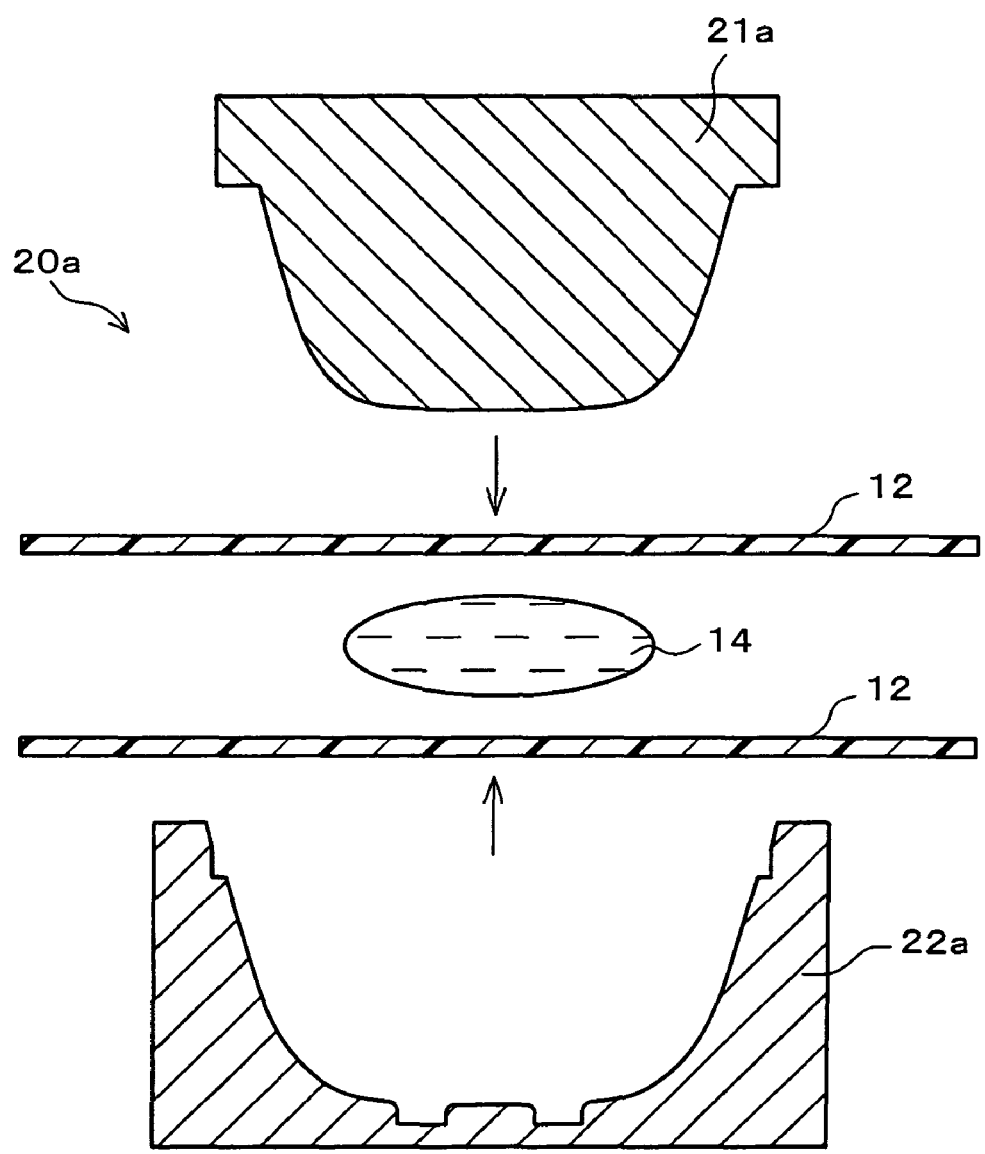
FIG. 20 is an explanatory view describing a method to manufacture a biodegradable molded article in accordance with an embodiment of the present invention.

Next, an embodiment of a method to manufacture a biodegradable molded article of a deep drawing shape in accordance with the present invention is described based on FIG. 20. The case that the bowl-shaped container 10a is manufactured using the bowl-shaped metal mold 20a consisting of the convex mold part 21a and the concave mold part 22a shown in FIG. 22 (a), is described in more detail as an example.

First, as shown in FIG. 20, the convex mold part 21a and the concave mold part 22a of the metal mold 20a divided into two are placed so that the center of the convex mold part 21a and the center of the concave mold part 22a may be aligned on plumb line and the convex mold part 21a and the concave mold part 22a may be arranged in an upper and lower position, respectively, as Embodiment 1.

Next, two coating films 12 that are not preformed, are placed substantially flat with the molding material 14 between the convex mold part 21a and the concave mold part 22a as Embodiment 1.

Then, as Embodiment 1, by heating and (pressurizing) molding the molding material 14 and the coating film in the metal mold 20a using the above external heating and/or internal heating, the main body 11a is molded through steam expansion and at the same time, the coating film 12 is softened and pressure-bonded (adhered) to the surface of the main body 11a. By this one process, the bowl-shaped container 10a can be molded as the biodegradable molded article in accordance with the present invention.

Figure 23:
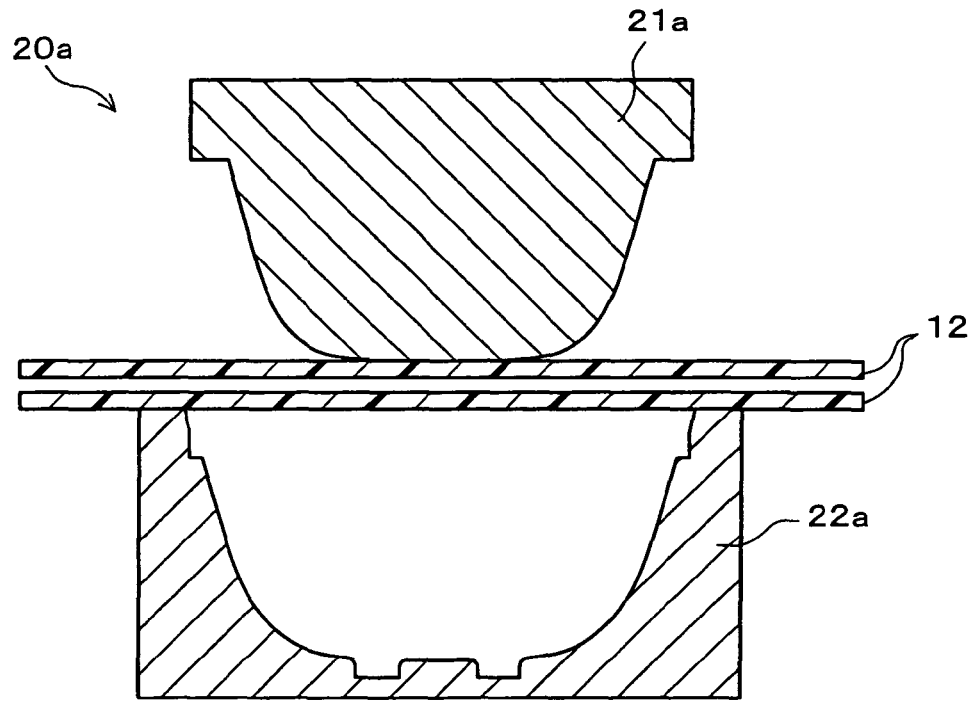
FIG. 23 (*a*) and FIG. 23 (*b*) are schematic cross-sectional views showing how the coating film deforms in the mold shown in FIG. 22 (*a*) and FIG. 22 (*b*).
Figure 23:
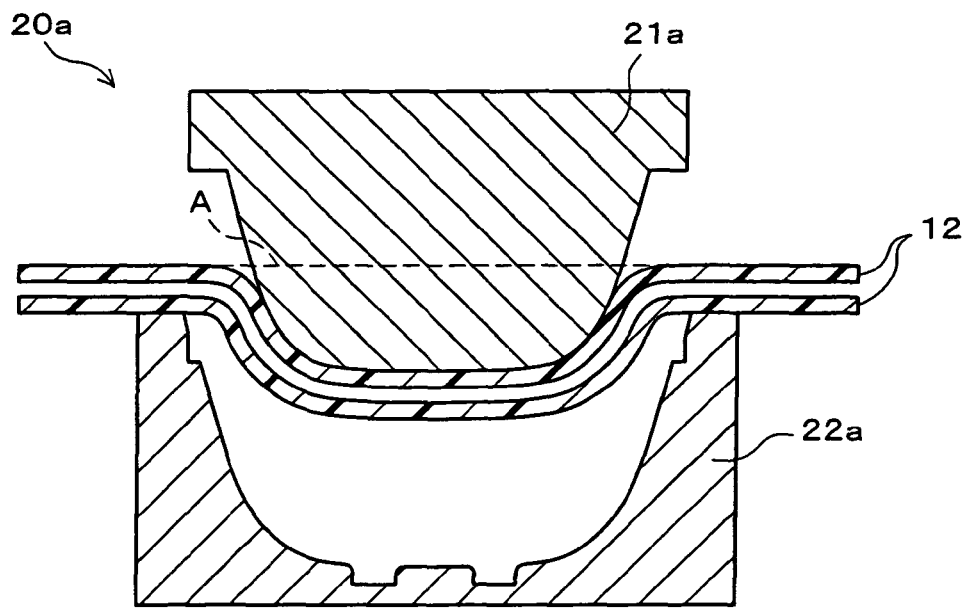

When heating and molding the molding material 14 and the coating film 12, at least either one of the convex mold part 21a and the concave mold part 22a is moved to the direction where the convex mold part 21a is fit in the concave mold part 22a. Therefore, as shown in FIG. 23 (a), the convex mold part 21a contacts the center part of the upper coating film 12, which starts to deform by pressure from the convex mold. Then, the center part of the coating film 12 is deforming to a shape of the surface of the convex mold part 21a as shown in FIG. 23 (b), finally to the shape substantially same as the surface of the convex mold part 21a when the convex mold part 21a is fit in the concave mold part 22a. In FIG. 23 (a) and FIG. 23 (b), the coating film 12 is only shown for simplification of the drawing.

As mentioned above, the center part of the coating film 12 is deformed and molded by pressure from the convex mold part 21a. Since the convex mold part 21a has a deep drawing shape, the coating film is significantly drawn. Accordingly, it is important to optimize the speed of drawing the coating film 12.

The speed of drawing the coating film 12 depends on a relative moving speed of the convex mold part 21a to a fixed surface A (refer to FIG. 23 (b)) of the coating film 12 while the coating film 12 is being deformed. The fixed surface A of the coating film is a flat face formed by connecting parts that are not deformed on an outer periphery of the coating film 12 (in this case, a fixed part of an upper part of the concave mold part 22a).

In the method of this embodiment, it is preferable to maintain the relative moving speed of the convex mold part 21a to the fixed surface A of the coating film within 8 mm/s to 12 mm/s, at least while the coating film 12 is being deformed.

This can maintain the speed of drawing the coating film 12 by the convex mold part 21a almost consistently and at an optimal speed. It is thus possible to avoid any tears, cracks or pinholes on the coating film 12. If the relative moving speed of the convex mold part 21a to the fixed surface A of the coating film is faster than 12 mm/s, some splits or cracks may be caused more often because the coating film 12 is drawn rapidly. On the contrary, if the relative moving speed of the convex mold part 21a to the fixed surface A of the coating film is slower than 8 mm/s, some pinholes may be caused more often due to some unclear reasons.

Especially, in the manufacturing method of this embodiment, since the molded article of a deep drawing shape (bowl-shaped container 10a) is manufactured using the substantially flat coating film 12, the coating film 12 is significantly drawn. In case that a biaxially stretched film having especially excellent heat resistance and gas impermeability is used as the coating film 12, it is relatively difficult to draw the coating film 12 not to cause tears, cracks or pinholes on the coating film 12. However, by setting the moving speed within the above range, it is possible to avoid tears, cracks or pinholes also in the above case. In result, the main body 11a can be more securely coated by the coating film 12 and can ensure water resistance of the bowl-shaped container 10a more certainly.

In the method of this embodiment, since the outer periphery of the coating film 12 is fixed at the upper part of the concave mold part 22a, the fixed surface A of the coating film is at a given distance from the upper surface of the concave mold part 22a. Therefore, the relative moving speed of the convex mold part 21a to the fixed surface A of the coating film is equal to the relative approach speed of the convex mold part 21a and the concave mold part 21a. On the other hand, it is possible to fix the outer periphery of the coating film 12 using another fixing means, instead of fixing the outer periphery of the coating film 12 on the upper end of the concave mold part 22a as this embodiment. In the case, the relative moving speed of the convex mold part 21a to the fixed surface A of the coating film is not equal to the relative approach speed of the convex mold part 21a and the concave mold part 21a, but equal to the relative moving speed of the convex mold part 21a and the fixing means.

Also, in this embodiment, the period of time when the coating film 12 is deformed, is from the time when the coating film 12 starts to deform by pressure from the convex mold part 21a (when the convex mold part 21a shown in FIG. 23 (a) first contacts the upper coating film 12) through the time when the coating film 12 is molded to the substantially same shape as the surface of the convex mold part 21a (when the convex mold part 21 shown in FIG. 23 (b) is fit in the concave mold part 22a).

The above range of the relative moving speed is based on an experiment using the coating film 12 having a thickness of 20 to 80 •m. However, also in case that the coating film of the other thickness, it is estimated that almost the same result as the case of using the coating film 12 having a thickness of 20 to 80 •m may be obtained by setting the above range of the relative moving speed of the convex mold part 21a to the fixed surface A of the coating film.

In the method of this embodiment, it is preferable to straightly approximate the convex mold part 21a and the concave mold part 22, at least while the coating film 12 is deformed. That is to say, it is preferable that the relative movement of the convex mold part 21a to the concave mold part 22 is a linear motion.

According to the method above, for example, compared with the case that one side of the convex mold part 21a is joined with one side of the concave mold part 22 with a hinge to rotate the convex mold part 21a, pressure applied to the coating film 12 by the convex mold part 21a becomes more consistent. Thus, it is possible to draw the coating film 12 consistently and make the thickness of the coating film 12 uniform. Therefore, an effect by the coating film 12, that is, water resistance of the biodegradable molded article is further improved.

In the method of this embodiment, in case that the relative moving speed of the convex mold part 21a to the fixed surface A of the coating film is maintained within 8 mm/s to 12 mm/s while the coating film 12 is deformed, the period of time from when the coating film 12 starts to deform through the time when the convex mold part 21a is fit in the concave mold part 22a, is limited to a specific range depending on the shape of the metal mold 20a. On the other hand, the relative moving speed of the convex mold part 21a to the fixed surface A of the coating film until the coating film 12 starts to deform can be optionally set.

In the method of this embodiment, it is preferable to approximate both of the convex mold part 21a and the concave mold part 22a to each other at least until the coating film 12 starts to deform.

According to the method above, since both of the convex mold part 21a and the concave mold part 22a are moved to approximate each other, it makes the time (fitting time) shorter necessary to fit the convex mold part 21a and the concave mold part 22a, thereby reducing the manufacturing time.

In case that both of the convex mold part 21a and the concave mold part 22a are moved to approach to each other, both of the convex mold part 21a and the concave mold part 22a may be moved to approximate each other until the convex mold part 21a is fit in the concave mold part 22a. However, it is preferable that the convex mold part 21a only is moved after the coating film 12 starts to deform, while the both of the convex mold part 21a and the concave mold part 22a are moved to approach to each other until the coating film 12 starts to deform. This eliminates the necessity to move the coating film 12, when the coating film 12 is held substantially flat as the case of transporting the coating film 12 continuously surface.

Heating temperature of the metal mold 20a, various conditions relating to internal heating, heating time and molding pressure at the time of heating and molding is the same as Embodiment 1.

In other words, it is preferable that the metal mold 20a is heated at not less than the softening point of the coating film 12 and at least 10° C. lower than the melting point thereof at the time of heating and molding.

It is thus possible to soften and mold the coating film 12 into a shape corresponding to the metal mold 20a without melting and to avoid pinholes on the coating film 12. Since it is possible to more securely coat the main body 11a with the coating film 12, thereby further ensuring water resistance of the bowl-shaped container 10a.

Also, to reduce manufacturing time and improve the characteristics including strength of the bowl-shaped container 10a, it is more preferable Temperature Condition A that "the temperature of the metal mold 20a is not less than the softening point of the coating film 12, and at least 10° C. lower than the melting point thereof and at least more than 130° C. is satisfied. It is still more preferable temperature condition that" the temperature of the metal mold 20a is not less than the softening point of the coating film 12, at least 10° C. lower than the melting point thereof and not less than 150° C. (hereinafter referred to as Temperature Condition B) is satisfied.

Thermal characteristics of the coating film 12 necessary to satisfy the above Temperature Condition A or B is the same as Embodiment 1. In other words, to satisfy Temperature Condition A, it is necessary to use the coating film 12 whose softening point is not less than 130° C. and melting point is not less than 140° C. To satisfy Temperature Condition B, it is necessary to use the coating film 12 whose softening point is not less than 150° C. and melting point is not less than 160° C.

It is preferable that the coating film 12 has thermal characteristics to set a higher heating temperature at the time of heating and molding and to improve heat resistance of the bowl-shaped container 10a as Embodiment 1. More particularly, the softening point of the coating film 12 is preferably not less than 120° C., more preferably not less than 130° C., and still more preferably not less than 150° C. The melting point of the coating film 12 is preferably not less than 150° C., more preferably not less than 170° C., and still more preferably not less than 200° C. Also, preferably the coating film 12 has the softening point of not less than 120° C. and the melting point of not less than 150° C., more preferably, the softening point of not less than 130° C. and the melting point of not less than 170° C., and the most preferably, the softening point of not less than 150° C. and the melting point of not less than 200° C.

In the manufacturing method of this embodiment, it is preferable that a slip agent is applied to a surface of the metal mold 20a contacting the coating film 12. This can reduce contact friction between the surface of the coating film 12 and the surface of the metal mold 20a, and to avoid damages including tears and cracks on the coating film 12 due to friction with the metal mold 20a when the coating film 12 is drawn by the metal mold 20a.

The type of the slip agent and method to apply on the surface of the metal mold 20 may use the example in Embodiment 1. From the above reason, it is preferable to form a solid layer on the surface of the metal mold 20a. The solid layer formed on the surface of the metal mold 20a is preferably a fluoroplastic layer. Therefore, it is the most preferable that the slip agent is a fluoroplastic layer (fluoroplastic coating) formed on the surface of the metal mold 20a. The fluoroplastic examined in Embodiment 1 may be used, but tetrafluoroethylene is especially preferably from the above-mentioned reason.

As mentioned above, the manufacturing method of this embodiment is a method to use the slurry or dough molding material 14 mainly made of starch or a derivative thereof and obtained by adding water thereto and the coating film mainly made of a biodegradable plastic and having hydrophobicity, place the molding material 14 and the coating film 12 substantially flat in the metal mold 20a of a deep drawing shape, mold the main body 11a through steam expansion by heating and molding the molding material 14 and the coating film 12 in the metal mold 20a, and at the same time, soften and pressure bond the coating film 12 to a surface of the main body 11a to make the bowl-shaped container 10a.

The manufacturing method of this embodiment is a method to use the metal mold 20a consisting a pair of the convex mold part 21a and the concave mold part 22a, place the molding material 14 and the coating film 12 between the convex mold part 21a and the concave mold part 22a before heating and molding, deform the center part of the coating film 12 by moving at least either one of the convex mold part 21a and the concave mold part 22a to a direction where these mold parts are fit together at the time of heating and molding, and to maintain the relative moving speed of the convex mold part 21a to the fixed surface A of the coating film formed by connecting a surface of non-deforming parts on the outer periphery of the coating film 12 within the range of 8 mm/s to 12 mm/s.

Also, the manufacturing method of this embodiment is a method wherein heating is performed so that the temperature of the metal mold 20a is not less than the softening point of the coating film 12 and 10° C. lower than the melting point thereof at the time of heating and molding.

In the method above, the case of manufacturing the bowl-shaped container 10a using the metal mold 20a is explained. It is also possible to manufacture a biodegradable molded article having another shape such as the cup-shaped container 10b by a metal mold having another deep drawing shape including the metal molds 20b and 20c.

Though the method above is especially suitable to manufacture a biodegradable molded article of a deep drawing shape, the heating method under the above conditions is also useful to manufacture a biodegradable molded article horizontally enlarging in size, such as the plate-shaped container 10b.

In the method above, the convex mold part 21a and the concave mold part 22b are placed in an upper position and a lower position, respectively. However, the concave mold part 22b and the convex mold part 21b can be placed in an upper position and a lower position, respectively. In this embodiment, the convex mold part 21b and the concave mold part 22b are placed in an upper position and a lower position, respectively, and they move vertically. However, placement and moving direction is not especially limited and may be moved horizontally.

In the method above, for molding steam expansion molding in the mold, the molding material is inserted between two coating films 12 which coat the entire surface of the expanded molded article. However, in the present invention, the coating film may coat the upper part only of the expanded molded article.

On the other hand, for example, as a container for ready-to-serve noodles (the bowl-shaped container 10a shown in FIG. 21 etc.), in case that gas impermeability is required for the entire container not only to pour boiling water in and but also to avoid oxidation or moisture absorption of dried noodles contained, it is preferable to attach the coating film 12 on the whole container.

Next, the present invention is described in more detail based on examples and comparative examples, however, the present invention is not limited to these examples.

(Molding Material)

Various types of starch as the main ingredient (including a derivative thereof), additives and water are uniformly mixed by a mixer to make compositions shown in Table 1 and to prepare slurry molding materials (1) to (3) and dough molding materials (4) to (6) and (8).

TABLE 1

|  |  | Molding material (weight %) | | | | | | | |
|  |  | Slurry | | | | Dough | | | |
|  |  | (1) | (2) | (3) | (7) | (4) | (5) | (6) | (8) |
| Starch | Potato starch | 50 | 25 | 40 | 50 | 0 | 25 | 25 | 65 |
| Derivative | Cross-linked starch phosphate | 0 | 20 | 0 | 0 | 60 | 25 | 0 | 0 |
| | Total of starch | 50 | 45 | 40 | 50 | 60 | 50 | 25 | 65 |
| Extending agent | Okara (bean curd refuse) | 0 | 0 | 0 | 0 | 0 | 0 | 15 | 0 |
| | Beer yeast residues | 0 | 0 | 0 | 0 | 0 | 0 | 10 | 0 |
| | Total of extending agents (extending additives) | 0 | 0 | 0 | 0 | 0 | 0 | 25 | 0 |
| | Total main solids | 50 | 45 | 40 | 50 | 50 | 50 | 50 | 65 |

TABLE 1-continued

| | | Molding material (weight %) | | | | | | | |
|---|---|---|---|---|---|---|---|---|---|
| | | Slurry | | | | Dough | | | |
| | | (1) | (2) | (3) | (7) | (4) | (5) | (6) | (8) |
| Strength adjusting agent | Virgin pulp | 0 | 0 | 5 | 0 | 0 | 10 | 0 | 0 |
| | Waste paper pulp | 0 | 0 | 0 | 0 | 0 | 0 | 5 | 0 |
| | Calcium carbonate | 0 | 0 | 0 | 0 | 10 | 5 | 0 | 0 |
| Plasticizer | Sorbitor | 0 | 1 | 0 | 0 | 2 | 0 | 2 | 2 |
| Emulsifier | Glycerin fatty acid ester | 0 | 0.5 | 0 | 0 | 0 | 0 | 0 | 0 |
| Stabilizer | Guar gum | 0 | 2 | 0.5 | 0 | 0 | 0 | 0 | 0 |
| Releasing agent | Magnesium stearate | 0 | 0.5 | 0.5 | 0 | 1 | 1 | 1 | 0 |
| Expanding agent | Sodium hydrocarbonate | 0 | 0 | 0.5 | 4 | 2 | 2 | 0 | 0 |
| Coloring agent | Cochineal | 0 | 0 | 0.5 | 0 | 0 | 0 | 0 | 0 |
| Total of functional additives | | 0 | 4 | 7 | 4 | 7 | 18 | 8 | 2 |
| Water | | 50 | 51 | 53 | 46 | 25 | 32 | 42 | 33 |

(Coating Film)

The five coating films F1, F2, F3, F4 and F5 shown in Table 2 were prepared as the coating film.

TABLE 2

| No. | Type | Thickness (m) | Softening point (° C.) | Melting point (° C.) |
|---|---|---|---|---|
| F1 | Polylactide ① | 25 | 70 | 130 |
| F2 | Polylactide ② | 50 | 90 | 140 |
| F3 | Denatured Polyester ① | 35 | 110 | 150 |
| F4 | Denatured Polyester ② | 50 | 130 | 170 |
| F5 | Denatured Polyester ③ | 50 | 150 | 200 |

The coating films F3 to F5 made of denatured polyesters shown in Table 2, have repeating units consisting of terephtharic acid, sulfonic metal salt (sodium salt 5-sulfonic sulfate), aliphatic dicarboxylic acid (glutaric acid), ethylene glycol, and diethylene glycol, and these are aromatic polyester extended films that are biaxially stretched films of aromatic polyester copolymer containing about 50 to 90 mole % of terephtharic acid, about 0.2 to 6 mole % of sulfonic metal salt, and about 4 to 49.8 mole % of aliphatic dicarboxylic acid of acidic components, and about 50 to 99.9 mol % of ethylene glycol and about 0.1 to 50 mole % of diethylene glycol of glycolic components.

Example 1

For all of the combinations (16 combinations in total) of 8 molding materials (1) to (8) shown in Table 1 as the molding material 14 and two coating films F3 and F5 shown in Table 2 as the coating film 12, a round plate-shaped container 10b was manufactured by the method of Embodiment 1 explained with FIGS. 6 (a) and 6 (b).

Using the metal mold 20b having the exhaust holes 31b and 32b shown in FIGS. 6 (a) and 6 (b) and with the cavity 25b in uniform thickness of 2.5 mm (corresponding to thickness of the round plate-shaped container 10b), the molding material 14 is placed between a pair of coating films 12 in the metal mold 20b. Then, the metal mold is clamped by fitting the convex mold part 21b in the concave mold part 22b, the main body 11b is obtained by heating and molding the molding material 14 and the coating film 12 in the metal mold 20b and steam-expanding the molding material 14, and at the same time, the coating film 12 is softened and pressure-bonded to the surface of the main body 11b. In addition, air existing between the coating film 14 and the surface of the metal mold 20b is discharged out of the metal mold 20b through the exhaust holes 31b and 32b by internal pressure of the metal mold 20b at the time of heating and molding.

As the heating method, external heating to heat the metal mold 20b by an electric heater, and internal heating by high-frequency dielectric heating were used. Also, in case of using the coating film F3, the temperature of the metal mold 20b at the time of heating and molding was set at 130° C. In case of using the coating film F5, the temperature of the metal mold 20b was set at 160° C. at the time of heating and molding.

Comparative Example 1

For comparison, a round plate-shaped container was manufactured as Embodiment 1, except that a metal mold without the exhaust holes 31b and 32b in the metal mold 20b, that is, the metal mold that encloses the inside at the time of heating and molding is used instead of the metal mold 20b.

Moldability of the round plate-shaped container was compared in reference with Example 1 using the metal mold 20a with the exhaust holes 31b and 32b and Comparative Example 1 using the metal mold without the exhaust holes 31b and 32b. More particularly, the round-plate shaped container 10b obtained by Example 1 and the round-plate shaped container for comparison obtained by Comparative Example 1 were checked for (1) asperity on the flat area (bottom 10ba or flange 10bc), (2) sharpness of an edge at the flange corner (corner of a boundary between the flange 10bc and the curved area 10ba), (3) Thickness A of the center of the bottom 10ba, thickness B of the flange 10bc and thickness C of the flange corner (sectional thickness).

The results below were obtained irrespective of type of the molding material 14 and the coating film 12.

As for (1), small concavities were found on the surface of the flat area (bottom or flange) of the round plate-shaped container in Comparison Example 1. On the other hand, no concavity was found on the surface of the flat area (bottom 10ba or flange 10bc) of the round plate-shaped container 10b in Example 1.

As for (2), the round plate-shaped container of Comparative Example 1 did not have a sharp edge at the flange corner, unlike a shape of the cavity. On the other hand, the round plate-shaped container 10b of Example 1 had a sharp edge at the flange corner because it was correctly molded into the shape of the cavity 25b.

As for (3), in the round plate-shaped container of Comparative Example 1, there was some variation within 1 mm to 2.5 mm in a thickness of each part. Especially Thickness C of the flange corner was thin. On the other hand, the round plate-shaped container 10b of Example 1 was molded with higher accuracy with a thickness within 2.3 mm to 2.5 mm.

From the above results, in the manufacturing method of the round plate-shaped container 10b, it was proven that moldability of the surface at the flat area and the flange corner of the round plate-shaped container 10b by molding with the metal mold 20b equipped with the exhaust holes 31 and 32b.

Example 2

As for all of the combinations (16 combinations) of 8 molding materials (1) to (8) shown in Table 1 as the molding material 14 and two coating films F3 and F5 shown in Table 2 as the coating film 12, the bowl-shaped container 10a of a deep drawing shape was manufactured by the method of Embodiment 1 explained with FIG. 1.

That is to say, using the metal mold 20a with the exhaust holes 31a and 32a shown in FIGS. 5(a) and 5 (b) and having the cavity 25a of a uniform thickness of 2.5 mm (corresponding to the thickness of the bowl-shaped container 10a), the molding material 14 was placed between a pair of coating films 12 in the metal mold 20a. Then, the metal mold 20a was clamped by fitting the convex mold part 21a in the concave mold part 22a, and the main body 11a was obtained by heating and molding the molding material 14 and the coating film 12 in the metal mold 20a and steam-expanding the molding material. At the same time, the coating film 12 was softened and pressure-bonded to the surface of the main body 11a. Then, at the time of heating and molding, air existing between the coating film 14 and the surface of the metal mold 20a was discharged out of the metal mold 20a through the exhaust holes 31a and 32a by internal pressure of the metal mold 20a.

As a heating method, external heating to heat the metal mold 20a by an electric heater and internal heating by high-frequency dielectric heating were both used. In case of using the coating film F3, the temperature of the metal mold 20a at the time of heating and molding was set at 130° C., and in case of using the coating film F5, the temperature of the metal mold 20a at the time of heating and molding was set at 160° C.

Comparative Example 2

The bowl-shaped container for comparison was manufactured as Example 2, except that a metal mold without the exhaust holes 31a and 32a in the metal mold 20a, that is, the metal mold that encloses the inside at the time of heating and molding was used instead of the metal mold 20a.

Moldability of the bowl-shaped container was compared for Example 2 using the metal mold 20a with the exhaust holes 31a and 32a and Comparative Example 2 using the metal mold without the exhaust holes 31a and 32a. More particularly, the bowl-shaped container 10a obtained by Example 2 and the bowl-shaped container for comparison obtained by Comparative Example 2 were checked for (1) asperity on the flat area (side wall 10aa, flange 10ac, the center (concave part) 10ae of the bottom 10ab), (2) shape of the flange corner (corner of the boundary between the flange 10ac and the side wall 10aa) and the foot 10ad and (3) Thickness A of the center of the bottom 10ab (thickness of the concave part 10ae), Thickness B of the foot 10ad, thickness C of an outer periphery (concave part 10af) of the foot 10ad, Thickness D of the side wall 10aa, and Thickness E of the flange corner (sectional thickness).

The results below were obtained irrespective of the kind of molding material 14 and the coating film 12.

As for (1), small concavities were found on the surface of the flat area (side wall or flange) of the bowl-shaped container in Comparison Example 2. On the other hand, no concavity was found on the surface of the flat area (side wall 10aa, flange 10ac, the center (concave part) 10ae of the bottom 10ab) of the bowl-shaped container 10a in Example 2.

As for (2), in the bowl-shaped container of Comparative Example 2, there was a difference between the edge (corner) at the foot and flange corner and those of the cavity in the shape and thickness. On the other hand, in the bowl-shaped container 10a of Example 2, the foot 10ad and the flange corner (corner of the flange 10ac) is correctly molded into the same shape as that of the cavity 25b and has a sharp edge at the flange.

As for (3), in the bowl-shaped container of Comparative Example 2, there was some variation within 0.5 mm to 2.5 mm in a thickness of each part, especially Thickness B of the foot 10ad, Thickness C of the outer periphery of the foot 10ad and Thickness E of the flange corner were thin. On the other hand, the bowl-shaped container 10a of Example 2 was molded with higher accuracy with a thickness of within 2.3 mm and 2.5 mm at each part.

From the above results, in the manufacturing method of the bowl-shaped container 10a of a deep drawing shape, it was proven that moldability is significantly improved by molding with the metal mold 20a equipped with the exhaust holes 31a and 32a compared with the case of the round plate-shaped container 10b.

Example 3

In this example, as shown in FIG. 18, the metal mold 20a was used, which has almost the same structure as the metal mold 20a shown in FIGS. 5(a) and 5(b).

The metal mold 20a shown in FIG. 18 has the position of the exhaust holes 31a and 32a, shape and size of the cavity common to the metal mold 20a shown in FIGS. 5(a) and 5(b). However, the space leading to the cavity through the exhaust holes 31a and 32a (exhaust tube 33a) formed inside the convex mold part 21a (upper mold) and the concave mold part 22a (lower mold) or the exhaust opening 34 are different from those of the metal mold 20a shown in FIGS. 5 (a) and 5 (b).

That is to say, the exhaust opening 34a was provided at an upper side (a side above the upper end of the cavity) of the convex mold part 21a (upper mold), and one cylindrical exhaust tube 33a (exhaust tube 33a-1) was provided horizontally toward a central axis of the convex mold 21a (vertical central axis) from the exhaust opening 34a to a position near the central axis (position of an exhaust tube 33a-6 mentioned below). Five vertical and cylindrically exhaust tubes 33a linked with the exhaust tube 33a-1 and extending downward were provided (from the outside the exhaust tubes 33a-2, 33a-3, 33a-4, 33a-5, and 33a-6) and the end of these exhaust tubes 33a-2 to 33a-6 was positioned about 5 mm apart from the molding surface (surface forming a cavity). Then, at the end of the exhaust tubes 33a-2 to 33a-6 the exhaust hole 31a was pierced through the molding surface. This structure (exhaust opening 34a, exhaust tubes 33a-1 to 33a-6 and the exhaust hole 31a) were provided in four sets horizontally displaced at 90° to be symmetrical with respect to the central axis.

The exhaust opening 34a was provided on a side of the lower end of the concave mold part 22a (lower mold) and one cylindrical exhaust tube 33a (exhaust tube 33a-1) was horizontally provided toward the central axis of the concave mold part 22a from the exhaust opening 34a to a position near the central axis (position of the exhaust tube 33a-6 mentioned below). Three vertical and cylindrical exhaust tubes 33a linked with the exhaust tube 33a-1 and extending upward were provided (from the outside, the exhaust tubes 33a-2, 33a-3 and 33a-4) and the end of these exhaust tubes 33a-2 to 33a-4 were positioned about 5 mm apart from the molding surface (surface forming the cavity). Then, the exhaust hole 32a was pierced at the end of the exhaust tubes 33a-2 to 33a-4 through the molding surface. This structure (exhaust opening 34a, exhaust tubes 33a-1 to 33a-4 and the exhaust hole 32a) displaced at 90° on a horizontal line were provided in four sets to be symmetrical with respect to the central axis of the concave mold part 22a.

Then, the bowl-shaped container was manufactured as Example 2, except that the metal mold 20a shown in FIG. 18 was used instead of the metal mold 20a shown in FIGS. 5(a) and 5 (b), and that the diameter of all the exhaust tubes 33a was 10 mm or 15 mm, the sectional shape of the exhaust holes 31a and 32a is round, ad the diameter of the exhaust holes 31a and 32a was changed to 0.3 mm, 0.4 mm, 0.5 mm, 0.7 mm, 1.0 mm, 1.2 mm, 1.5 mm and 1.7 mm. The resulting bowl-shaped container was evaluated for a thickness and surface condition.

The results below were obtained whether the diameter of the exhaust tube 33a is 10 mm or 15 mm. That is to say, in case that the diameter of the exhaust holes 31a and 32a is 0.3 mm (sectional area of the exhaust holes 31a and 32a is 0.07069 mm$^2$), air confined between the molding surface in the cavity and the coating film 12 was not discharged completely and desirable thickness was not obtained partially. On the other hand, in case that the diameter of the exhaust holes 31a and 32a is 1.5 mm (sectional area of the exhaust holes 31a and 32a is 1.767 mm$^2$), at the parts corresponding to the exhaust holes 31a and 32a in the resultant bowl-shaped container, some protrusion was clearly found on the coating film 12, and the bowl-shaped container having a smooth surface was not obtained. In addition, in case that the diameter of the exhaust holes 31a and 32a is 1.7 mm (sectional area of the exhaust holes 31a and 32a is 2.270 mm$^2$), at the parts corresponding to the exhaust holes 31a and 32a of the resultant bowl-shaped container, the coating film 12 was partially torn.

On the other hand, in case that the diameter of the exhaust holes 31a and 32a is 0.4 to 1.2 mm (sectional area of the exhaust holes 31a and 32a is 0.1257 to 1.131 mm$^2$), there was no protrusion or tear on the coating film 12a and the excellent bowl-shaped container having a given thickness was obtained. Table 3 shows these results.

TABLE 3

| Diameter of exhaust hole | 0.3 mm | 0.4 to 1.2 mm | 1.5 mm | 1.7 mm |
|---|---|---|---|---|
| Sectional area of exhaust hole | 0.07069 mm$^2$ | 0.1257 to 1.131 mm$^2$ | 1.767 mm$^2$ | 2.270 mm$^2$ |
| Evaluation | Incomplete air exhaust | Good | Clear Protrusion of the film | Partially torn on the film |

From the results in Table 3, it has proven that in case that the exhaust holes 31a and 32a have a round section, the diameter of the exhaust holes 31a and 32a is preferably between 0.4 mm and 1.2 mm. However, the diameter is preferable only for the case that the exhaust holes 31a and 32a have a round section. In case that the exhaust holes 31a and 32a have another sectional shape, they may be designed to obtain equal pressure loss depending on the shape. More particularly, since pressure loss is almost inversely related to the sectional area of the exhaust holes 31a and 32a, the exhaust holes 31a and 32a may be designed so that the sectional area thereof may be equal to that of the exhaust holes 31a and 32a having a round sectional shape and 0.4 to 1.2 mm in diameter, that is 0.12 to 1.13 mm$^2$, regardless of the sectional shape of the exhaust holes 31a and 32a.

Example 4

The bowl-shaped container was manufactured as Example 3, except that the diameter of the exhaust holes 31a and 32a (round section) is fixed to 0.7 mm and the diameter of all the exhaust tubes (cylindrical shape) is changed to 3 mm, 5 mm, 10 mm 15 mm, and 20 mm.

For internal heating by high-frequency dielectric heating, high-frequency power supply (maximum output of 3 kW) was connected to the convex mold part 21a and the concave mold part 22a and anode current of the high-frequency power supply was set at 0.3 A. The molding time (heating time) was set at 110 seconds.

The resultant bowl-shaped container was evaluated for a thickness and surface condition.

In result, in case that the diameter of the exhaust tube 33a is 3 mm, air confined between the molding surface and the coating film 12 in the cavity was not discharged completely and a given thickness was not partially obtained.

On the other hand, incase that the diameter of the exhaust tube 33a is 5 to 20 mm, there was no protrusion or tear on the coating film and excellent bowl-shaped container having a given thickness was obtained. Table 4 shows these results.

TABLE 4

| Diameter of exhaust tube | 3 mm | 5 to 20 mm |
|---|---|---|
| Evaluation (0.3 A) | Incomplete air exhaust | Good |

Figure 19:
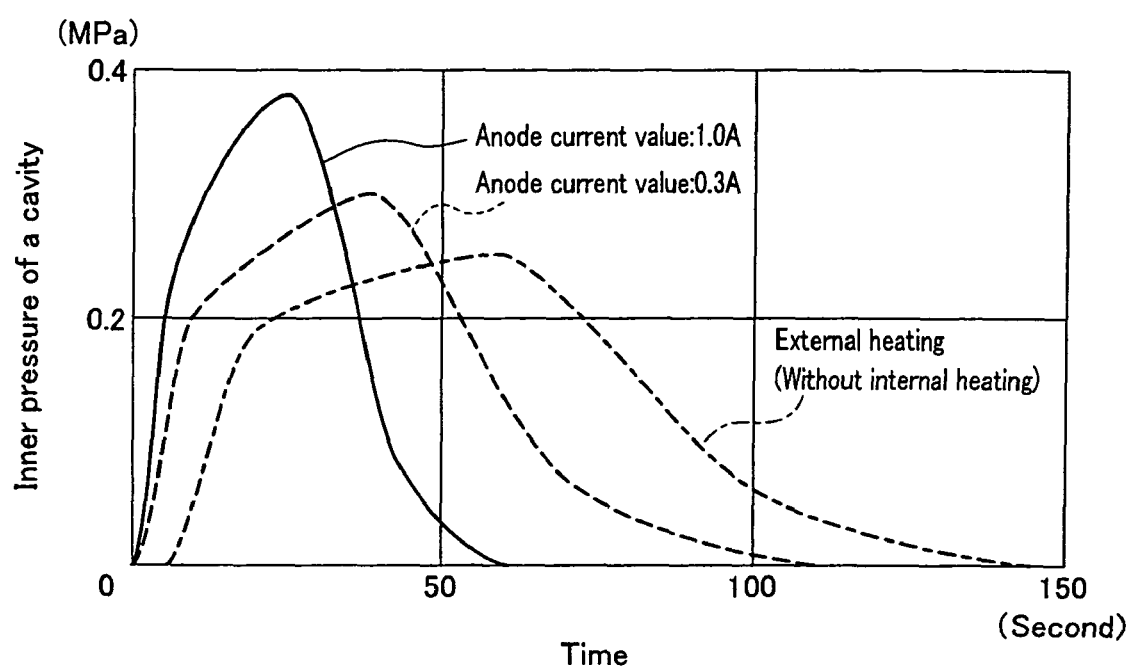
FIG. 19 is a graph showing temporal change in inner pressure of a cavity in the mold with time.

Also, a pressure sensor 40 was installed at the side of the molding surface of the concave mold part 22a (lower mold) and connected to a pressure gauge to measure a periodic change of internal pressure of the cavity during molding. The graph in FIG. 19 shows the change of internal pressure of the cavity during molding measured by the pressure gauge connected to the pressure sensor 40.

Example 5

The bowl-shaped container was manufactured as Example 4, except that anode current of the high-frequency power supply (maximum output of 3 kW) connected for internal heating is changed from 0.3 A to 1.0 A and molding time (heating time) is reduced from 110 seconds to 60 seconds.

The resultant bowl-shaped container was evaluated for a thickness and surface condition.

In result, this Example of 1.0 A of anode current and 60 seconds of molding time showed a different result from Example 4 of a lower anode current of 0.3 A and longer molding time for 110 seconds. That is to say, in case that the diameter of exhaust tube was 10 to 20 mm, internal pressure of the cavity was discharged at once and the expanded molded article came through the coating film 12 and put in the exhaust holes 31a and 32a. On the contrary, in case that the diameter of the exhaust tube 33a was 3 mm or 5 mm, a good result was obtained since internal pressure of the cavity was completely discharged, without causing any tear on the coating film. Table 5 shows these results.

TABLE 5

| Diameter of exhaust tube | 3 mm | 5 mm | 10 to 20 mm |
|---|---|---|---|
| Evaluation (1.0 A) | Good | Good | Tear (molding material pierced through the film) |

Also, as Example 4, a change of internal pressure of the cavity during molding (hereinafter sometimes referred to as "internal pressure) was measured by the pressure gauge connected to the pressure sensor 40. FIG. 19 shows the result. As a reference, FIG. 19 also shows the data incase of applying external heating only without internal heating by high frequency.

The reason of different results between Example 4 and Example 5 is presumed below.

That is to say, as seen in FIG. 19, in steam expansion molding of the present invention, internal pressure rapidly increases together with evaporation and swelling of moisture in the molding material, and as a transition to a drying stage after completion of expanding stage, and with progress of evaporation, internal pressure gradually decreases. If relatively large energy is used for internal heating, initial speed of internal pressure increase rises, and maximum internal pressure increases. (This phenomenon is characteristic of steam expansion molding of the present invention, and it is much different from typical vacuum molding or pressurized molding wherein internal pressure of the cavity is consistent.

Thus, it is presumed that in case that relatively low high-frequency energy by 0.3 A of anode (when the same high-frequency oscillator (high-frequency power supply) is used, high-frequency energy caused by the high-frequency oscillator is proportional to anode current of a vacuum tube in the high-frequency oscillator) is only applied to the molding material, due to a small diameter of 3 mm of the exhaust tube, excessive air in the cavity was not discharged completely since pressure loss in the exhaust tube is relatively large and internal pressure is insufficient, compared with pressure loss.

However, when the anode current is increased to 1.0 A, as shown in FIG. 19, it is presumed that by a rapid increase of internal pressure and an increase of maximum internal pressure, internal pressure exceeds relatively large pressure loss in the exhaust tube 33a of 3 mm in diameter and air is discharged. On the contrary, in case that the diameter of the exhaust tube 33a is large (not less than 10 mm), a difference in pressure between the outside (side of the exhaust holes 31a and 32a) and the inside (side of expanded molded article) sandwiching the coating film 12 increases at one time when air is discharged at once at a rapid increase of internal pressure, and expanded molded article pierces through the coating film 12 at the exhaust holes 31a and 32a.

Example 6

As explained in Example 5, in case of a rapid increase of internal pressure in the cavity, a smaller diameter of exhaust holes 31a and 32a obtained the better result. Next, another structure was evaluated that an enclosed space is formed in the exhaust tube 33a and air discharged from the cavity by an increase of internal pressure of the cavity increases pressure in the exhaust tube 33a.

More particularly, the bowl-shaped container was manufactured as Example 5, except that the exhaust opening 34a is closed to make a space in the exhaust tube 33a enclosed from the outside of the metal mold 20a, and volume of the enclosed space is changed for Void Capacity V in the cavity before heating and molding, as shown in Table 6. V is calculated under the following formula:

$V$=(total capacity in the cavity)−(volume of the molding material)

The resultant bowl-shaped container was evaluated for a thickness and surface condition. The results are shown in Table 6 irrespective of the diameter of the exhaust tube 33a.

TABLE 6

| | Volume of enclosed space | | | | | |
|---|---|---|---|---|---|---|
| | (1/5) V | (1/3) V | (1/2) V | V | 2 V | 4 V |
| Evaluation | Incomplete air exhaust | Almost good | Good | | | Tear |

In result, it has proven that proper exhaust is possible by adjusting the volume of the enclosed space in the exhaust tube 33a irrespective of the diameter of the exhaust tube 33a. That is to say, when the volume of the enclosed space in the exhaust tube 33a is formed to be equivalent to a third to twice of the Void Capacity V in the cavity before molding, there is no inconsistent thickness of the container due to insufficient air exhaust, no tear on the coating film due to excessive air exhaust, leading to good results. It is presumed that air existing in the enclosed space inside the exhaust tube 33a functions as a buffering material (air cushion) to reduce a stress applied to the coating film 12 by the expanded molded article and any tears on the coating film 12 caused by excessive air exhaust can be prevented.

Therefore, the method to form the enclosed space, so called air-cushioning method, is especially effective in case of a rapid molding as this Example or in case of weak strength of the coating film 12.

Example 7

The bowl-shaped container 10a was manufactured by a method of Example 2 explained with FIG. 20, for all of the compositions (40 combinations in total) of eight molding materials (1) to (8) shown in Table 1 and five coating films F1 to F5.

As a heating method, external heating to heat the metal mold 20a by an electric heater and internal heating by high-frequency dielectric heating were both used.

In this Example, all of these 40 combinations were manufactured under twelve heating conditions with the metal mold 20a set at the temperature of 90° C., 100° C., 110° C., 120° C., 130° C., 140° C., 150° C., 160° C., 170° C., 180° C., 190° C., and 200° C.

The resultant 480 varieties of bowl-shaped container 10a (samples) were evaluated for expanded moldability, condition of the coating film after molding, and water resistance. As for expanded moldability, fineness and consistency of the expanded texture of the main body 11a were checked. In addition, the coating film after molding was checked for pinholes by dipping a normal sample in colored water containing a surface-active agent after visually checking for abnormal tears.

The results below were obtained irrespective of the variety of the molding material and the coating film. That is to say, in case that the temperature of the metal mold 20a is less than the softening point of the coating film, the coating film was torn. In case that the temperature of the metal mold 20a is substantially equal to the melting point of the coating film, the coating film had many pinholes. In case that the temperature of the metal mold 20a exceeds the melting point of the coating film, the coating film melted. In the other cases, the coating film was in good condition without melting, tears, cracks or pinholes.

From the results above, it has proven that it is preferable the temperature of the metal mold 20a is not less than the softening point of the coating film and at least 10° C. lower than the melting point thereof.

On the other hand, the main body 11a had better fineness and consistency of the expanded texture, in case that the temperature of the metal mold 20a is not less than 130° C., and it had much better fineness and consistency in case that the temperature of the metal mold 20a is not less than 150° C.

Therefore, from these results; in cases that either one of the coating films F2 to F5 is used as the coating film, the temperature of the metal mold 20a is not less than the softening point of the coating film 12 and at least 10° C. lower than the melting point thereof and not less than 130° C., both coating film and main body 11a obtained good results.

Also, among these cases, if the coating film F4 or F5 is used as the coating film, the temperature of the metal mold 20a is not less than the softening point of the coating film 12 and at least 10° C. lower than the melting point thereof and not less than 130° C., the main body obtained better result.

Therefore, as for the softening point of the coating film a good result was obtained at not less than 90° C. and a better result was obtained at not less than 130° C. Also, as for the melting point of the coating film, a good result was obtained at not less than 140° C. and a better result was obtained at not less than 170° C.

Example 8

For all of the compositions (total 16 combinations) of eight molding materials (1) to (8) shown in Table 1 and five coating films F3 and F5 shown in Table 2, the bowl-shaped container 10a was manufactured by the same method as Embodiment 2 explained with FIG. 20

As a heating method, external heating to heat the metal mold 20a by an electric heater and internal heating by high-frequency dielectric heating were both used. In case of using the coating film F3, the temperature of the metal mold 20a was set at 130° C. at the time of heating and molding, and in case of using the coating film F5, the temperature of the metal mold 20a was set at 160° C. at the time of heating and molding.

Also, when both convex mold part 21a and concave mold part 22a were moved to approximate each other, until the convex mold part 21a and the concave mold part 22a contacted the coating film (until the coating film 12 started to deform), both convex mold part 21a and concave mold part 22a were moved to approximate each other. Afterwards, the convex mold part 21a only was moved. Then, for all of these 16 compositions, moving speed of the convex mold part 21a when it was only moved, was changed between 5 mm/s and 20 mm/s at constant.

The resultant bowl-shaped container 10a (sample) was evaluated for expanded moldability, condition of the coating film after molding and water resistance, as Example 7.

The results below were obtained irrespective of type of the molding materials or coating films. That is to say, if the moving speed of the convex mold part 21a is between 8 mm/s and 12 mm/s, a very good bowl-shaped container 10a was obtained without tears, cracks or pinholes on the coating film. If the moving speed of the convex mold part 21a is slower than 8 mm/s, the coating film had more pinholes. On the contrary, if the moving speed of the convex mold part 21a is faster than 12 mm/s, the coating film had more tears (tears or cracks).

Example 9

For all of the compositions (total 16 combinations) of eight molding materials (1) to (8) shown in Table 1 and five coating films F3 and F5 shown in Table 2, the cup-shaped container 10c shown in FIG. 4 was manufactured by the same method as Embodiment 2 explained with FIG. 20

As a heating method, external heating to heat the metal mold 20d by an electric heater and internal heating by high-frequency dielectric heating were both used. In case of using the coating film F3, the temperature of the metal mold 20d was set at 130° C. at the time of heating and molding, and in case of using the coating film F5, the temperature of the metal mold 20d was set at 160° C. at the time of heating and molding.

As the metal mold 20d, four metal molds 20c having different surface were prepared: (1) metal mold 20d of which vegetable oil was applied on a surface contacting on the coating film as a slip agent; (2) metal mold 20d of which magnesium stearate was applied on a surface contacting on the coating film as a slip agent; (3) metal mold 20d of which tetrafluoroethylene plastic coating is formed on a surface contacting on the coating film as a slip agent; (4) metal mold 20d of which no slip agent is applied on a surface contacting on the coating film. For all 16 combinations of raw materials, the cup-shaped container 10b was manufactured using four metal molds 20d.

The resultant cup-shaped container 10c (sample) was evaluated for expanded moldability, condition of the coating film after molding and water resistance, as Example 7.

The results below were obtained irrespective of type of the molding materials and the coating films.

That is to say, in case of (4) using the metal mold 20d without a slip agent on the surface contacting on the coating film, the coating film had tears or pinholes. Especially, in case of (4) using the coating film F5, the coating film had more tears or pinholes.

On the other hand, in case of (1) to (3) using the metal mold 20d with a slip agent on the surface contacting on the coating film, the coating film had no tears or pinholes. Also, in these cases of (1) to (3), expanded moldability was good and the slip agent gave no bad effect. For the case (3) using tetrafluoroethylene plastic coating, the surface of the coating film was the most beautiful with no adhesion of the slip agent.

As mentioned above, the method to manufacture a biodegradable molded article of the present invention is a method to use a slurry or dough molding material mainly made of starch or a derivative thereof and obtained by mixing water therewith, and a coating film mainly made of a biodegradable plastic and having hydrophobicity, mold the molding material through steam expansion by heating and molding the molding material and the coating film in a mold having a specific shape of cavity, and at the same time soften and pressure-bond the coating film on a surface of the biodegradable expanded molded article obtained through steam expansion molding, wherein an exhaust hole is provided in the mold to discharge air existing between the coating film and the surface of the mold through the exhaust hole out of the cavity at the time of heating and molding.

According to the method above, it is possible to exert more excellent strength compared with a conventional molded article made of starch since the resultant biodegradable expanded molded article contains moderate moisture. Also, according to the method above, since the coating film having hydrophobicity is pressure-bonded on the surface of the biodegradable expanded molded article through heating and molding in the mold, it is possible to obtain the biodegradable molded article where the coating film is substantially adhered to the surface, and to manufacture the biodegradable molded article having enough water resistance. Moreover, according to the above method, the biodegradable expanded molded article is an expanded object having a large surface area, resulting in a very excellent biodegradability. According to the method above, since steam expansion molding of the molding material and pressure-bonding of the coating film is performed at one time, the biodegradable molded article can be manufactured with less processes.

Therefore, the above method has an advantage that a biodegradable molded article having a complicated shape can be easily manufactured with enough strength, enough water resistance and very excellent biodegradability.

Furthermore, according to the method above, since gaseous matter existing between the coating film and the surface of the mold is discharged out of the cavity through the exhaust hole at the time of heating and molding, adhesiveness of the coating film to the surface of the mold is improved. Accordingly, in the method above, it is possible to obtain the biodegradable molded article having excellent surface smoothness and to mold the biodegradable molded article with good accuracy of dimension.

In addition, the mold of the present invention, as mentioned above, is a mold to heat a slurry or dough molding material inside mainly made of starch or a derivative thereof and obtained by adding water thereto and mold through steam expansion, consisting of a plurality of mold parts that can fit together and form a specific shape of cavity inside, and having an exhaust hole piercing through each of the mold parts to discharge gaseous matter in the cavity outside.

According to the structure above, when the molding material is molded through steam expansion by heating the molding material inside, gaseous matter in the cavity can be discharged out of the cavity through the exhaust hole. This can improve adhesiveness of the molded article to the surface of the mold. Accordingly, the above structure has an advantage to provide a mold that can mold the biodegradable molded article having excellent surface smoothness with good accuracy of dimension.

Also, the method to manufacture a biodegradable molded article of the present invention is a method to manufacture a biodegradable molded article of a deep drawing shape by placing a molding material and a coating film substantially flat in a mold of a deep drawing shape to heat and mold them.

According to the method above, a biodegradable molded article having a complicated shape can be easily manufactured with enough strength, enough water resistance and very excellent biodegradability. In addition, according to the method above, it is possible to manufacture a biodegradable molded article of a deep drawing shape such as a bowl-shaped container or a cup-shaped container with fewer processes.

Moreover, the method to manufacture a biodegradable molded article of the present invention is, as mentioned above, a method to use a mold consisting of a pair of convex mold and concave mold, place a molding material and a coating film between the convex mold and the concave mold, deform the center of the coating film by moving at least either one of the convex mold and the concave mold in the direction to fit in each other at the time of heating and molding, and maintain a relative moving speed of the convex mold to a surface formed by connecting a surface of a non-deforming part on an outer periphery of the coating film within 8 mm/s to 12 mm/s, at least while the coating film is being deformed.

The method to manufacture a biodegradable molded article of the present invention, as mentioned above, is a method to do heating so that a temperature of the mold is not less that the softening point of the coating film and 10° C. lower than the melting point thereof.

According to each of the methods above, especially in case that a biodegradable molded article of a deep drawing shape is manufactured using a substantially flat coating film, it is possible to prevent defects in the coating film more certainly and to secure water resistance of the biodegradable molded article more steadily.

The embodiments or examples shown in "BEST MODE FOR CARRYING OUT THE INVENTION" are intended to disclose technical information on the present invention, and it should not be interpreted that the present invention is limited to these examples or embodiments in narrow sense. The present invention can be executed by making various changes within the range of the claims described below and under the spirit of the present invention. The embodiments obtained by properly combining technical measures disclosed in each embodiment is included within the technical range of the present invention.

INDUSTRIAL APPLICABILITY

The biodegradable molded article manufactured under the present invention can be desirably used for a molded article for packaging, such as buffering materials, GES, packaging tray, and for a food container including a container for ready-to-serve foods such as ready-to-serve Chinese or Japanese noodles and baked noodles, a disposable plate or tray used for foodservice industry, and a container for soup or juice.

The biodegradable molded article of a shallow drawing shape manufactured under the present invention can be desirably used for a molded article for packaging, such as buffering materials, GES, packaging tray, and for a food container such as a one-way tray or plate used for the foodservice industry.

Especially, the biodegradable molded article can be desirably used for a container for foods of higher moisture content due to its water resistance, and can be desirably used also as a container for ready-to-serve foods that can store ready-to-serve noodles for a certain period of time, due to its gas impermeability. Especially, the biodegradable molded article manufactured under the present invention has high resistance of hot water, so it can be desirably used as a container for ready-to-serve foods including ready-to-server noodles in which hot water is poured.

As mentioned above, according to the method to use a mold with an exhaust hole of the present invention, it is possible to manufacture the biodegradable molded article easily and with excellent accuracy of dimension, having enough strength, enough water resistance, very excellent biodegradability and excellent surface smoothness, even though the biodegradable molded article has a complicated shape.

As mentioned above, according to the method to place the molding material and the coating film substantially flat in the metal of a deep drawing shape, it is possible to manufacture a biodegradable molded article of a deep drawing shape with fewer processes, having enough strength, enough water resistance, and very excellent biodegradability even though the biodegradable molded article has a complicated shape.

Also, as mentioned above, according to the method to maintain a relative moving speed of a convex mold in accordance with the present invention within a given range, or to meet specific conditions of a temperature of the metal mold in accordance with the present invention, it is possible to easily manufacture a biodegradable molded article having enough strength, enough water resistance and very excellent biodegradability and no defects on the coating film, even though the biodegradable molded article has a complicated shape.

Therefore, the mold and manufacturing method of the present invention can be desirably used to manufacture various biodegradable molded articles mentioned above.

What is claimed is:

1. A method to manufacture a biodegradable molded article comprising the steps of:
   providing a slurry or dough molding material mainly made of starch or a derivative thereof and obtained by adding water therewith;
   providing a coating film distinct from the slurry or dough molding material and mainly made of a biodegradable plastic and having hydrophobicity;
   placing the slurry or dough molding material and the coating film into a mold having a given-shaped cavity to obtain a combination of the slurry or dough molding material and the coating film; and
   heating and molding the combination of the slurry or dough molding material and the coating film in the mold to mold the slurry or dough molding material through steam expansion, and at the same time soften and pressure-bond the coating film to a surface of a biodegradable expanded molded article obtained through steam expansion molding, wherein
   a mold made up of a pair of a convex mold and a concave mold being used;
   said mold has an exhaust hole;
   the molding material and the coating film being placed between the convex mold and the concave mold before the heating and molding;
   in the heating and molding step, a central part of the coating film being deformed by moving at least either one of the convex mold and the concave mold in a direction wherein these two molds fit together;
   at least while the coating film is being deformed, a relative moving speed of the convex mold to a plane formed by connecting a surface of non-deforming parts on an outer periphery of the coating film being maintained from 8 mm/s to 12 mm/s; and
   in the heating and molding step, a gas existing between the coating film and a surface of the mold is discharged out of the cavity through the exhaust hole.

2. A method to manufacture the biodegradable molded article as set forth in claim 1, wherein
   a space leading to the cavity through the exhaust hole is formed inside the mold, and
   in the heating and molding step, the space is hermetically separated from outside the mold.

3. A method to manufacture the biodegradable molded article as set forth in claim 2, wherein the hermetically separated space has a volume set between a third and twice that of a void in the cavity before heating and molding.

4. A method to manufacture the biodegradable molded article as set forth in claim 1, wherein the exhaust hole has a cross section between 0.12 mm$^2$ and 1.13 mm$^2$.

5. A method to manufacture a biodegradable molded article comprising the steps of:
   providing a slurry or dough molding material mainly made of starch or a derivative thereof and obtained by adding water thereto;
   providing a coating film distinct from the slurry or dough molding material and mainly made of a biodegradable plastic and having hydrophobicity;
   placing the slurry or dough molding material and the coating film into a mold having a given-shaped cavity to obtain a combination of the slurry or dough molding material and the coating film; and
   heating and molding the combination of the slurry or dough molding material and the coating film in the mold to mold the slurry or dough molding material through steam expansion, and at the same time soften and pressure-bond the coating film to a surface of a biodegradable expanded molded article obtained through steam expansion molding,
   wherein the given-shaped cavity of the mold has a deep drawing shape, and the mold is made up of a pair of a convex mold and a concave mold;
   before the heating and molding, the molding material and the coating film being placed between the convex mold and the concave mold therein are substantially;
   in the heating and molding step, a central part of the coating film being deformed by moving at least either one of the convex mold and the concave mold in a direction wherein these two molds fit together, and
   at least while the coating film is being deformed, a relative moving speed of the convex mold to a plane formed by connecting a surface of non-deforming parts on an outer periphery of the coating film being maintained from 8 mm/s to 12 mm/s, so as to manufacture a biodegradable molded article of a deep drawing shape.

6. A method to manufacture the biodegradable molded article as set forth in claim 1, wherein
   a mold made up of a pair of a convex mold and a concave mold is used,
   the molding material and the coating film are placed between the convex mold and the concave mold before the heating and molding,
   in the heating and molding step, a central part of the coating film is deformed by moving at least either one of the convex mold and the concave mold in a direction where these two molds fit together, and
   at least while the coating film is being deformed, the convex mold and the concave mold are straightly moved closer to each other.

7. A method to manufacture the biodegradable molded article as set forth in claim 1, wherein
   a mold made up of a pair of a convex mold and a concave mold is used,
   the molding material and the coating film are placed between the convex mold and the concave mold before the heating and molding,
   in the heating and molding step, a central part of the coating film is deformed by moving at least either one of the convex mold and the concave mold in a direction where these two molds fit together, and
   at least until the coating film starts to deform, both the convex mold and the concave mold are moved closer to each other.

8. A method to manufacture a biodegradable molded article comprising the steps of:
   preparing: a slurry or dough molding material mainly made of starch or a derivative thereof and obtained by adding water thereto; and a coating film mainly made of a biodegradable plastic and having hydrophobicity; and
   heating and molding the molding material and the coating film in a mold having a given-shaped cavity to molding an expanded molded article through steam expansion by, and at the same time soften and pressure-bond the coating film to a surface of a biodegradable expanded molded article,
   a mold made up of a pair of a convex mold and a concave mold being used,
   the molding material and the coating film being placed between the convex mold and the concave mold before the heating and molding,
   in the heating and molding step, a central part of the coating film being deformed by moving at least either one of the convex mold and the concave mold in a direction wherein these two molds fit together, and at least while the coating film is being deformed, a relative moving speed of the convex mold to a plane formed by connecting a surface of non-deforming parts on an outer periphery of the coating film being maintained from 8 mm/s to 12 mm/s.

9. A method to manufacture the biodegradable molded article as set forth in claim 8, wherein the convex mold and the concave mold are straightly moved closer to each other at least while the coating film is deformed.

10. A method to manufacture the biodegradable molded article as set forth in claim 8, wherein both of the convex mold and the concave mold are moved to approximate each other at least until the coating film starts to deform.

11. A method to manufacture the biodegradable molded article as set forth in claim 1, wherein the heating is done so that the mold has a temperature not less than a softening point of the coating film and at least 10° C. lower than the melting point thereof.

12. A method to manufacture a biodegradable molded article comprising the steps of:
    providing a slurry or dough molding material mainly made of starch or a derivative thereof and obtained by adding water thereto;
    providing a coating film distinct from the slurry or dough molding material and mainly made of a biodegradable plastic and having hydrophobicity;
    placing the slurry or dough molding material and the coating film into a mold having a given-shaped cavity to obtain a combination of the slurry or dough molding material and the coating film; and
    heating and molding the combination of the slurry or dough molding material and the coating film in the mold to mold the biodegradable expanded molded article through steam expansion, and at the same time soften and pressure-bond the coating film to a surface of a biodegradable expanded molded article,
    a mold made up of a pair of a convex mold and a concave mold being used,
    the molding material and the coating film being placed between the convex mold and the concave mold before the heating and molding,
    in the heating and molding step, a central part of the coating film being deformed by moving at least either one of the convex mold and the concave mold in a direction wherein these two molds fit together,
    at least while the coating film is being deformed, a relative moving speed of the convex mold to a plane formed by connecting a surface of non-deforming parts on an outer periphery of the coating film being maintained from 8 mm/s to 12 mm/s, and
    said heating being done so that the mold has a temperature not less than a softening point of the coating film and at least 10° C. lower than a melting point thereof.

13. A method to manufacture the biodegradable molded article as set forth in claim 11, wherein the heating is done so that the mold has a temperature not less than 130° C.

14. A method to manufacture the biodegradable molded article as set forth in claim 11, wherein the heating is done so that the mold has a temperature not less than 150° C.

15. A method to manufacture the biodegradable molded article as set forth in claim 1, wherein a slip agent is applied to a surface of the mold contacting the coating film before the heating and molding.

16. A method to manufacture the biodegradable molded article as set forth in claim 15, wherein the slip agent is a fluoroplastic layer formed on a surface of the mold.

17. A method to manufacture the biodegradable molded article as set forth in claim 1, wherein the coating film is a film mainly made of a denatured polyester.

18. A method to manufacture the biodegradable molded article as set forth in claim 1, wherein the coating film is a biaxially stretched film.

19. A method to manufacture the biodegradable molded article as set forth in claim 2, wherein the exhaust hole has a cross section between 0.12 mm$^2$ and 1.13 mm$^2$.

20. A method to manufacture the biodegradable molded article as set forth in claim 3, wherein the exhaust hole has a cross section between 0.12 mm$^2$ and 1.13 mm$^2$.

21. A method to manufacture the biodegradable molded article as set forth in claim 5, wherein
    a mold made up of a pair of a convex mold and a concave mold is used,
    the molding material and the coating film are placed between the convex mold and the concave mold before the heating and molding,
    in the heating and molding step, a central part of the coating film is deformed by moving at least either one of the convex mold and the concave mold in a direction where these two molds fit together, and
    at least while the coating film is being deformed, the convex mold and the concave mold are straightly moved closer to each other.

22. A method to manufacture the biodegradable molded article as set forth in claim 5, wherein
    a mold made up of a pair of a convex mold and a concave mold is used,
    the molding material and the coating film are placed between the convex mold and the concave mold before the heating and molding,
    in the heating and molding step, a central part of the coating film is deformed by moving at least either one of the convex mold and the concave mold in a direction where these two molds fit together, and
    at least until the coating film starts to deform, both the convex mold and the concave mold are moved closer to each other.

23. A method to manufacture the biodegradable molded article as set forth in claim 9, wherein both of the convex mold and the concave mold are moved to approximate each other at least until the coating film starts to deform.

24. A method to manufacture the biodegradable molded article as set forth in claim 5, wherein the heating is done so that the mold has a temperature not less than a softening point of the coating film and at least 10° C. lower than the melting point thereof.

25. A method to manufacture the biodegradable molded article as set forth in claim 8, wherein the heating is done so that the mold has a temperature not less than a softening point of the coating film and at least 10° C. lower than the melting point thereof.

26. A method to manufacture the biodegradable molded article as set forth in claim 12, wherein the heating is done so that the mold has a temperature not less than 130° C.

27. A method to manufacture the biodegradable molded article as set forth in claim 12, wherein the heating is done so that the mold has a temperature not less than 150° C.

28. A method to manufacture the biodegradable molded article as set forth in claim 5, wherein a slip agent is applied to a surface of the mold contacting the coating film before the heating and molding.

29. A method to manufacture the biodegradable molded article as set forth in claim 8, wherein a slip agent is applied to a surface of the mold contacting the coating film before the heating and molding.

30. A method to manufacture the biodegradable molded article as set forth in claim 5, wherein the coating film is a film mainly made of a denatured polyester.

31. A method to manufacture the biodegradable molded article as set forth in claim 8, wherein the coating film is a biaxially stretched film.

32. A method to manufacture the biodegradable molded article as set forth in claim 8, wherein the coating film is a film mainly made of a denatured polyester.

33. A method to manufacture the biodegradable molded article as set forth in claim 5, wherein the coating film is a biaxially stretched film.

* * * * *

UNITED STATES PATENT AND TRADEMARK OFFICE
CERTIFICATE OF CORRECTION

| | | |
|---|---|---|
| PATENT NO. | : 8,043,539 B2 | Page 1 of 1 |
| APPLICATION NO. | : 10/507507 | |
| DATED | : October 25, 2011 | |
| INVENTOR(S) | : Akio Ozasa et al. | |

It is certified that error appears in the above-identified patent and that said Letters Patent is hereby corrected as shown below:

Title Page, Item (54) and at Column 1, lines 1-3, Title should read:
--Method and Mold for Manufacturing Biodegradable Molded Articles--

Signed and Sealed this
Tenth Day of January, 2012

David J. Kappos
*Director of the United States Patent and Trademark Office*